United States Patent [19]

Scherbatskoy

[11] Patent Number: 4,866,680

[45] Date of Patent: Sep. 12, 1989

[54] METHOD AND APPARATUS FOR TRANSMITTING INFORMATION IN A BOREHOLE EMPLOYING SIGNAL DISCRIMINATION

[76] Inventor: Serge A. Scherbatskoy, 3921 Clayton Rd. E., Fort Worth, Tex. 76116

[21] Appl. No.: 205,617

[22] Filed: Jun. 2, 1988

Related U.S. Application Data

[60] Continuation of Ser. No. 90,570, Aug. 28, 1987, abandoned, which is a continuation of Ser. No. 917,785, Oct. 10, 1986, abandoned, which is a continuation of Ser. No. 811,955, Dec. 20, 1985, abandoned, which is a continuation of Ser. No. 417,036, Sep. 13, 1982, abandoned, which is a division of Ser. No. 383,269, May 28, 1982, Pat. No. 4,520,468, which is a continuation of Ser. No. 68,526, Aug. 21, 1979, abandoned, which is a continuation-in-part of Ser. No. 857,677, Dec. 5, 1977, abandoned.

[51] Int. Cl.⁴ .............................................. G01V 1/40
[52] U.S. Cl. ........................................ 367/83; 367/43
[58] Field of Search ...................................... 367/43, 83

[56] References Cited

U.S. PATENT DOCUMENTS

| | | | |
|---|---|---|---|
| 3,302,459 | 2/1967 | Mayers | 367/83 |
| 3,488,629 | 1/1970 | Claycomb | 367/83 |
| 3,521,037 | 7/1970 | Coll et al. | 367/83 |
| 3,521,041 | 7/1970 | Van Blerkom et al. | 367/43 |
| 3,555,504 | 1/1971 | Fields | 367/83 |
| 3,742,443 | 6/1973 | Foster et al. | 367/83 |
| 4,215,425 | 7/1980 | Waggener | 367/83 |

OTHER PUBLICATIONS

Robinson et al., "Principles of Digital Filtering," *Geophysics*, vol. 24, #3, 6/64, pp. 395-404.
Smith, "A Review of Filtering Seisimic Data," *Geophysics*, vol. 23, #1, 1/58, pp. 44-57.

*Primary Examiner*—Thomas H. Tarcza
*Assistant Examiner*—Ian J. Lobo
*Attorney, Agent, or Firm*—Head & Johnson

[57] ABSTRACT

Disclosed are improvements pertaining to measurement while drilling apparatus, methods, and systems, including: generation of mud pulse pressure variations in a regime of hydraulic shock waves; transmission of information carrying signals via mud pressure variations which include various interfering signals generally termed "noise" and employing special techniques involving digital filters for accomplishing reception of said information carrying signals; providing hydraulic means to automatically effect periodic closing of the valve means that produces the information carrying signals; providing electrical means to inhibit valve means operation in case of electrical failure in downhole apparatus; providing means which serve to greatly increase the number of satisfactory actuations of said valve means attainable without downhole battery recharge or replacement; providing unique pulse time codes which permit substantial increase in rate of information transmission and the accuracy and precision of such transmission.

7 Claims, 21 Drawing Sheets

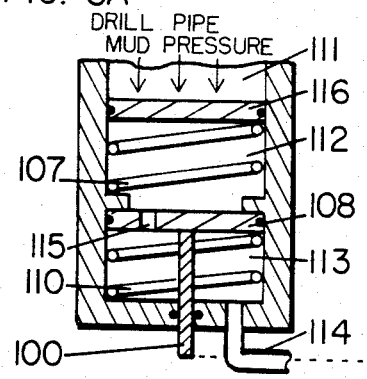
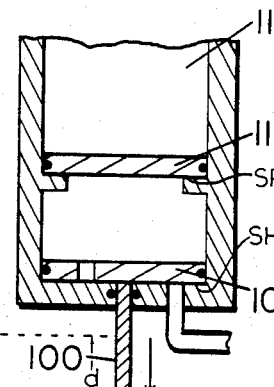
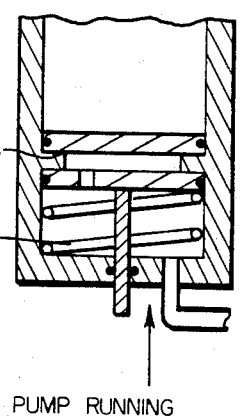
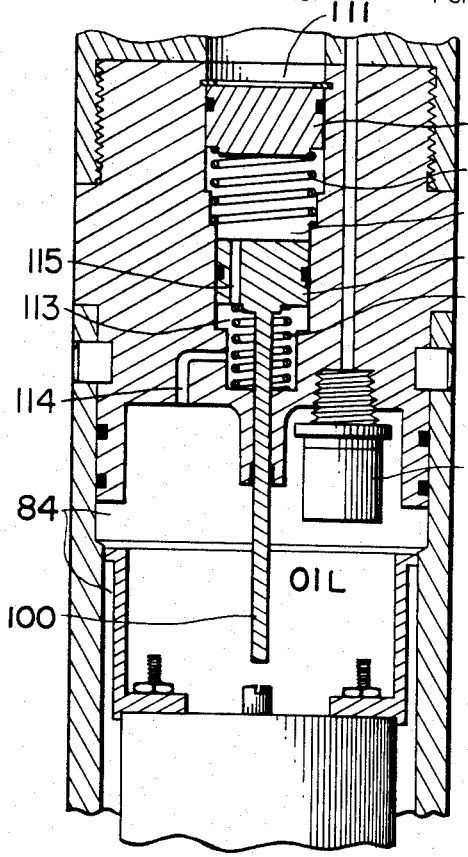
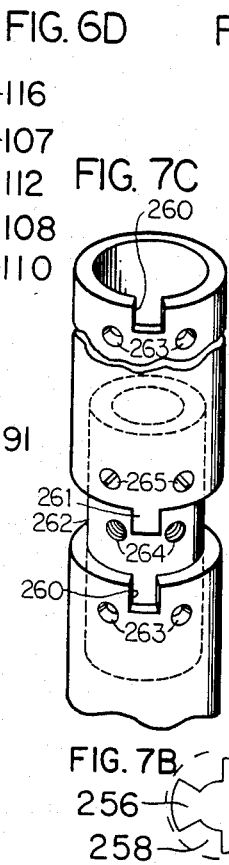
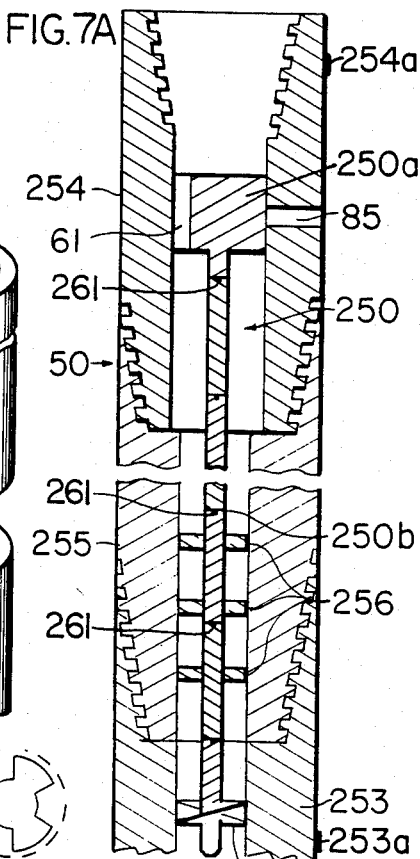
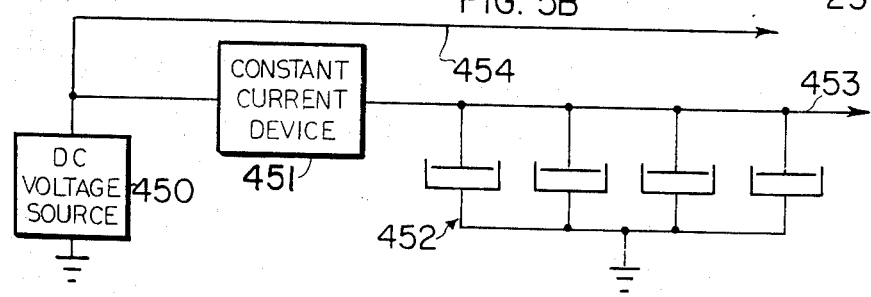

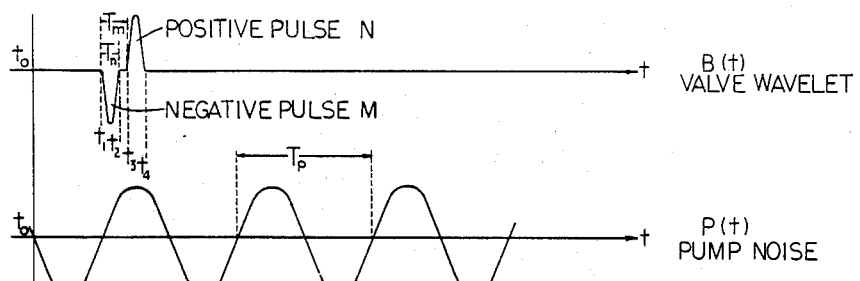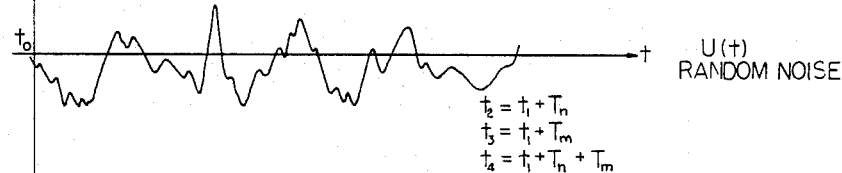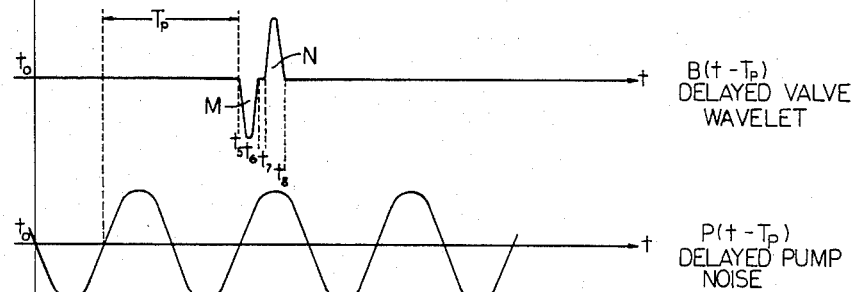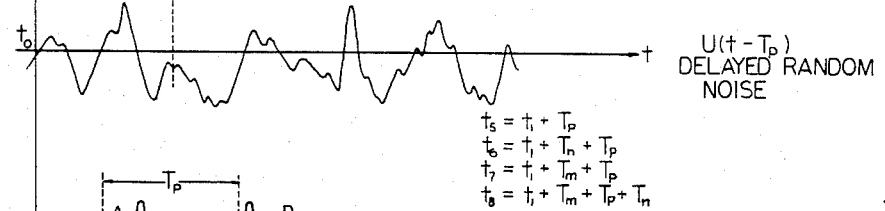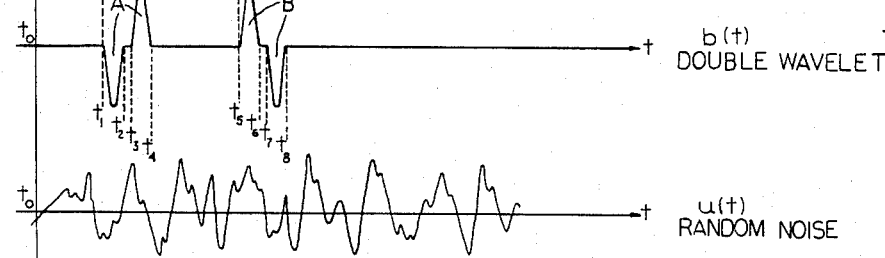

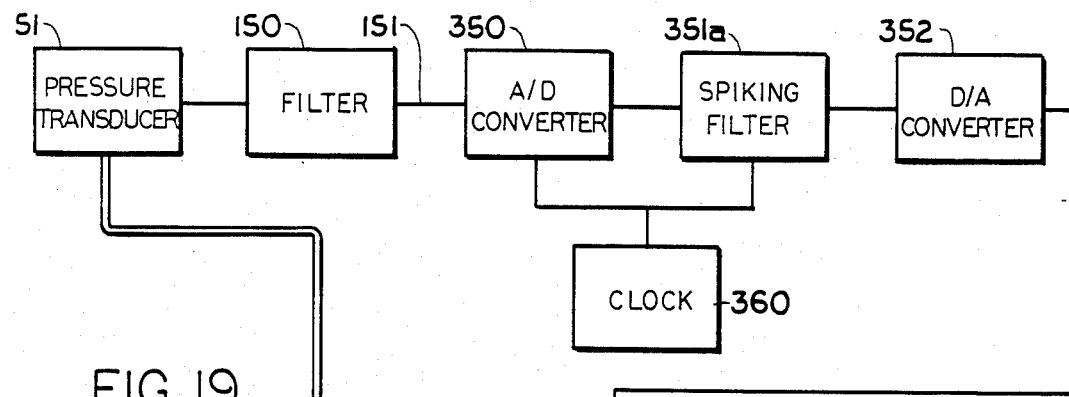
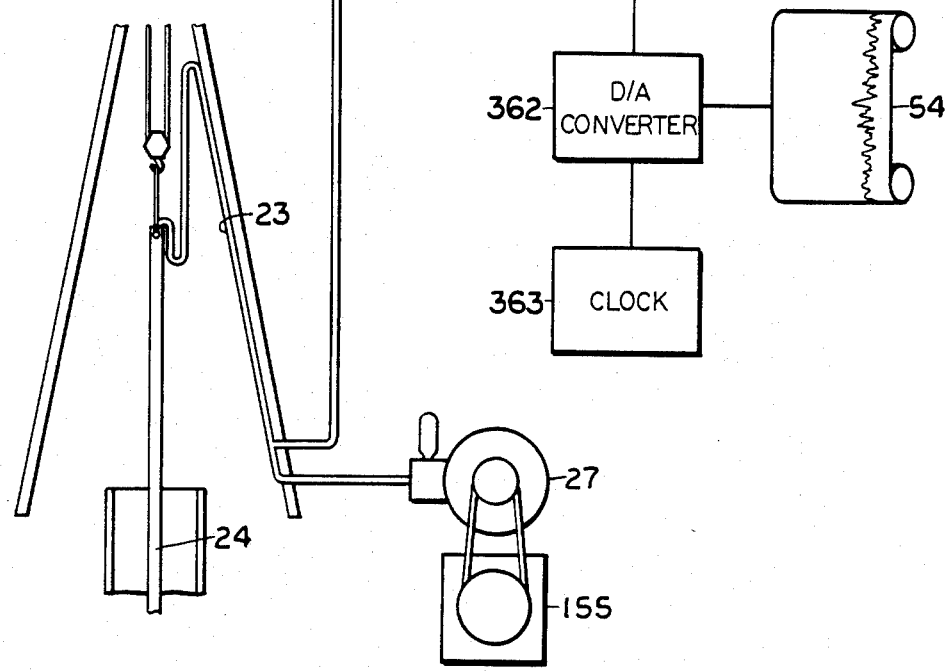
FIG. 19
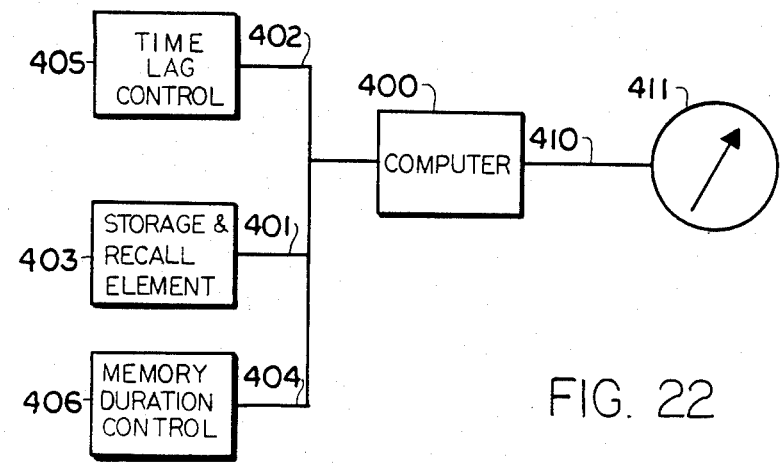
FIG. 22

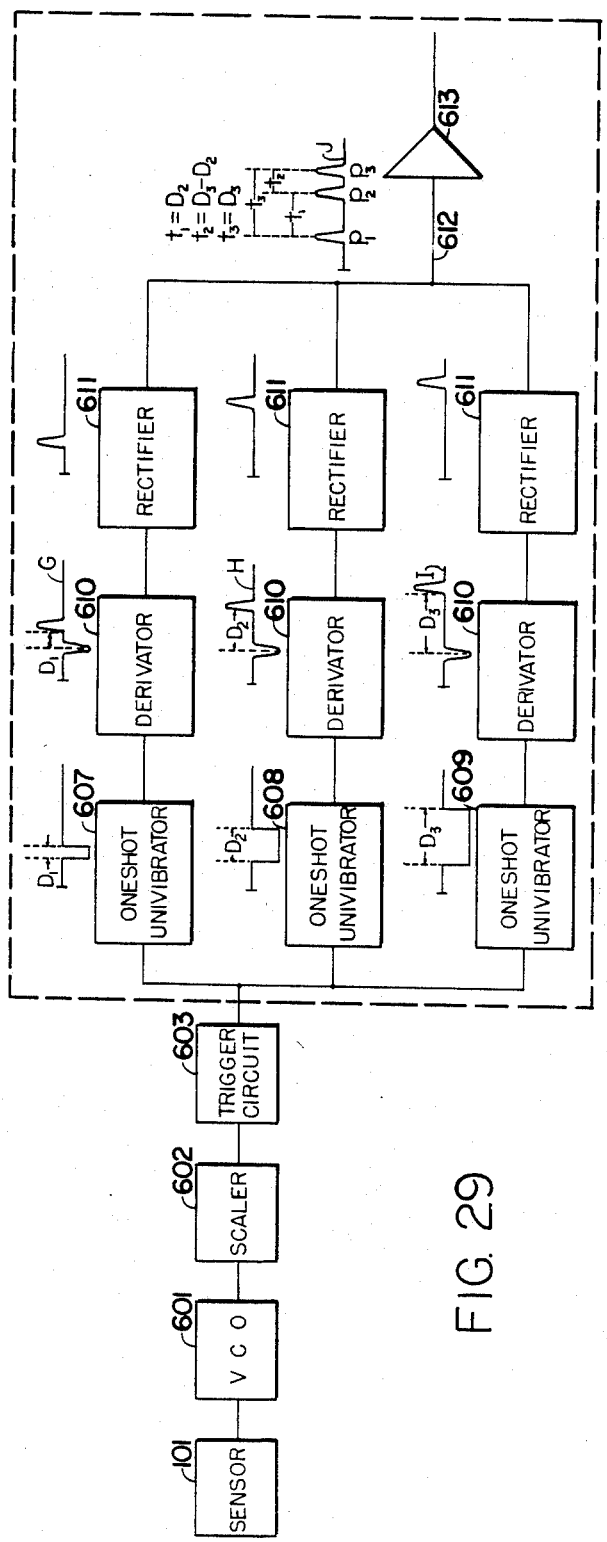
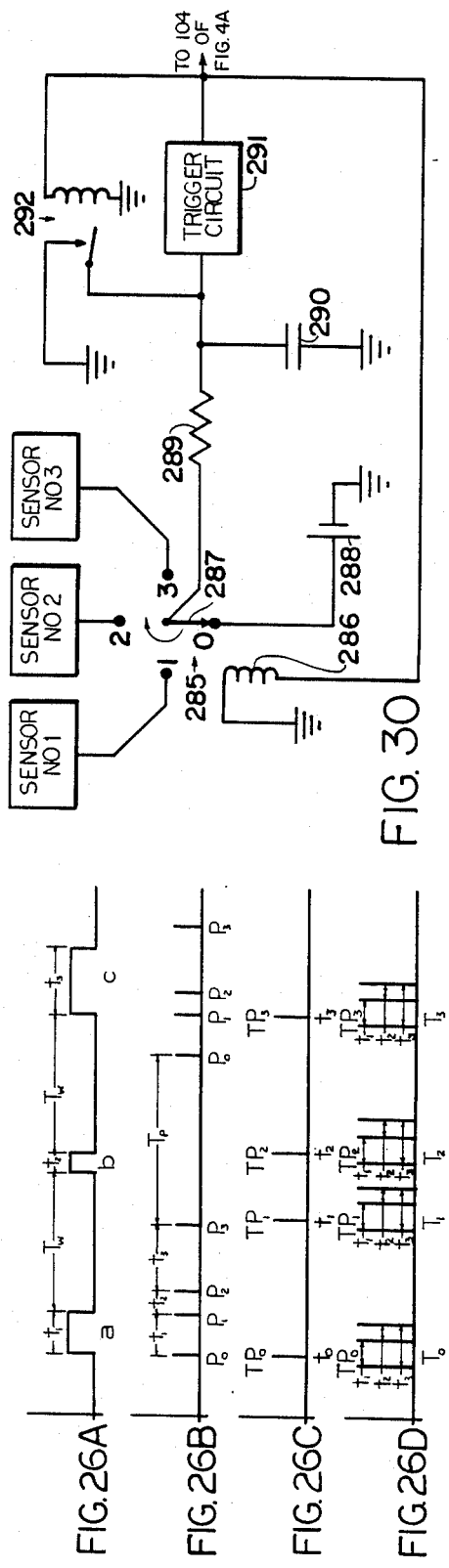
FIG. 29
FIG. 30
FIG. 26A
FIG. 26B
FIG. 26C
FIG. 26D

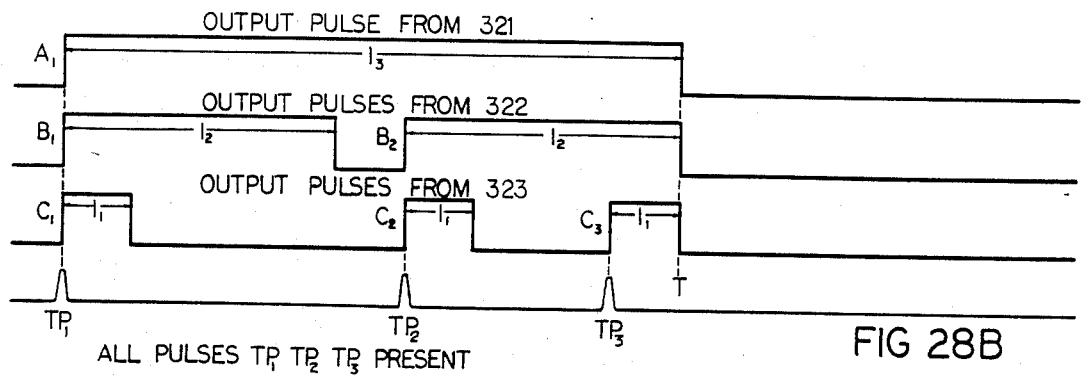
FIG 28B ALL PULSES TP₁ TP₂ TP₃ PRESENT
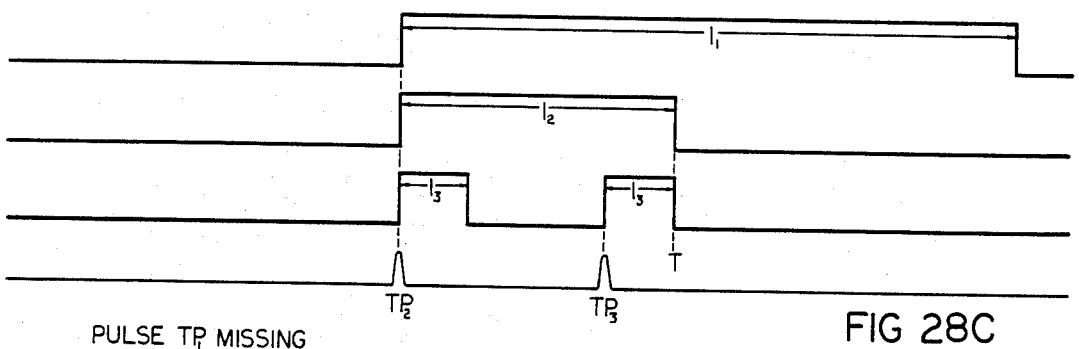
FIG 28C PULSE TP₁ MISSING
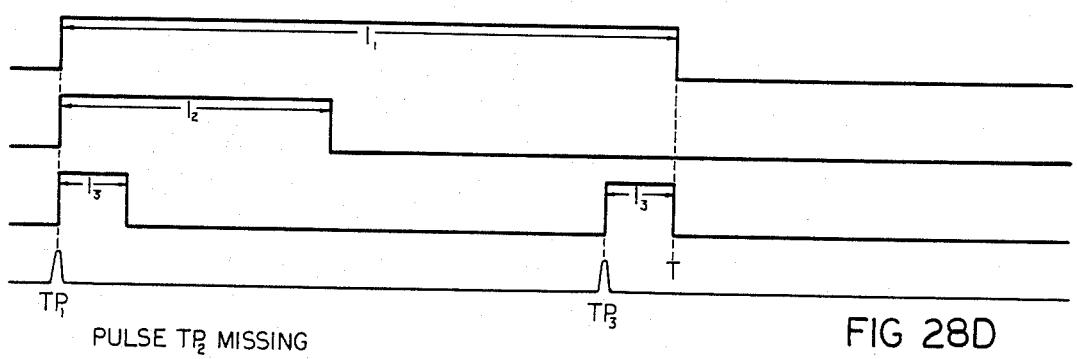
FIG 28D PULSE TP₂ MISSING
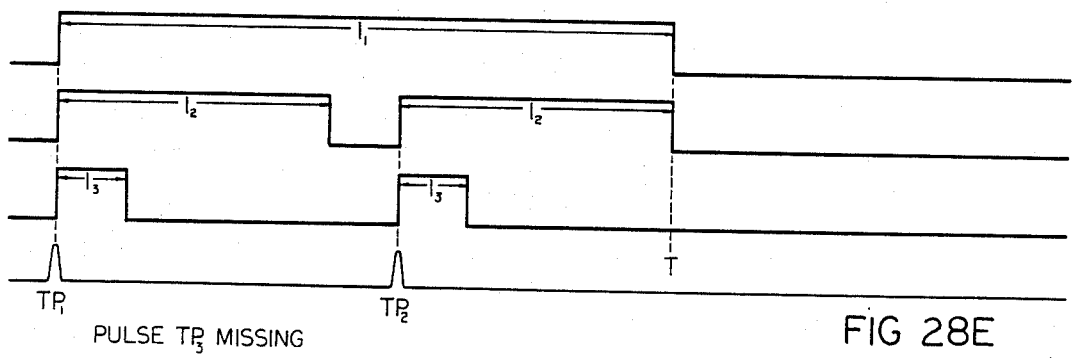
FIG 28E PULSE TP₃ MISSING

METHOD AND APPARATUS FOR TRANSMITTING INFORMATION IN A BOREHOLE EMPLOYING SIGNAL DISCRIMINATION

CROSS-REFERENCE TO RELATED APPLICATIONS

This is a continuation application of copending application Ser. No. 090,570, filed Aug. 28, 1987, now abandoned, which was a continuation of Ser. No. 917,785 filed Oct. 10, 1986, now abandoned, which was a continuation of application Ser. No. 811,955 filed Dec. 20, 1985, now abandoned, which was a continuation of application Ser. No. 417,036 filed Sept. 13, 1982, now abandoned, which was a divisional of Ser. No. 383,269 filed May 28, 1982 which issued as Patent 4,520,468 which was a continuation of Ser. No. 068,526 filed Aug. 21, 1979, now abandoned, which was a continuation-in-part of Ser. No. 857,677 filed Dec. 15, 1977, now abandoned.

FIELD OF THE INVENTION

This invention generally pertains to measurements while drilling a bore hole in the earth and more particularly pertains to systems, apparatus, and methods utilizing hydraulic shock waves in the drilling mud column for transmission of signals representing one or more downhole parameters to the earth's surface. It also pertains to systems and methods for detecting those signals in the presence of interfering noise.

DESCRIPTION OF THE PRIOR ART

This invention relates to data transmission systems for use in transmitting data from the bottom of a well bore to the surface while drilling the well.

It has been long recognized in the oil industry that the obtaining of data from downhole during the drilling of a well would provide valuable information which would be of interest to the drilling operator. Such information as the true weight on the bit, the inclination and bearing of the borehole, the tool face, fluid pressure, and temperature at the bottom of the hole and the radioactivity of substances surrounding or being encountered by the drill bit would all be expressed by quantities of interest to the drilling operator. A number of prior art proposals to measure these quantities while drilling and to transmit these quantities to the surface of the earth have been made. Various transmission schemes have been proposed in the prior art for so doing. For a description of prior art see for instance U.S. Pat. No. 2,787,795 issued to J. J. Arps, U.S. Pat. No. 2,887,298 issued to H. D. Hampton, U.S. Pat. No. 4,078,620 issued to J. H. Westlake et al, U.S. Pat. No. 4,001,773 issued to A. E. Lamel et al. U.S. Pat. No. 3,964,556 issued to Marvin Gearhart et al, U.S. Pat. No. 3,983,948 issued to J. D. Jeter, and U.S. Pat. No. 3,791,043 issued to M. K. Russell. All of the above listed patents are incorporated in this specification by reference.

Perhaps the most promising of these prior art proposals in a practical sense has been that of signalling by pressure pulses in the drilling fluid. Various methods have been suggested in the prior art to produce such mud pulsations either by a controlled restriction of the mud flow circuit by a flow restricting valve appropriately positioned in the main mud stream or by means of a bypass valve interposed between the inside of the drill string (high pressure side) and the annulus around the drill string (low pressure side).

It has been suggested in the prior art to produce mud pressure pulses by means of valves that would either restrict the mud flow inside the drill string or bypass some flow to the low pressure zone in the annulus around the drill string. Such valves are of necessity slow because when used inside the drill string the valve must control very large mud volumes, and when used to control a by-pass, because of the very high pressure differences, the valve was of necessity also a slow motorized valve. For example, such a motorized valve, interposed between the inside of the drill string and the annulus produced in response to a subsurface measurement slow decreases and slow increases of mud pressure. These were subsequently detected at the surface of the earth.

In order to understand more fully the operation of a slowly acting motorized valve as suggested in the prior art, reference is made to FIG. 1A which shows the opening and the closing of such a valve as a function of time. Referring now specifically to FIG. 1A, the abscissas in FIG. 1A represents time, t, whereas the ordinates represent the degree of opening of the valve, R.

$$R = \frac{S(t)}{S_0} \quad (1)$$

where $S_0$ is the total area of the opening and $S(t)$ is the area which is open at the instant t during the process of opening or closing of the valve. Thus when $R=0$ the valve was closed and when $R=1$ the valve was fully opened. The times involved in the operation of the valve were as follows:

$t_a^{(v)} = OA_1$ was the time at which the valve started to open;

$t_b^{(v)} = OB_1$ was the time at which the valve was fully open;

$t_c^{(v)} = OC_1$ was the time at which the valve started to close;

$t_d^{(v)} = OD_1$ was the time at which the valve was fully closed.

The time interval:

$$T_a^{(v)} = t_b^{(v)} - t_a^{(v)} = t_d^{(v)} - t_c^{(v)} \quad (2)$$

$T_a^{(v)}$ will be referred to as the "time of opening or closing of the valve". The time interval $$T_b^{(v)} = t_c^{(v)} - t_b^{(v)} \quad (3)$$

$T_b^{(v)}$ will be referred to as the "time of open flow". Thus, the total period of the actuation of the valve was $$T_t^{(v)} = 2T_a^{(v)} + T_b^{(v)} \quad (4)$$

In the above attempts one had $T_a^{(v)} = 1$ second, $T_b^{(v)} = 2$ seconds and consequently the total time of the actuation of the valve was $T_t^{(v)} = 4$ seconds. These relatively slow openings and closings of the valve produced correspondingly slow decreases and increases of mud pressure at the surface of the earth (see FIG. 1B).

It can be seen that the mud pressure decreased from its normal value of for example, 1000 psi (when the valve was closed) to its lowest value of 750 psi (when the valve was open). The times involved in these observed pressure variations were as follows:

$t_{1a}^{(s)}=OE_1$ was the time at which the mud pressure starts to decrease from its normal level at 1000 psi;

$t_{1b}^{(s)}=OF_1$ the time at which the mud pressure attained its lowest level at 750 psi and was maintained at this level until time $t_{1c}^{(s)}=OG_1$;

$t_{1c}^{(s)}=OG_1$ was the time at which the mud pressure starts to increase;

$t_{1d}^{(s)}=OH_1$ was the time at which the mud pressure attained its normal level at 1000 psi.

Thus, the pressure decreased during the time interval $T_1^{(s)}=t_{1b}^{(s)}-t_{1a}^{(s)}$, then it remained constant during the interval $T_2^{(s)}=t_{1c}^{(s)}-t_{1b}^{(s)}$, and then it rose from its depressed value to the normal level during the time interval $T_3^{(s)}=t_{1d}^{(s)}-t_{1c}^{(s)}$. Thus, the total time of the mud flow through the bypass valve for a single actuation of the valve was $$T_t^{(s)}=T_1HU(s)+T_2^{(s)}+T_3^{(s)} \quad (5)$$

I have designated quantities in FIG. 1A (such as $t_a^{(v)}$, $t_b^{(v)}$, $t_c^{(v)}$, $t_d^{(v)}$, $T_a^{(v)}$, $T_b^{(v)}$ and $T_t^{(v)}$ with superscript "v" to indicate that these quantities relate to the operation of the valve which is below the surface of the earth. On the other hand the quantities $t_{1a}^{(s)}$, $t_{1b}^{(s)}$, $t_{1c}^{(s)}$, $t_{1d}^{(s)}$, $T_1^{(s)}$, $T_2^{(s)}$, $T_3^{(s)}$ and $T_t^{(s)}$ in FIG. 1B are designated with superscript "s" to indicate that these quantities relate to measurements at the surface of the earth. This distinction between the quantities provided with superscript "v" and those with superscript "s" is essential in order to fully understand some of the novel features of my invention. It is essential in this connection to distinguish between the cause and the effect, or in other words, between the phenomena occurring downhole, in the proximity of the valve and those at the detector at the surface of the earth.

An essential feature of the previously proposed arrangement is based on the relationships:

$$T_1^{(s)}=T_a^{(v)} \quad (6)$$

$$T_2^{(s)}=T_b^{(v)} \quad (7)$$

$$T_3^{(s)}=T_a^{(v)} \quad (8).$$

These relationships show that the period of decrease or increase of the pressure at the earth's surface was the same as the corresponding period of opening and closing of the valve, and the period at which the pressure was substantially constant (at a decreased level) was the same as the period during which the valve was fully open. In other words, the decrease and subsequent increase of the mud pressure at the earth's surface was in exact correspondence with the opening and closing of the valve. This condition as expressed by the relationships (6), (7), and (8) will be referred to in this specification as relating to a "regime of slow variations of pressure".

The regime of slow pressure variation as suggested in the prior art ws not suitable for telemetering in measurement while drilling operations, particularly when several down hole parameters are being measured. By the time a first parameter has been measured, encoded, transmitted to the surface and then decoded, the well bore can have been deepened and the second parameter may no longer be available for measurement. Relatively long time intervals were required for the conversion of the measured data into a form suitable for detection and recording. The entire logging process was lengthy and time consuming. Furthermore various interfering effects such as pulsations due to the mud pump and noise associated with various drilling operations produced additional difficulty. A slow acting motorized valve, such as that suggested in the prior art, is believed to be inadequate to satisfy current commercial requirements.

SUMMARY OF THE INVENTION

Some of the objectives of my invention are accomplished by using hydraulic shock waves for telemetering logging information while drilling is in process. These shock waves are produced by a very rapidly acting (for all practical purposes almost instantaneously acting) bypass valve interposed between the inside of the drill string and the annulus around the drill string. When the bypass valve suddenly opens, the pressure in the immediate vicinity of the valve drops and then returns to normal almost instantaneously and a sharp negative pulse is generated, and conversely, when the bypass valve suddenly closes, a sharp positive pulse is generated. Elasticity of mud column is employed to assist in the generation and transmission of such shock waves. The phenomenon is analogous to the well known water hammer effect previously encountered in hydraulic transmission systems. (See for instance John Parmakian on "Water Hammer Analysis", Prentice Hall, Inc. New York, N.Y. 1955 or V. L. Streeter and E. B. Wylie on "Hydraulic Transients" McGraw-Hill Book Co., New York, N.Y.)

Significant features of my invention such as the generation and detection of hydraulic shock waves are shown schematically in FIGS. 2A and 2B. The graph in FIG. 2A shows the openings and closings of a fast acting shock wave producing valve, whereas the graph of FIG. 2B shows pressure variations detected at the earth's surface and resulting from the operation of the valve as in FIG. 2A. Symbols such as $A_1$, $B_1$, $C_1$, $D_1$, $t_a^{(v)}$, $t_b^{(v)}$, $t_c^{(v)}$, $t_d^{(v)}$, $T_a^{(v)}$, $T_b^{(v)}$ and $T_t^{(v)}$ in FIG. 2A have a similar meaning as the corresponding symbols in FIG. 1A. However, the time scales in FIGS. 1A, 1B, 2A and 2B have been considerably distorted in order to facilitate description, and in the interest of clarity of explanation.

The first thing which should be noted in examining FIG. 2A is that the times of opening and closing of the valve in accordance with my invention are by several orders of magnitudes shorter than the corresponding times obtained by means of the motorized valve as reported in connection with FIG. 1A. In the arrangement previously suggested (as in FIG. 1A) one had $T_a^{(v)}=1$ second whereas in accordance with my invention as in FIG. 2A one has $T_a^{(v)}=5$ milliseconds. A similar situation applies to the time interval during which a valve remains open. In the arrangement previously suggested (as in FIG. 1A) one had $T_b^{(v)}=2$ seconds whereas in FIG. 2A one has $T_b^{(v)}=100$ milliseconds. Thus, for all practical purposes, the openings and closings of the valve in FIG. 2A may be considered as instantaneous or almost instantaneous.

Rapid or almost instantaneous openings and closings of the valve have an important and far reaching influence on the performance of a telemetering system in a measuring while drilling operation. The pressure variations detected at the earth's surface in accordance with my invention (FIG. 2B) show no similarity whatever to the pressure variations obtained by means of a slow acting valve (FIG. 1B). I have previously pointed out the existence of equations (6), (7), and (8) which show relationships between the events illustrated in FIG. 1A and those illustrated in FIG. 1B. Analogous relationships do not exist between the events in FIGS. 2A and 2B.

As shown in FIGS. 1A and 1B, the opening of the valve produced a corresponding decrease in the mud pressure at the surface of the earth, and conversely, the closing of the valve produced a corresponding increase in pressure.

For the sake of emphasis I wish to repeat that in the prior art the opening of the valve produced a single event namely a decrease in pressure and the subsequent closing of the valve produced another single event—an increaase in pressure. On the other hand in my invention the fast opening of the valve as in FIG. 2A produces two events: a rapid decrease and subsequent increase in pressure (negative pulse "M" as in FIG. 2B). This is in contrast to the case shown in FIG. 1A and FIG. 1B where an opening and a subsequent closing of the valve is required in order to produce a decrease and a subsequent increase in pressure. Furthermore, the fast closing of the valve as in FIG. 2A produces an increase and a subsequent decrease of the mud pressure (positive pulse "N" as in FIG. 2B). Such an increase and subsequent decrease in pressure does not occur in the arrangements suggested in the prior art. In my invention, there are two shock waves produced by a single operation of the valve. A wave form such as shown in FIG. 2B, which comprises both a negative and a positive pulse, will be referred to in this specification as a "valve wavelet". Pressure pulses associated with a valve wavelet have a onset rate of several thousand psi/sec. and are of short duration.

It is of interest to point out the rapidity of the phenomena associated with the observed valve wavelets. The times involved in FIG. 2B are as follows:

$t_1^{(s)}$ = OK is the time of appearance of the negative pulse "M";

$t_2^{(s)}$ = OL is the time at which the negative pulse "M" decayed;

$t_3^{(s)}$ = OM is the time of appearance of the positive pulse "N";

$t_4^{(s)}$ = ON is the time at which the positive pulse "N" decayed.

The time interval $T_n^{(s)}$ representing the "length" of the negative pulse "M" (or the positive pulse "N") is 100 milliseconds, whereas the time interval $T_m^{(s)}$ from the appearance of the negative pulse "M" to the appearance of the positive pulse "N" is 110 milliseconds. Thus, the total period of flow as shown in FIG. 2B; i.e., $$T_u^{(s)} = T_n^{(s)} + T_m^{(s)} \qquad (9)$$

is 210 milliseconds whereas the total period of flow as shown in FIG. 1B (see equation 5) was $T_t^{(s)}$ = 4 seconds.

The graphs in FIGS. 1A, 1B, 2A, and 2B have been simplified and idealized by eliminating ripples and other extraneous effects. It should also be noted (see FIG. 2B) that the bypass valve is at least partially open during the time interval from $t_1^{(s)}$ to $t_4^{(s)}$. During this time interval, there is a slow pressure decline which is eliminated at the detection point by an appropriate filter. Such a pressure decline is not shown in the graph of FIG. 2B.

It should also be pointed out that the numerical values attached to FIGS. 2A and 2B are given merely as an example. These values should not be interpreted as restricting my invention to any particular example given.

The process as explained in connection with FIGS. 2A and 2B will be referred to as relating to a "regime of hydraulic shock waves". Thus, a distinction is made between the regime of hydraulic shock waves as in FIGS. 2A and 2B and the regime of slow variations of pressure as in FIGS. 1A and 1B.

By providing a regime of hydraulic shock waves, I obtained a telemetring system by means of which large amounts of information can be transmitted per unit of time. Such a system is considerably better adapted to satisfy current commercial requirements than the one which is based on the regime of slow variations of pressure.

The valve, in accordance with my invention, is operated by the output of one or more sensors for sensing one or more downhole parameters in the earth's subsurface near the drill bit. One single measurement of each parameter is represented, by a succession of valve wavelets. Each valve wavelet corresponds to a single opening and closing of the valve.

The succession of valve wavelets (which represents the useful signal) when detected at the earth's surface is usually mixed with various interfering signals such as those produced by the operation of the pump and by other drilling operations. In a typical drilling arrangement, a large pump located at the surface is used to pump drilling mud down the drill stem through the bit and back to the surface by way of annulus between the drill pipe and the well bore. The interfering effects due to the pump are eliminated in this invention by a process which takes into account the periodicity of these effects. Other effects assocated with drilling operations usually appear as noise signal comprising a relatively wide frequency spectrum. This noise signal is in some instances white noise and in other instances it departs considerably from white noise. A digital filtering system which may be a matched filter or pulse shaping filter or a spiking filter is employed to remove the noise signal. The matched filter maximizes the signal to noise ratio at the reception point, a pulse shaping filer minimizes the mean square difference between a desired output and the actual output, whereas a spiking filter transforms the useful signal by contracting it into one which is sufficiently sharp so that it can be distinguished against a background noise. A special technique is applied to adapting these filters to the objectives of this invention. Such a technique requires storage and subsequent reproduction of two reference signals. The first reference signal is a wavelet produced by the opening and closing of the valve and the second reference signal represents noise due to the drilling operations. Detection and storage of the first reference signal is obtained by removing the weight on the bit and stopping the actual drilling (but maintaining the mud pumps in normal action). Thus, a signal is obtained which is free from the ambient noise. Detection and storage of the second reference signal is obtained when drilling is in progress during a period of time when the valve is closed. An appropriate digital computing system is arranged to receive the data representing one or both of these reference signals, and derives from the data a memory function for the matched filter, for the pulse shaping filter, or for the spiking filter.

One aspect of my invention pertains to improvements involving the bi-stable action of valve assembly 40 of the special telemetry tool 50. Another aspect of my invention concerns the provision of a special hydraulically operated mechanical arrangement that will periodically positively move the valve 40 to the closed position. In addition there is provided an electric system that will inhibit operation of the valve 40 in case of an electrical failure in the downhole apparatus.

Further aspects of my invention concern improvements involving the power supply 95 and the power drive 104 of the special telemetry tool 50. Such improvements serve to greatly increase the number of satisfactory valve calculations attainable without downhole battery recharge or replacement.

Another aspect of my invention concerns improvements in pulse time codes wherein only short pulses of substantially constant duration are transmitted, and the time intervals between successive pulses are the measures of the magnitude of the relevant parameter. In addition there is disclosed a system for improving the precision and accuracy in the transmission and detection of mud pressure pulses generated at the downhole equipment, which system involves the generation at the downhole equipment and the transmission of a group of at least 3 unequally spaced mud pressure pulses for each information carrying single pulse, and the provision of appropriate equipment at the surface for detecting and translating the transmitted pulse groups.

The novel features of my invention are set forth with particularity in the appended claims. The invention both as to its organization and manner of operation with further objectives and advantages thereof, may best be presented by way of illustration and examples of embodiments thereof when taken in conjunction with the accompanying drawings.

BRIEF DESCRIPTION OF DRAWINGS

FIG. 1A shows schematically the operation of a slow acting valve as was suggested in the prior art. FIG. 1B shows schematically pressure variations detected at the earth's surface and resulting from the operation of the valve as shown in FIG. 1A. Both FIGS. 1A and 1B describe a condition referred to in this specification as a "regime of slow variations of pressure";

FIG. 2A shows schematically the operation of a fast acting valve in accordance with my invention.

FIG. 2B shows schematically pressure variations detected at the earth's surface and resulting from the operation of the valve as shown in FIG. 2A. Both FIGS. 2A and 2B describe a condition referred to in this specification as a "regime of hydraulic shock waves".

FIG. 5B shows schematically a power supply including a capacitor charging and discharging arrangement for providing the required power and energy for actuating the valve of the special telemetry tool.

FIGS. 6A, 6B and 6C show diagrammatically the operation of hydraulic "auto close" of the signalling valve.

FIG. 6D is an engineering drawing of the arrangement shown in FIGS. 6A, 6B, and 6C.

FIG. 7A shows schematically the "sub" and housing structure for the special telemetry tool.

FIG. 7B shows schematically the cross-section shape of centralizers that may be utilized with the structure of FIG. 7A.

FIG. 7C shows schematically special connector means that may be utilized for joining the sub-sections of housing portion 250$b$ of FIG. 7A.

FIG. 8A corresponds to $T_a^{(v)}=1$ second and $T_b^{(v)}=2$ seconds,

FIG. 8B corresponds to $T_a^{(v)}=200$ milliseconds and $T_b^{(v)}=1$ second.

FIG. 8C corresponds to $T_a^{(v)}=60$ milliseconds and $T_b^{(v)}=0.5$ seconds.

FIG. 8D corresponds to $T_a^{(v)}=20$ milliseconds and $T_b^{(v)}=0.25$ seconds.

FIG. 8E corresponds to $T_a^{(v)}=5$ milliseconds and $T_b^{(v)}=10^{-1}$ seconds;

FIGS. 10A to 10G provide a graphic illustration of certain wave forms and pulses as they vary with time, which are shown in order to aid in explanation of the operation of the equipment in FIG. 9. The time axes in FIGS. 10A to FIG. 10C and the time axes of FIG. 10D to FIG. 10G are positioned one below the other so that one can compare these signals and wave forms in their time relationship one to another. More specifically, FIGS. 10A to 10G can be described as follows:

FIG. 10A contains three graphs showing three components of a signal detected at the top of the drill hole. These components represent, respectively, an information carrying a signal, pump noise, or in the case of use of several pumps in tandem, the noise from the group of pumps and random noise.

FIG. 10B contains three graph showing respectively the delayed information carrying signal, the delayed pump noise and the delayed random noise. The delay is by an amount $T_p$ representing the period of the operation of the pump (when several pumps are used the pressure variations, although not sinusoidal, are still periodic because the tandem pumps are maintained relatively close to being "in phase").

FIG. 10C contains two graphs showing, respectively, differences of the corresponding graphs in FIG. 10A and FIG. 10B. One of these graphs represents random noise while the other graph represents an information carrying signal.

FIG. 10D shows a function representing the output of a digital filter or of a cross-correlator in the embodiments of my invention. This function is substantially similar to that representing the information carrying signal in FIG. 10C. The digital filter used herein may be a matched filter, a pulse shaping filter or a spiking filter.

FIG. 10E shows a function similar to that of FIG. 10D but delayed in time by an appropriate time interval.

FIG. 10F shows a function as that in FIG. 10E but reversed in time.

FIG. 10G results from a comparison of graphs of FIGS. 10D and 10F and represents instants corresponding to pulses that occur in coincidence in these graphs.

FIG. 19 shows schematically a portion of the above ground equipment comprising a spiking filter wherein a spiking filter is used to transform a single valve wavelet into a corresponding single spike.

FIG. 21A corresponds to a desired spike at time index 0; FIG. 21B corresponds to a desired spike at time index 1; FIG. 21C corresponds to a desired spike at time index 2.

FIG. 22 shows schematically an arrangement for determining the performance parameter P of a spiking filter.

FIG. 26A shows schematically a pulse time code system in accordance with the prior art.

FIG. 26B shows schematically a pulse time code system of my invention, wherein the magnitude of the parameter being transmitted is represented by the time interval between successive single short pulses of substantially constant time duration.

FIG. 26C further illustrates schematically the pulse time code system of FIG. 26B.

FIG. 26D shows schematically a pulse time code system of the type shown by FIGS. 26B and 26C but wherein "triple group" pulses are utilized.

FIGS. 28B, 28C, 28D and 28E are graphs to aid in explanation and understanding of the operation of the circuitry of FIG. 28A.

FIG. 29 is a schematic block diagram of downhole circuitry for generating the "triple group" pulses shown in FIG. 26D.

FIG. 30 is a schematic diagram showing the principles of circuitry that can accomplish the pulse time code of my invention.

It should be noted that identical reference numerals have been applied to similar elements shown in some of the above figures. In such cases the description and functions of these elements will not be restated in so far as it is unneccessary to explain the operation of these embodiments.

DESCRIPTION OF THE PREFERRED EMBODIMENTS

I.

GENERAL DESCRIPTION OF APPARATUS FOR DATA TRANSMISSION WHILE DRILLING

Figure 3:
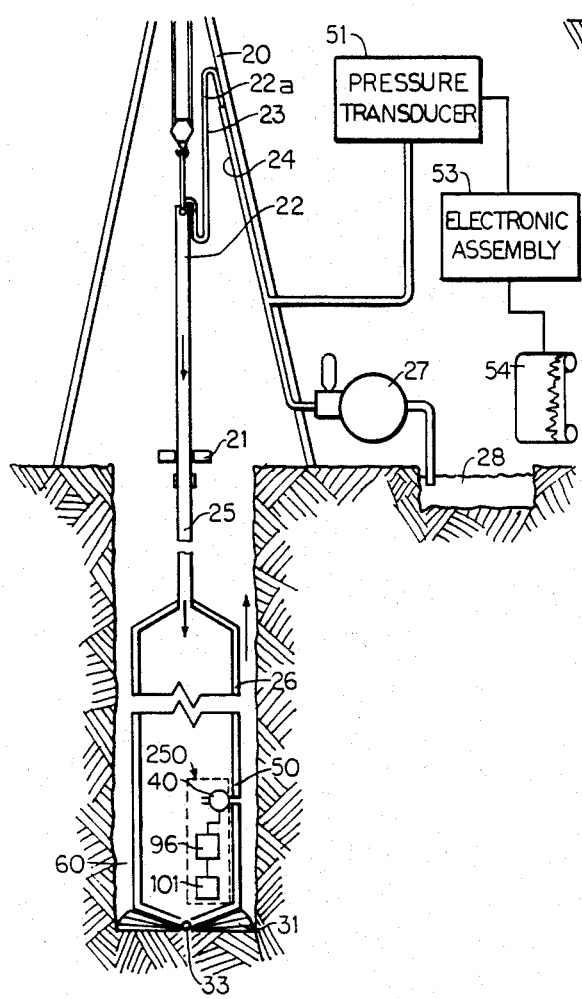
FIG. 3 schematically and generally illustrates a well drilling system equipped to simultaneously drill and to make measurements in accordance with some aspects my invention.

FIG. 3 illustrates a typical layout of a system embodying the principles of this invention. Numeral 20 indicates a standard oil well drilling derrick with a rotary table 21, a kelly 22, hose 23, and standpipe 24, drill pipe 25, and drill collar 26. A mud pump or pumps 27 and mud pit 28 are connected in a conventional manner and provide drilling mud under pressure to the standpipe. The high pressure mud is pumped down the drill string through the drill pipe 25 and the standard drill collars 26 and then through the special telemetry tool 50 and to the drill bit 31. The drill bit 31 is provided with the usual drilling jet devices shown diagramatically by 33. The diameters of the collars 26 and the telemetry tool 50 have been shown large and out of proportion to those of the drill pipe 25 in order to more clearly illustrate the mechanisms. The drilling mud circulates downwardly through the drill string as shown by the arrows and then upwardly through the annulus between the drill pipe and the wall of the well bore. Upon reaching the surface, the mud is discharged back into the mud pit (by pipes not shown) where cuttings of rock and other well debris are allowed to settle and to be further filtered before the mud is again picked up and recirculated by the mud pump.

Interposed between the bit 33 and the drill collar 26 is the special telemetering transmitter assembly or telemetry tool designated by numeral 50. This special telemetering transmitter assembly 50 includes a housing 250 which contains a valve assembly, or simply a valve 40, an electronic processing assembly 96, and sensors 101. The valve 40 is designed to momentarily by-pass some of the mud from the inside of the drill collar into the annulus 60. Normally (when the valve 40 is closed) the drilling mud must all be driven through the jets 33, and consequently considerable mud pressure (of the order of 2000 to 3000 psi) is present at the standpipe 24. When the valve 40 is opened at the command of a sensor 101 and electronic processing assembly 96, some mud is bypassed, the total resistance to flow is momentarily decreased, and a pressure change can be detected at the standpipe 24. The electronic processing assembly 96 generates a coded sequence of electric pulses representative of the parameter being measured by a selected sensor 101, and corresponding openings and closings of the valve 40 are produced with the consequent corresponding pressure pulses at the standpipe 24.

Numeral 51 designates a pressure transducer that generates electric voltage representative of the pressure changes in the standpipe 24. The signal representative of these pressure changes is processed by electronic assembly 53, which generates signals suitable for recording on recorder 54 or on any other display apparatus. The chart of recorder 54 is driven by a drive representative of the depth of the bit by means well known (not illustrated).

II.

GENERAL DESCRIPTION OF SPECIAL TELEMETERING TRANSMITTER

Figure 4B:
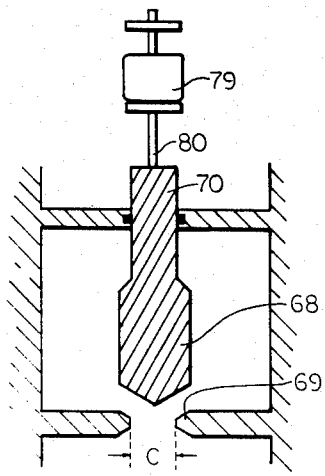
FIG. 4B shows schematically a portion of the arrangement of FIG. 4A.
Figure 4A:
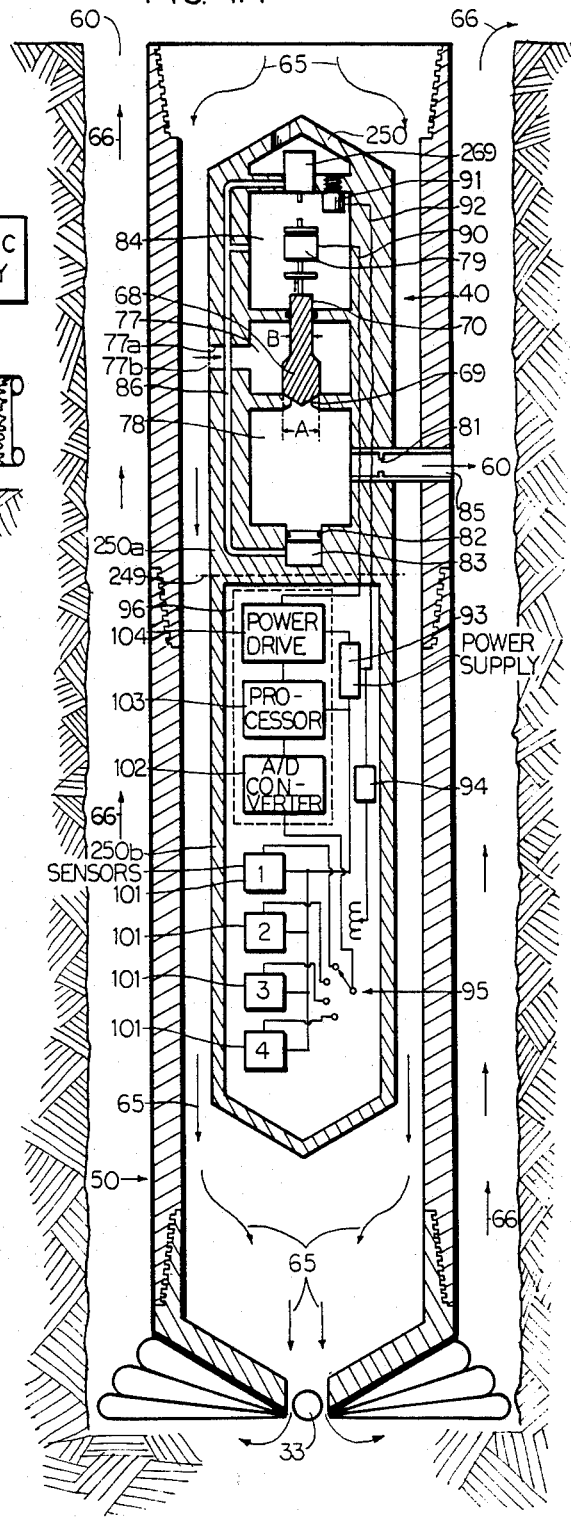
FIG. 4A shows schematically a portion of the subsurface equipment including a special telemetry tool in accordance with my invention.

FIG. 4A shows certain details of the special telemetering transmitter 50. Certain of these and other details have also been described in the above referred to copending application Ser. No. 857,677 filed by S. A. Scherbatskoy, of which this application is a continuation in part. FIG. 4A is diagrammatic in nature. In an actual tool, the housing 250, which contains the valve 40, the electronic processing assembly 96, and the sensors 101, is divided into two sections 250a and 250b. The upper portion 250a (above the dotted line 249) contains the valve assembly 40 and associated mechanisms and, as will be pointed out later in the specification, is of substantially larger diameter than 250b. The lower section 250b (below the dotted line 249) contains the electronic processing assembly 96, sensors 101, and associated mechanisms, and as will be explained later in the specification, has a substantially smaller diameter than the upper section 250a. As shown in FIG. 4A, the drilling mud circulates past the special telemetry tool 250a, 250b downwardly (as shown by the arrows 65) through the bit nozzle 33 and then back (as shown by the arrows 66) to the surface in annulus 60 and to the mud pit 28 by pipe means not shown. The valve assembly 40 comprises valve stem 68 and valve seat 69. The valve stem and seat are constructed in such manner that the cross sectional area of the closure A is slightly larger than the cross sectional area B of the compensating piston 70. Thus, when the pressure in chamber 77 is greater than that in the chamber 78, the valve stem 68 is forced downwardly; and the valve 40 tends to close itself more tightly as increased differential pressure is applied.

The fluid (mud) pressure in chamber 77 is at all times substantially equal to the fluid (mud) pressure inside the drill collar, designated as 26 in FIG. 3 and 50 in FIG. 4A, because of the opening 77a in the wall of the assembly 250. A fluid filter 77b is interposed in passageway 77a in order to prevent solid particles and debris from entering chamber 77. When the valve 40 is closed, the fluid (mud) pressure in chamber 78 is equal to the fluid (mud) pressure in the annulus 60. When the valve 40 is open and the pumps are running mud flow occurs from chamber 77 to chamber 78 and through orifice 81 to the annulus 60 with corresponding pressure drops.

Double acting electromagnetic solenoid 79 is arranged to open or close valve 40 in response to electric current supplied by electric wire leads 90.

Let $P_{60}$ indicate the mud pressure in the annulus 60, $P_{77}$ the pressure in chamber 77, and $P_{78}$ the pressure in chamber 78. Then, when valve 40 is closed, one has $P_{78}=P_{60}$. When the pumps 27 are running and valve 40 is "closed", or nearly closed, and $P_{77}>P_{78}$ the valve stem 68 is urged towards the valve seat 69. When valve 40 is in the "open" condition (i.e., moved upwardly in the drawing) flow of mud from chamber 77 to the annulus 60 results; and because of the resistance to flow of the orifice C (FIG. 4B), one has the relationship $P_{77}$ $P_{78}>P_{60}$. Chambers 83 and 94 are filled with a very low viscosity oil (such as DOW CORNING 200 FLUID, preferably of viscosity 5 centistokes or less) and interconnected by passageway 86. Floating piston 82 causes the pressure $P_{83}$ in the oil filled chamber 83 to be equal at all times to $P_{78}$. Thus, at all times $P_{78}=P_{83}=P_{84}$. Therefore, when the valve 40 is "open", since $P_{78}=P_{84}$ and $P_{77}>P_{84}$, the valve 40 is urged towards the "open" position by a force $F=(\text{area B}) (P_{77}-P_{84})$. The valve 40 can therefore be termed bistable; i.e., when "open" it tends to remain "open" and when "closed" it tends to remain "closed". Furthermore, when nearly open it tends to travel to the open condition and when nearly closed, it tends to travel to the closed condition. The valve 40 can therefore be "flipped" from one state to the other with relatively little energy. The valve action can be considered the mechanical equivalent of the electric bi-stable flip-flop well known in the electronics art.

FIG. 4B shows the valve 40 in the open condition; whereas, in FIG. 4A it is closed.

Referring again to FIG. 4A, numeral 91 indicates an electric "pressure switch" which is electrically conductive when $P_{77}>P_{78}$ (pump running) and electrically non-conductive when $P_{77}=P_{78}$ (pumps shut down—not running). Wire 92 running from pressure switch 91 to power supply 93 can, therefore, turn the power on or off. Also, by means of electronic counter 94 and electromagnetic sequence switch 95, any one of the four sensors 101 can be operatively connected to the electronic processing assembly 96 by sequentially stopping and running the mud pumps 27 or by stopping then running the pumps in accordance with a predetermined code that can be interpreted by circuitry in element 94.

III.

DESCRIPTION OF ELECTRONIC PROCESSING ASSEMBLY PORTION OF SPECIAL TELEMETRY TOOL

We have described the operation of the bi-stable valve 40 and the sequence switch 95 which makes the selective electrical connection of the various sensors 101 to the electronic processing assembly 96.

Figure 5A:
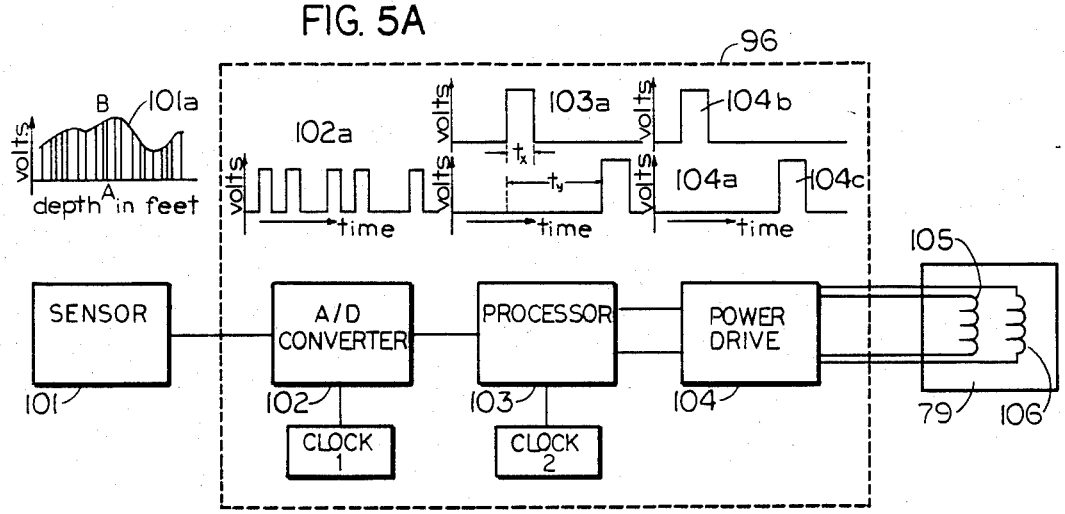
FIG. 5A shows, schematically and more in detail, the electronic processing assembly comprised within the dotted rectangle in FIG. 4A.

For further details of the electronic processing assembly 96 reference is made to FIG. 5A, where like numbers refer to like numbers of FIG. 4A.

Various types of sensors that generate electric signals indicative of a downhole parameter are well known. Examples are gamma ray sensors, temperature sensors, pressure sensors, gas content sensors, magnetic compasses, strain gauge inclinometers, magnetometers, gyro compasses, and many others. For the illustrative example of FIG. 5A, I have chosen a gamma ray sensor such as an ionization chamber or geiger counter or scintillation counter (with appropriate electronic circuitry). All these can be arranged to generate a DC voltage proportional to the gamma ray flux which is intercepted by the sensor.

It is understood that the switching from one type sensor to another as accomplished by switch mechanism 95 of FIG. 4A is well within the state of the art, (electronic switching rather than the mechanical switch shown is preferable in most cases). Consequently, in FIG. 5A for reasons of clarity of description, only a single sensor 101 has been shown. Also, the power supply 93 and mud pressure actuated switch 91 of FIG. 4A are not illustrated in FIG. 5A.

In FIG. 5A, the sensor 101 is connected in cascade to A/D convertor 102, processor 13, and power drive 104. The power drive 104 is connected to windings 105 and 106 of the double acting solenoid designated as solenoid 79 in FIG. 4A. The power drive 104 may be similar to that shown by FIG. 3E of the parent application. The operation is as follows: the sensor 101 generates an output electric analog signal as represented by the curve 101a shown on the graph immediately above the sensor rectangle 101. The curve shows the sensor output as a function of the depth of the telemetering transmitter 50 in the borehole. The A/D converter converts the analog signal of 101 into digital form by measuring in succession the magnitude of a large number of ordinates of curve 101a and translating each individual ordinate into a binary number represented by a binary word. This process is well known in the art and requires no explanation here. It is important, however, to realize that whereas graph 101a may represent the variation of the signal from the transducer in a matter of hours, the graph 102a represents one single ordinate (for example, AB of the curve 101b). Thus, the time scale of the axis of absissas on FIG. 102a would be in seconds of time and the whole graph 102a represents one binary 12 bit word, and in actuality represents the decimal number 2649. Thus, each 12 bit word on graph 102a represents a single ordinate such as the ordinate AB on the graph 101a. The usual binary coding involves time pauses between each binary word. After the pause a start up or precursor pulse is transmitted to indicate the beginning of the time interval assigned to the binary word. This precursor pulse is not part of the binary word but serves to indicate that a binary word is about to commense. The binary word is then transmitted which is an indication of the value of an ordinate on graph 101a; then a pause (in time) followed by the mext binary word representing the magnitude of the next ordinate, and so on, in quick succession. The continuous curve of graph 101a is thus represented by a series of binary numbers or words each representing a single point on the graph 101a. It is important to understand here that between each binary word there is always a pause in time. This pause (during which no signals are transmitted) is frequently several binary words long, and the pause will be employed for an important purpose which will be explained later in the specification. In order to permit decoding at the surface, the clock No. 1 must be rigorously constant (and in synchronism with the corresponding clock 212 or 309 located at the surface), and it generates a series of equally timed spaced pulses in a manner well known in the art of electronics.

The graph 103a represents a single bit of the binary word 102a, and the axis of abcissas here again is quite different from the previous graphs. The time on graph 103a is expressed in milliseconds since graph represents only a single bit. Each single bit is translated into two electric pulses each of time duration $t_x$ and separated by a time interval $t_y$. Graph 104a is a replica of 103a, which has been very much amplified by the power drive 104. Electric impulse 104b is applied to solenoid winding 105 (which is the valve "open" winding), and electric impulse 104c is applied to solenoid winding 106 (which is the valve "close" winding). The valve 40 of FIG. 4A thus is opened by pulse 104b and closed by pulse 104c and, therefore, the valve 40 remains in the "open" condition for approximately the time $t_y$. The times $t_x$ are adjusted to be proper for correct actuation of the solenoid windings and the time $t_y$ is proportioned to open the valve 40 for the correct length of time. Both of these times are determined and controlled by the clock #2.

In telemetering information from a sensor to the earth's surface, I provide appropriate pauses between transmission of successive binary words. Because of these pauses, it is possible to store in an appropriate electronic memory at the surface equipment the noise caused by the drilling operation alone (without the wavelet). The necessary arrangements and procedures for doing this will be described later in this specification.

IV.

DESCRIPTION OF POWER SUPPLY FOR SPECIAL TELEMETERING TRANSMITTER

As was pointed out previously, the valve 40 of FIG. 4A must be very fast acting, and to drive it fast requires considerable power. (It has been determined as a result of appropriate testing that such a valve requires about ½ to ¾ horsepower to operate at the necessary speed).

Although this power is very substantial, it is applied only very briefly, and consequently requires only small energy per operation.

In actual operation during tests, it was found that ½ horsepower applied for about 40 milliseconds provided the required energy to produce a satisfactory single valve actuation. This energy can be calculated to be about 15 Joules. A battery pack that is sufficiently small to be contained within housing 250b of FIG. 7A can provide approximately 4 million Joules, without requiring recharge or replacement. The system is therefore capable of generating 130,000 complete valve operations (open plus close). In actuality the energy consumption is less than 15 Joules per operation. The inductance, the Q, and the motional impedance of the solenoid winding cause the current build up to be relatively slow and along a curved rise as shown in curve 272A of FIG. 5C and 300, 301, of FIG. 6E. Thus the total energy per pulse is substantially less than 15 Joules and has been measured at 9 Joules thus providing a capability of 216,000 complete valve actuations. (A still greater capability is achieved by use of the circuitry described later in connection with FIG. 5C.) From the above, it can be seen that providing the necesary downhole energy from batteries for a practical telemetry tool is quite feasible. Providing the necessary very large power (½ horsepower), however, presents difficult problems.

It was clear that the solution to such a problem would involve the storage of energy in a mechanism that could be caused to release it suddenly (in a short time) and thus provide the necessary short bursts of high power. One such mechanism was "hammer action" which was utilized in the tool disclosed in my co-pending application, but which has been found to be sometimes insufficient. Other mechanisms considered early were the use of compressed air, compressed springs and others. Capacitor energy storage systems required large values of capacitance: The energy stored in a capacitor varies as the first power of the capacitance and as the square of the stored voltage, and since low inductance, fast acting, solenoid drive windings are required, the necessity of low voltage devices become apparent, initial calculation indicated that unduly large capacitors would be required.

After further evaluation, it appeared that an operable system might be feasible. By mathematical analysis and by experiments and tests it was determined that a set of optimum circuit parameters would be as follows:

1. Inductance of solenoid winding: 0.1 henrys when in the actuated position and 0.07 henrys when in the non-actuated position (i.e., a tapered armature solenoid).
2. Resistance of solenoid winding: 4.5 ohms.
3. Voltage at which energy is stored: 50 volts.
4. Magnitude of storage capacitor: 10,000 mfd.
5. Current capability of drive circuit: 10 amperes.

It was determined that in order to have fast solenoid action, low inductance windings are desirable. It was also determined that current capabilities of electronic drive circuits can be increased well beyond 10 amperes. Low voltage, however, requires unduly large values of capacitance.

Recent advances in so called molten salt batteries have produced energy sources of very good compactness. The same recent technology has also developed capacitors of extraordinarily high values, 10 farads in as little space as 1 cubic inch. These were unacceptable because the required heating to a high temperature (500° C.) which was deemed impractical; and the cost was prohibitive. Consequently, still further efforts were required. Following a thorough and lengthy investigation, finally it was discovered that a tantalum slug capacitor made in accordance with the latest developments would meet the specifications if the other parameters and factors outlined above were optimized to match the characteristics of such capacitors.

From the above it can be seen that at least 216,000 complete valve operations can be realized from one battery chrge. Assuming that the telemetry system can provide adequate continuous data by transmitting five pulses per minute, the system is capable of operating continuously in a bore hole for a period of 440 hours. It must be pointed out however that continuous operation is often not necessary. The tool can be used only intermittently on command by the circuitry controlled by switch 91 and elements 94 and 95 of FIG. 4A.

Furthermore, as will be explained later, when advantage is taken of the improved circuitry of FIG. 5C an even greater number of valve operations can be achieved. Operation at a rate of one pulse per second is considered practical.

There is another parameter to be determined: the proper recharging of the capacitor after discharge. The capacitor can be charged through a resistor connected to the battery, (or other energy source) but this sometimes proved to be slow because as the capacitor became partially charged, the current through the resistor diminished, and at the end of the charge cycle, the charging current approached zero. If the ohmic valve of the resistor is made small, the batteries would be required to carry excessive momentary current because the initial current surge during the charging cycle would exceed the value for maximum battery life. The best method is to charge the capacitor through a constant current device. The capacitor would then be charged at an optimum charging current corresponding to the optimum discharge current for the particular type of battery for maximum energy storage. By correctly determining the charging current, a substantial increase (sometimes a factor of 2 or 3) in the amount of energy that is available from a given battery type can be achieved. Constant current devices are well known and readily available electronic integrated circuits, and are available for a wide range of current values.

FIG. 5B shows schematically a power supply which may be incorporated in the power drive 104 of FIG. 4A including a capacitor charging and dischrging arrangement for providing the required power and energy for the windings of solenoid 79. In FIG. 5B, 450 indicates a battery or turbo generator or other source of direct current electric potential, 451 the constant current device, and 452 the capacitor. The capacitor is charged through the constant current device 451 and discharged via lead 453. The lead 454 provides the regular steady power required for the balance of the downhole electronics.

V.

DESCRIPTION OF HYDRAULIC "AUTO-CLOSE" SIGNALLING VALVE

I have also provided an arrangement which will operate in case of a malfunction which could occur when the valve is "stuck" in an open position for a long period of time. An arrangement for automatically closing the valve in case of such malfunction (indicated by reference numeral 269 in FIG. 4A) is illustrated diagramatically in connection with FIGS. 6A, 6B, and 6C.

As was pointed out earlier inthe specification, the valve is designed to have a hydraulic detent or bistable action; i.e., when opened by an impulse from the solenoid winding 105 it tends to remain open and later, when closed by an impulse from the solenoid winding 106, it tends to remain closed. It is possible that because of an electrical or mechanical malfunction the valve could become "stuck" in the open position. It should be noted that if such a malfunction occurs the drilling operation can proceed. Some wear would occur at the orifice 81 of FIG. 4A. However, the disturbance to the mud system hydraulics by having the valve open for long periods of time is not desirable; and even though drilling can continue, it is very advantageous to have the valve closed most of the time and opened only to produce the short pulses required to generate the hydraulic shock wave.

In the diagrammatic drawings of FIGS. 6A, 6B, and 6C, the rod 100 is used to push the valve closed by exerting a force downward on the rod 80 of FIG. 4B (the solenoid armature shaft).

Referring now to FIGS. 6A, 6B, 6C, and 6D, the upper end of the mechanism is now exposed to "drill pipe mud"; i.e., mud under the hydrostatic pressure plus the differential pressure across the bit; i.e., the difference in pressure between the inside of the tool 50 and the annulus 60. When the pumps are not running, the pressure at the zone 111 is hydrostatic only; and when the pumps are running, the pressure is hydrostatic plus differential. Since the differential pressure is of the order of 1000 to 2000 psi, a large pressure change occurs at the zone 111 when the pumps are started up (i.e., an increase of 1000 to 2000 psi). In FIG. 6A, when the pumps are not running, zones 112, 113 are at annulus pressure because tube 114 is connected to the chamber 84 which contains oil at annulus pressure (see FIG. 4A) and because the orifice 115 interconnects the zones 112 and 113.

Assume now that the pumps are started up. The pressure in zone 11 then increases substantially (i.e., by 1000 to 2000 psi) the piston 116 is pushed downward compressing the spring 107 (not illustrated in FIG. 6B) and the high pressure oil in zone 112 pushes the piston 108 downward and compresses the spring 110 (not illustrated). Thus, when the pumps are started up, the parts of FIG. 6A change to the configuration of FIG. 6B, and both the pistons 116 and 108 are in the downward position and the rod 100 is extended downwardly as shown.

Now because of the orifice 115 and the action of spring 110, the piston 68 is pushed upwardly with a velocity determined by the size of the orifice 115, the spring constant of spring 110, and the viscosity of the oil in the zones 112, 113. This velocity can be easily controlled and made equal to any desired value; as for example, a velocity such that the piston 108 will return to its original upward location in about 1 minute. Therefore, after one minute the arrangement assumes the configuration of FIG. 6C. For the same reasons, when the pump is stopped the action of the spring 107 and the orifice 115 will cause the piston 116 to rise back to the original condition of FIG. 6A.

It can be seen, therefore, that every time the mud pump is started the rod 100 will move downwards by the distance d as shown in FIG. 6B and then return to the normal retracted position. Since in normal drilling the pump is stopped every time a joint of drill pipe is added, it follows that every time a joint of drill pipe (usually 30 feet long) is added, the rod 100 will make a single downward excursion and then return to its original upward position.

As was pointed out previously, the rod 100 is arranged so that when it is extended downwardly it pushes solenoid armature shaft 80 of FIG. 4A downwardly and closes the valve. Thus, the device of FIGS. 6A, 6B, 6C, and 6D is a "safety" device; i.e., should the valve get stuck in the open position because of an electrical or mechanical malfunction, the valve will be forced shut after a maximum of 30 feet of drilling.

FIG. 6D shows the engineering drawing of the device diagrammatically illustrated in FIGS. 6A, 6B, and 6C. In the actual instrument, the device as illustrated in FIG. 6D is placed in the location 269 of FIG. 4A. Like numbers on FIG. 6D represent the elements having like numbers on FIGS. 6A, 6B, 6C, and FIG. 4A.

VI.

DESCRIPTION OF ELECTRONIC "FAIL SAFE" FOR SIGNALLING VALVE

The hydraulic "auto close" system described in connection with FIGS. 6A, 6B, 6C, and FIG. 6D will automatically close the valve every time the mud pumps are stopped and restarted, and thus any mechanical sticking of the valve can be remedied. There is a case, however, that requires further attention: If the "close" electric circuitry 103, 109 of FIG. 5A were to fail for any reason (e.g. a burned out solenoid winding) then the valve would reopen electrically, shortly after the hydraulic "auto close" device closed it.

Figure 6E:
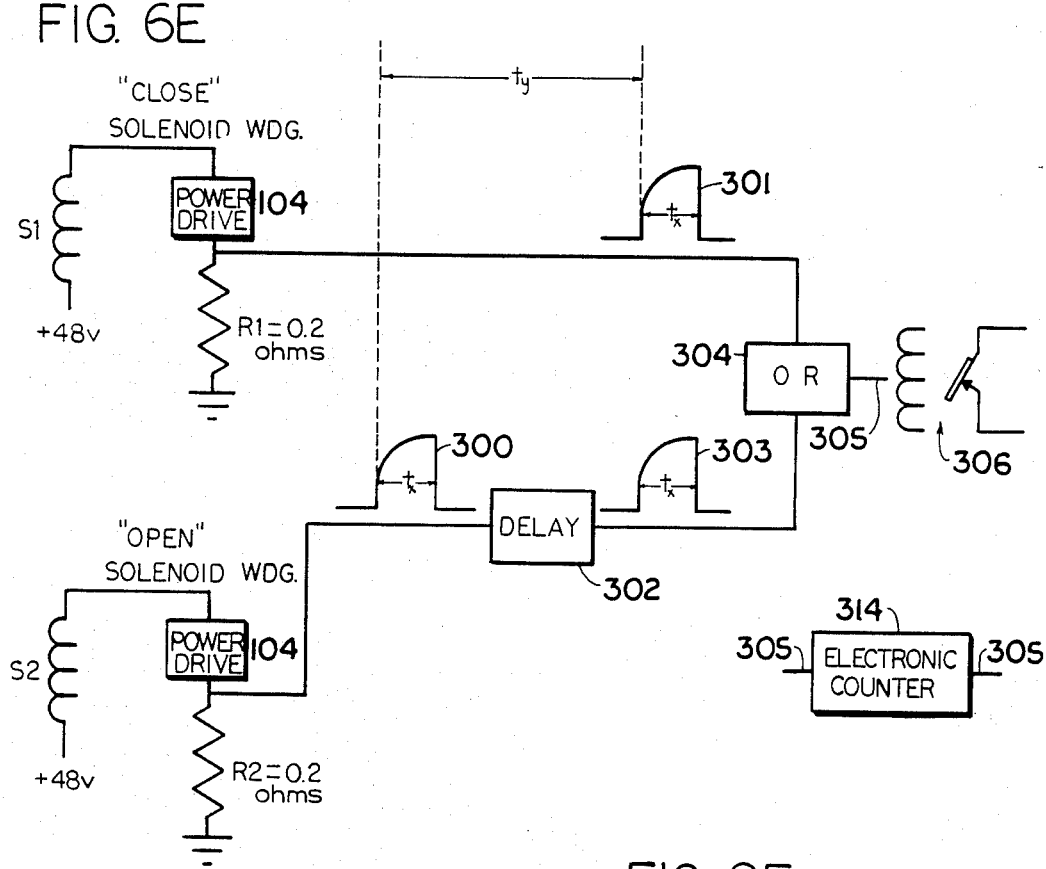
FIG. 6E shows schematically an electronic "fail safe" arrangement applicable to the signalling valve.

FIG. 6E shows an electric system that will inhibit operation of the valve in case of an electrical failure in the downhole apparatus. $S_1$ designates the winding of the solenoid that "closes" the valve and $S_2$ the winding of the solenoid that "opens" the valve. The resistor $R_1$ is connected in series with the portion of the solenoid drive 104 which actuates the "close" solenoid winding $S_1$. The resistor $R_2$ is connected in series with the portion of the solenoid drive 104 which actuates the "open" solenoid winding $S_2$. These resistors are of very low ohmic value (about 0.05 to 0.2 ohms). It is understood that the operation of the system described in detail with respect to FIG. 5A in this specification is as follows: The "open" electric current pulse is generated first and is shown diagramatically of FIG. 6E as the pulse 300; the "close" electric current pulse is generated later (after a time $t_y$) and is shown diagramatically as 301 in FIG. 6E. It must be noted that these electric pulses 300 and 301 represent the current drawn by the solenoid windings and not the voltage applied (the resistors $R_1$ and $R_2$ generate voltage drops $R_1 i_1$ and $R_2 i_2$, and $i_1$, $i_2$ indicate the currents through the respective solenoid windings); consequently, if one of the windings $S_1$ or $S_2$ is burned out or open circuited, no current will flow and no corresponding pulse will be produced (similarly, any other electrical failure will cause no current to flow through one or both of the resistors $R_1$, $R_2$).

The magnitude of the time $t_y$ of FIG. 6E and the length of the time $t_x$ has been explained and defined previously in this specification in connection with FIG. 5A.

The delay of the delay element 302 is equal to $t_y$. In other words, block 302 produces at its output a pulse, identical to the input pulse but delayed by the Time $t_y$. Such delay systems are well known and need no description here.

Since the delay of element 302 is equal to $t_y$, the pulse as shown by 303 will be in time coincidence with the pulse 301.

304 is an anti-coincidence circuit (also known as a OR gate) and produces at its output 305 an electric signal only when one of the pulses 301, 303 is impressed on it, but produces no output when both pulses 301 and 303 are present. 306 is a relay actuated by the signal on lead 305 and is arranged to disconnect the power to the downhole tool. Thus, if only a "close" pulse is present (without the "open" pulse) or if only an "open" pulse is present (without the "close" pulse), the power to the downhole power drive is disconnected then be closed mechanically by the "auto close" hydraulic system described in connection with FIG. 6D.

As an alternate arrangement in FIG. 6E, the relay 306 (which of course can be an electronic switch comprising transistors) can be arranged to interrupt the power only to the circuitry for the "opening" solenoid. This would have certain advantages because the "closing" circuitry will continue to function, and one of the objectives is to insure the "closing" of the valve. Furthermore, an electronic counter 314 may be interposed between the "OR" circuit and the relay circuit 306 so that a single electric malfunction will not disconnect the power. The power will then be disconnected only after, for example, 2, 4, or 8 successive malfunctions.

VII.

DESCRIPTION OF AUTOMATIC CUT-OFF FOR SIGNALLING VALVE POWER DRIVE

Figure 5C:
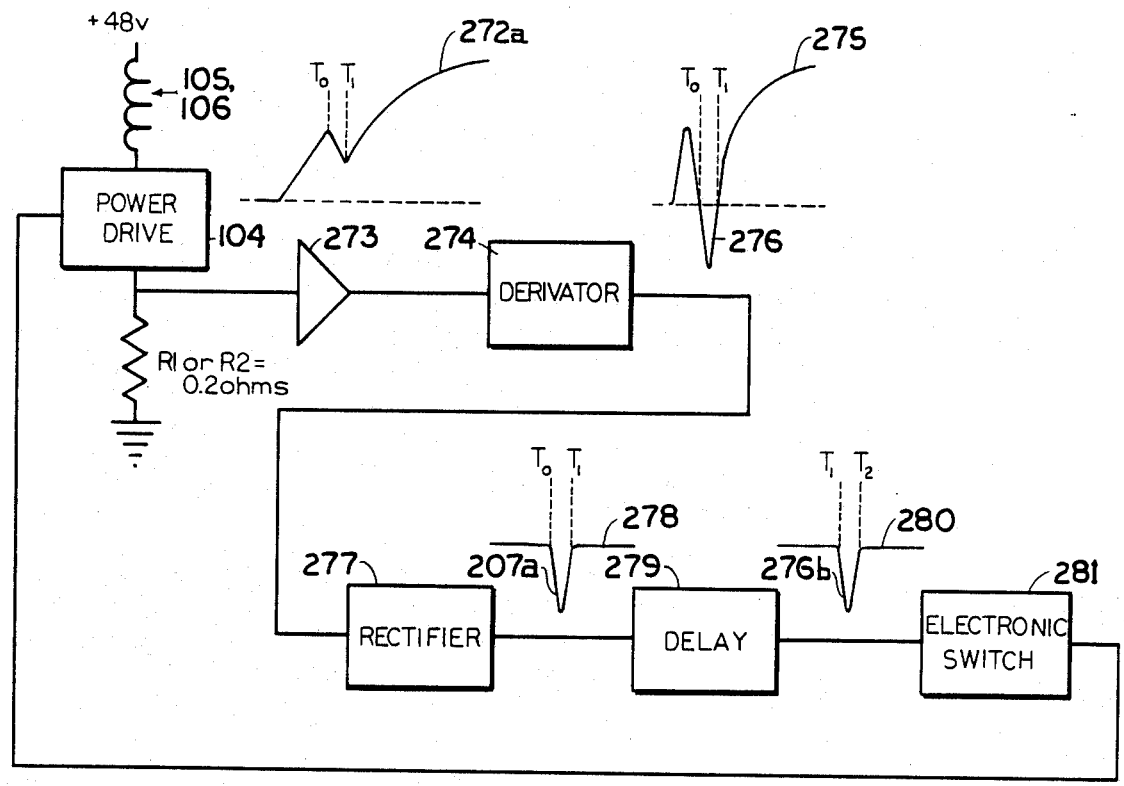
FIG. 5C shows schematically electronic circuitry which may be utilized to accomplish automatic cut-off of the power drive for the valve of the special telemetry tool.

As has been pointed out previously in this specification, very fast operation of the valve 40 of FIG. 4A is important. The requisite shock wave will not be produced if the valve operation is slow. Since the valve and its drive mechanism contain considerable mass, substantial power is necessary to open or close the valve in the time that is considered desirable. This power is of the order of $\frac{1}{2}$ to $\frac{3}{4}$ horsepower and can be provided by a power supply which has been described in section IV hereof. As in all designs of this nature, a margin of power is required in order to be sure that the valve always opens or closes upon command. The various electronic "logic circuits" and "power drive circuits" shown in FIG. 5A are designed to provide rectangular voltage pulses 104b and 104c that have a duration of about 40 to 50 milliseconds in order to make sure thati the solenoid windings 105 and 106 are energized for a sufficient time to ensure the operation of the valve. FIG. 5E shows the voltage pulse 104b of FIG. 5A in greater detail. At the time 0 the voltage is suddenly applied the power drive 104 and rises almost instantaneously to the value shown by numeral 270, remains at this voltage value for 50 milliseconds, and then is cut off and falls (again almost instantaneously) to the value 0.

Figure 5D:
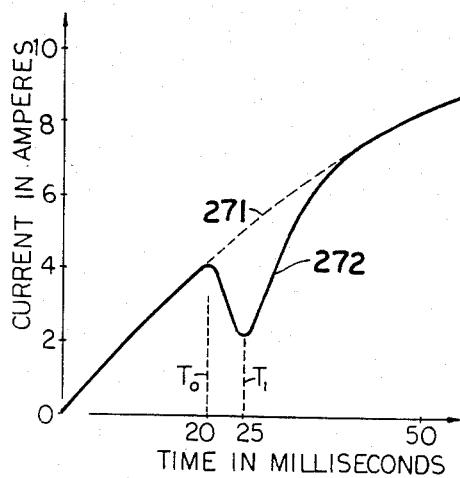
FIG. 5D and 5E are graphs to aid in the explanation of the automatic cut-off for the signalling valve power drive.
Figure 5E:
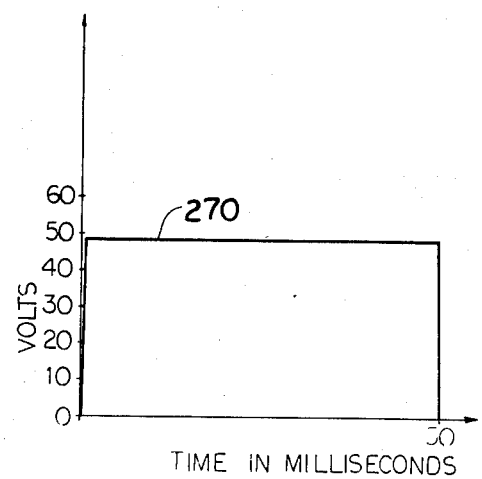

It is very informative to study the motion of the valve by making measurements of the current flow into the solenoid drive winding and constructing a graph (see FIG. 5D). From such a graph, the behaviour of the valve can be quantitatively studied. FIG. 5D shows such a graph in the form of an oscillogram of the current versus time. (This current is measured, for example by the voltage across resistor $R_1$ or $R_2$ of FIG. 6E.)

It is important to understand that it is the current through the solenoid winding that determines the force upon the valve stem 68 of FIG. 4A, since ampere turns determine the electromagnetic pull. Since the windings of the solenoid have inductance, the current will not build up instantaneously when a sudden voltage is applied as in FIG. 5E. If the solenoid comprised a simple inductor, then the current would build up according to simple exponential curve 271 of FIG. 5D as shown by the dotted curve. In actuality something quite different occurs: When the valve actuates (opens or closes) there is a sudden motion of the armature of the solenoid 79 of FIG. 4B and a back e.m.f. is generated. This back e.m.f. is caused by the velocity of the armature that quickly changes (increases) the inductance of the pertinent coil of the solenoid 79. In FIG. 5D, 271 shows the approximate current versus time curve in the solenoid winding when the armature of solenoid 79 and the valve stem 68 is "blocked" in the "open" or "closed" condition. The solid curve 272 in FIG. 5D shows the actual current buildup when the valve is not blocked; i.e., in actual working condition (opening or closing). The curves 272 for opening or closings are very similar. It is seen that curve 272, after the application of the voltage, gradually rises (since the respective solenoid coil 105, 106 has inductance) until it reaches, in the example shown, the value of 4 amperes at the time T, which is 20 milliseconds. Then there is the sudden drop of current that reaches the lower value of 2.2 amperes at the time $T_1$ which is 25 milliseconds. After the $T_1=25$ milliseconds, the current again increases according to the familiar "exponential" until it reaches, assymptotically, the value of about 10 amperes at the time of approximately 60 milliseconds (this value is determined by the resistance of the solenoid winding which in the example given is about 4.7 Ohms).

From a study of the curve 272 in FIG. 5D, it will become apparent that the valve 40 starts opening or closing at the time $T_0=20$ milliseconds and completes the motion at the time $T_1=25$ milliseconds. As was pointed out previously, an almost identical situation occurs during the "opening" or the "closing" of the valve; and the curve 272 would indicate that at the time $T_0=20$ milliseconds the valve starts its motion, and at the time $T_1=25$ milliseconds the motion is completed.

It is important to note that the time $T_1=25$ milliseconds on FIG. 5D is given as a typical example, and $T_1$ depends on a number of factors. Thus, at high differential pressures $T_1$ will be greater than 25 milliseconds and could be 30, 35 or 40 milliseconds. Suffice it to say that the time $T_1$ on FIG. 5D indicates the time when the valve actuation has been completed, and the current between the times $T_1$ and 50 milliseconds is in effect "wasted" since the acutation of the valve has already been completed. This extra time is a "safety factor" to ensure that, even under adverse conditions, the valve will always be actuated when the voltage pulse is applied.

In accordance with my invention I use the signal at the time $T_1$ to turn off any further current to the solenoid 79. Consequently all the current between the time $T_1$ and 50 milliseconds will be saved (thus reducing very substantially the total amount of energy required to operate the valve 40). It must be noted that the full "safety factor" referred to above is maintained; the current will continue to be applied until the valve has completed its (opening or closing) operation.

The electronic circuitry that is employed to accomplish the above objective is shown by FIG. 5C, wherein 104 indicates the power drive of FIG. 4A. Between the power drive 104 and ground is interposed a resistor ($R_1$ or $R_2$) of low value (compared to the resistance of the solenoid) for example 0.2 ohms. The voltage across this resistor is, therefore, proportional to the current fed to the particular solenoid winding 104, 106. (Two circuits as shown in FIG. 5C are necessary—one for the opening solenoid power drive and a second for the closing solenoid power drive, but for simplicity of illustration, only one circuit is shown in FIG. 5C.) 273 is a conventional amplifier and at its output the voltage curve 272a of FIG. 5C will be a replica of the curve 272 in FIG. 5D. 274 is a derivator (well known in the electronics art) which generates an output voltage proportional to the first time derivative of its input voltage. Curve 275 shows this derivative voltage. It can be seen from observing curve 272 or 272a that the derivative (slope) of the curve is always positive except during the times between $T_0$ and $T_1$, during which time the slope (derivative) is negative. On the curve 275 only the impluse 276 is negative. 277 is a conventional receifier arranged to pass only the pulse 276, as shown on the graph 278. 279 is an electronic delay circuit (also well known in the art) which generates an output pulse 276b which is a replica of the input pulse but delayed by the time $T_1 - T_0$. Thus, the pulse 276b as shown in graph 280 occurs slightly later than the time $T_1$. This pulse 276b is applied to an electronic switch 281 that is arranged to cut off the power to the power drive 104, thus stopping the current flow almost immediately after the valve 40 has completed its operation (opened or closed). The electronic switch 281 is arranged to restore the action of power drive 104 after an appropriate time. The process repeats itself when the next impulse 104a (or 104b) occurs.

It is important to note that the saving in energy that can be achieved by utilizing this aspect of my invention can be very substantial. Since very large powers are required to operate the valve 40 with the great speed required, this saving is very significant, and it could in the example shown increase the battery life by as much as 5 times.

VIII.

DESCRIPTION OF SUB AND HOUSING STRUCTURE FOR SPECIAL TELEMETRY TOOL

An important characteristic of the Measurement While Drilling (MWD) apparatus of this invention is its practicality; i.e., convenience and ease of adaptability to existing oil well drilling hardware and tools and drill strings. In the attempts of the prior art, large special steel housings 30 feet or more in length and 8 inches in diameter are required to house the complicated instrumentation; and their transportation from location to location requires specially constructed vehicles. In the apparatus of this invention, because there is no valving mechanism interposed in the main mud stream, it is possible to eliminate the heavy, very long, expensive special housing (approximately 30 feet long) and only a short section of drill collar (called a "sub") is required. In the practical embodiment of this invention, this sub is only 36 inches long and 6¾ inches in diameters (instead of 30 feet which was previously required).

One of the important features of this invention, therefore, is that no heavy, long special housings are required. This is advantageous especially when downhole magnetic measurements such as compass indications (e.g., steering the drilling of a deviated hole) are to be made, which require use of non-magnetic drill collars. Non-magnetic drill collars are not only heavy (2-3 tons) but also extremely expensive ($20,000. each) since they must be manufactured of strictly nonmagnetic material such as K Monel. In the construction of the apparatus of this invention "Standard" API Drill Collars having outside diameters of 6" to 9" (which are the most common sizes) are utilized. All of the standard API drill collars have an inside diameter of 2-13/16"+1/16"−0". The simplicity, small size and coaxial construction of the valve system of this invention and its associated parts allow a special feature to be accomplished: All of the pertinent power drive and associated equipment can be located in a pressure resisting tube sufficiently small in diameter to permit it to be inserted into the inside bore (2-13/16") of a standard API Drill Collar without unduly interfering with mud flow. Some Sensors should be placed as near to the drill bit as possible. In particular, a downhole gamma ray Sensor should be capable of detecting the penetration of the bit into a given lithologic formation as soon as such penetration occurs. Furthermore, some sensors, such as a downhole compass-inclinometer require accurate indexing with respect to the "tool face" used in directional drilling. In addition, a compass-inclinometer must be placed at a substantial distance from any magnetic or paramagnetic material. Furthermore, when a compass-inclinometer is employed, the housings 250a and 250b in FIG. 7A must be carefully indexed angularly with respect to the sub 253, which in turn is indexed with respect to the "Bent Sub" used in directional drilling.

The "bent sub" is equipped with an indexing mark 253a and the angle of this indexing mark must have a constant and measured angular relationship to the indexing mark 254a that is placed on the telemetering sub 254. This known angle (representing the angle between indexing marks 253a and 254a is then introduced into the computation for the determination of the bearing and angle with respect to a vertical plane of the "Bent Sub".

FIG. 7A is a schematic showing of the special telemetry tool 50, illustrating the arrangement wherein the "special long tool" is eliminated and only a short section of drill collar sub is required, as was previously mentioned. In FIG. 7A, a housing designated by numeral 250 is made up of an upper section 250a and a lower section 250b, as was previously described with reference to FIG. 4A. The upper section 250a is contained within a short sub 254 (only about 36 inches long). This short sub is especially bored out to provide an inside diameter (e.g. 4½") sufficient to house the valve assembly 40 and also to permit the unrestricted flow of drilling mud past upper section 250a through passages 61, which are also designated by numeral 61 in FIG. 4A. The housing 250a is of small diameter, preferably, 2 11/16" OD or less. A drill Collar 255 provided by the user (the oil company or the drilling contractor) is usually 30 feet long and of great weight and cost. The inside diameter of a standard API Drill Collar as was pointed out previously is 2-13/16"−0+1/16". Centralizer members 256 are provided for lower housing 250b. These are slightly smaller in diameter than the ID of the standard API Drill Collar, for example, 2¾" O.D. Small clearance is very important in order to prevent "chatter" when the tool is vibrated during drilling. Discharge passage 85 is the same as that shown in FIG. 4A. The housing 250b is suspended within the sub 254 by securing means not shown. The cross-section shape of the centralizers 256, as indicated in FIG. 7B, is such as to provide slots or passages 258 to permit free flow of drilling mud.

The housing lower section 250b is actually made up of several sub-sections which are connected, one to another, by a special connector means shown in FIG. 7C. As shown in FIG. 7C, each sub-section is provided at its upper end slot 260 and at its lower end a protusion or tooth 261. A protusion 261 of one sub-section matingly engages a slot 260 of the adjacent sub-section. The adjacent sub-sections are retained by a connector sleeve 262 which is matingly received by the end portions of the sub-sections. Circular openings 263 in the sub-sections are aligned with respective threaded openings 264 in the connector sleeve 262, and the parts are secured by screws 265. The special connector means of FIG. 7C provides for accurate angular indexing when sub 253 is a "Bent Sub".

As was pointed out previously, the angle between indexing marks 253a and 254a must be known in order to compute the angle with respect to vertical of the "Bent Sub". It is also necessary that the angular displacement between the axes of a magnetometer-inclinometer and the mark 254a be known and invariable during the drilling operation (it is preferred but not necessary that the angle between one of the horizontal axes of the magnetometer-inclinometer and the indexing mark 254a be zero). For this purpose the tool 250b is assembled with angular indexing teeth 261 as shown on FIG. 7C and FIG. 7A.

In order to design an efficient telemetering system two requirements will be considered. One of these deals with optimum conditions for obtaining the regime of hydraulic shock waves. The other requirement is concerned with obtaining shock waves of sufficient intensity to override extraneous noise effects.

IX.

OPTIMUM CONDITIONS FOR DETERMINING THE REGIME OF HYDRAULIC SHOCK WAVES (DETERMINATION OF PARAMETERS $K_1$ (OR $K_2$) AND $T_b^{(\nu)}$)

I have performed a series of experiments in order to determine the optimum conditions for the regime of hydraulic shock waves.

The occurrence of a hydraulic shock wave is analogous to that of the water hammer effect. By suddenly stopping the flow in a localized region in the line of flow, we suddenly increase pressure in that region. This initially localized increase in pressure propagates itself along the line of flow as "water hammer". It is well known that a sudden and localized change (decrease or increase) in velocity produces a corresponding localized change (increase or decrease) in pressure, and conversely, a sudden and localized change in pressure produces a sudden and localized change in velocity. Because of elasticity and inertia of the fluid, the change is being transmitted further from the volume element where it originates to neighboring volume elements with a velocity which is the velocity of propagation of compressional waves. The problem of propagation of shock waves is of extreme complexity. To satisfy practical requirements, we need to determine a parameter which will be the most representative from the standpoint of obtaining a clearly defined shock wave. Two parameters will be considered which we designate as parameter $K_1$ and parameter $K_2$. When either of these parameters exceeds an appropriate value, a clearly defined shock wave is produced.

(a) Parameter $K_1$

This parameter is the mean rate of change of the velocity of mud flow through the bypass valve during the period of opening (or closing) of the valve:

Let V(t) be the velocity of the mud flow through the bypass valve as it varies with time (in cm/sec. or feet/sec.). At the instant t=0 when the valve begins to open, the velocity is zero; i.e., V(0)=0. At the instant $t=T_a^{(\nu)}$ when the valve is fully open, the velocity of the valve attains a certain value $V_f$ which is the bypass velocity during the period of full flow. Thus, $$V(T_a^{(\nu)}) = V_f \tag{10}$$

Consequently the parameter $K_1$ which is mean rate of change of the velocity during the period $T_a^{(\nu)}$ is $$K_1 = \frac{V_f}{T_a^{(\nu)}} \tag{11}$$

$K_1$ is measured in cm/sec$^2$.

We assume that when $K_1$ exceeds an appropriate threshold value; i.e., when $$K_1 > M_1 \tag{12}$$

we obtain a clearly defined shock wave. In the experiments performed it was determined that $$M_1 \simeq 2 \times 10^5 \text{ cm/sec}^2 \tag{13}$$

(b) Parameter $K_2$

This parameter represents the mean rate of change of the area of the opening of the valve during the period $T_a^{(\nu)}$.

We previously defined (see equation (1)) S(t) as the area of the valve which is open at the time t. Thus, at t=0 one has S(0)=0 and at $t=T_a^{(\nu)}$ one has $$S(T_a^{(\nu)}) = S_0 \tag{14}$$

where $S_0$ is the total opening of the valve. The parameter $K_2$ is $$K_2 = \frac{S_0}{T_1^{\nu}} \text{ cm}^2/\text{sec.} \tag{15}$$

We assume that when $K_2$ exceeds an appropriate threshold value; i.e., when $$K_2 > M_2 \tag{16}$$

we obtain a clearly defined shock wave. In experiments performed, it was determined that M≃100 cm$^2$/sec.

Roughly speaking, $K_1$ is proportional to $K_2$. The parameter $K_2$ is perhaps more useful because it tells us directly how to design and operate the valve.

Figure 2A:
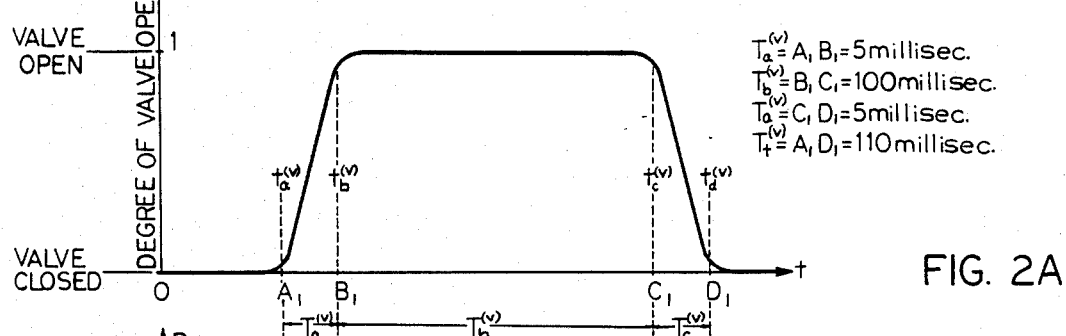

There is also a parameter $T_b^{(\nu)}$ (see $B_1C_1$, in FIG. 2A) which needs to be considered in the discussion on FIG. 8A to 8E. Each of these figures corresponds to a set of numerical values of $K_1$ and $T_b^{(\nu)}$ or $K_2$ and $T_b^{(\nu)}$.

FIG. 8A to 8E show the effect of varying $K_1$ and $T_b^{(\nu)}$ or $K_2$ and $T_b^{(\nu)}$ in effecting the transition from the regime of slow pressure variation to the regime of hydraulic shock waves. More specifically each of these figures show how the pressure detected and the earth's surface (ordinate) varies with time, t (abscissa). The size of the orifice was 0.5 cm$^2$ in these experiments. Experimental data were obtained at a number of wells. These wells were selected in Oklahoma, West Texas, East Texas and in the Netherlands. Moreover, some of the tests were made on an "experimental well" that was explicitly drilled to perform telemetry experiments.

In performing the above experiments, account was taken of the great variety of existing mud pump installation and of various interfering effects. There are many kinds of mud pumps: Single Duplex, Double Duplex, Single Triplex, Double Triplex, and the pump pressure variations for a given average mud pressure vary a great deal from installation to installation. Elimination of the large interfering mud pressure signals is complex. The pump pressure signals from a single Duplex System can be 10 or even 20 times larger than those from a carefully adjusted Double Triplex. For determination of the optimum values of $K_2$ (or $K_1$) and of $T_b^{(v)}$, the drilling operation was stopped and a very good (smooth) Tiplex pump was used. Thus, graphs in FIGS. 8A to 8E are not representative of a typical condition but represent a condition where the various noises (from the pumps and other sources) were minimized and then averaged out by calculation and drafting in order to obtain optimum values for the parameters $K_2$ (or $K_1$) and $T_b^{(v)}$. The corresponding values of $K_2$ (or $K_1$) and $T_b^{(v)}$ for each of FIGS. 8A to 8E are given in the table which follows:

TABLE

Figure 8A:
FIGS. 8A to 8E show graphs representing variations of pressure as measured at the earth's surface and corresponding to various values of $T_a^{(v)}$ (times of opening or closing of a valve) and of $T_b^{(v)}$ (time of open flow). Graphs in these figures show results of certain tests which I performed in order to obtain the optimum condition for a regime of hydraulic shock waves. More specifically FIGS. 8A to 8E can be described as follows.
Figure 8B:
Figure 8C:
Figure 8D:
Figure 8E:
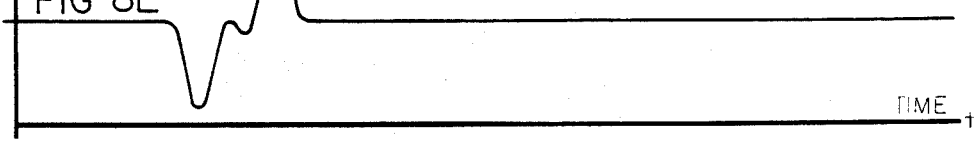

| | $K_2$ (in cm²/sec) | $T_b^{(v)}$ (in seconds) |
|---|---|---|
| FIG. 8A | .5 | 2 |
| FIG. 8B | 2.5 | 1 |
| FIG. 8C | 8.5 | 0.5 |
| FIG. 8D | 2.5 | 0.25 |
| FIG. 8E | 100 | 0.1 |

Figure 8F:
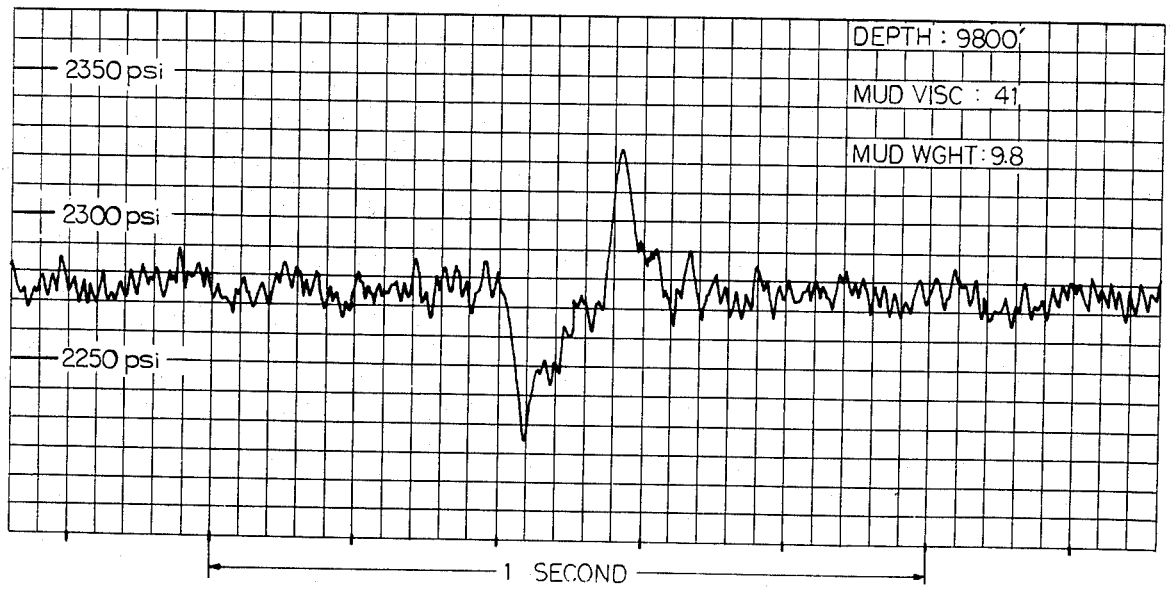
FIG. 8F shows an exact reproduction of the pressure signal showing a valve wavelet as received at the surface from the depth of 9,800 feet at an actual oil well being drilled in East Texas.

The graphs of FIG. 8A to 8E represent average numbers obtained in a large number of tests. In these tests the normal standpipe pressure was 3000 psi and variations of pressure were in a range of 100 psi. The above tests were made using various types of valves: motor driven, rotary, poppet, etc. FIG. 8F is an exact replica of the standpipe pressure recorder chart obtained in tests conducted at 9800 feet with standpipe pressure 2800 psi and performed in an actual drilling of an oil well in West Texas.

Figure 1A:
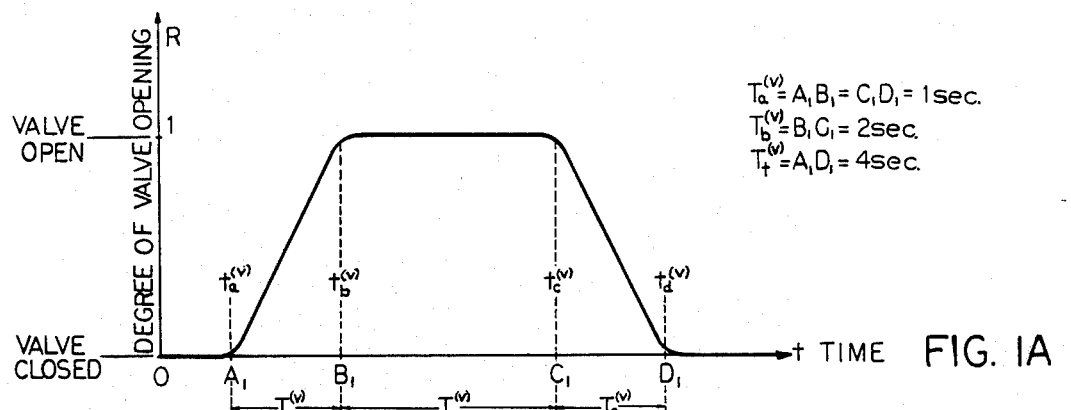
FIGS. 1A, 1B, 2A and 2B are graphs which relate in part to the portions of the specification entitled "Field of the Invention" and "Description of the Prior Art". The remaining figures, as well as FIGS. 1A, 1B, 2A, and 2B relate to the portions of the specification entitled "Summary of the Invention" and "Description of the Preferred Embodiments".
Figure 1B:
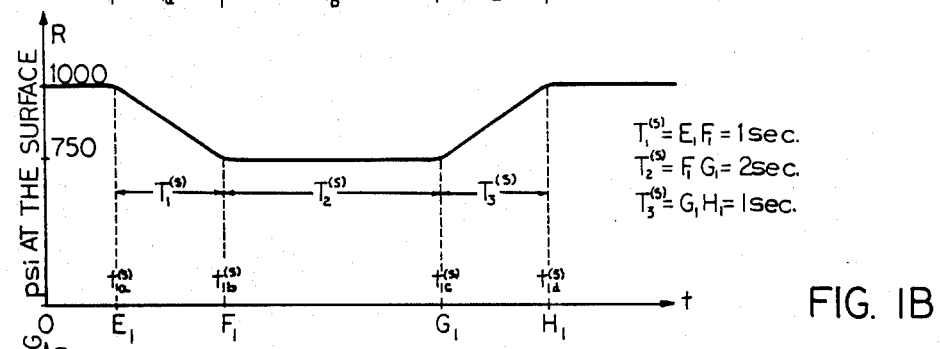
Figure 2B:
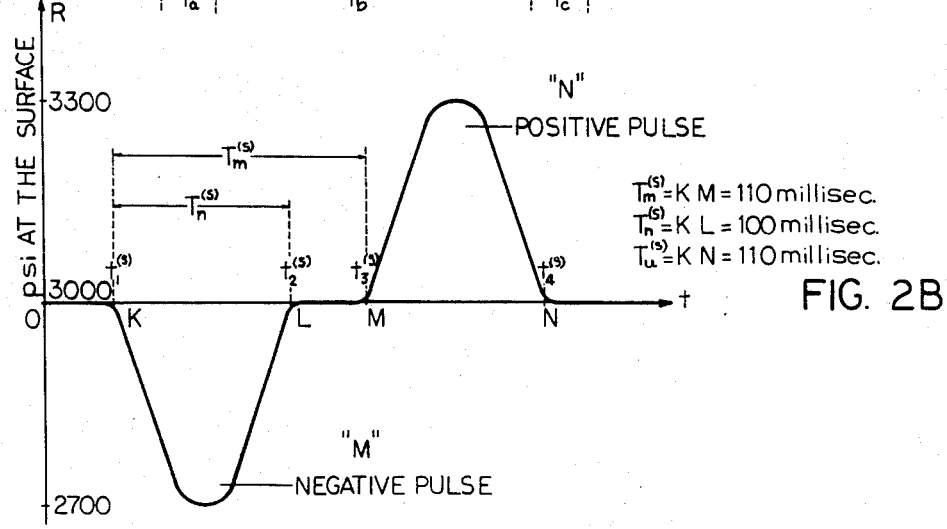

The graph in FIG. 8A was obtained by using a slow acting valve. The numerical values of the pertinent parameters in FIG. 8A were $K_2=0.5$ cm²/sec and $T_b^{(v)}=2$ sec; i.e., they were similar to those suggested in the prior art as in FIGS. 1A and 1B. Consequently, both FIG. 8A and FIG. 1B represent the regime of slow pressure pulsation. On the other hand, FIG. 8E was obtained using a fast acting valve for which $K_2=100$ cm²/sec and $T_b^{(v)}=10^{-1}$ seconds. Consequently, FIG. 8E represents the regime of hydraulic shock waves, and the valve wavelet in FIG. 8E is very similar to the valve wavelet in FIG. 2B.

FIGS. 8B, 8C, and 8D as defined in the table above show the transition from the regime of slow variations of pressure to the regime of hydraulic shock waves.

In the tests shown in FIGS. 8B, 8C, and 8D the conditions were kept as similar as possible. The instrument was located near the bottom of drill holes of depth of about 8000 feet, the mud viscosity was about 40 Funnel, and the weight 12 pounds per gallon. The valve when "open" had an effective open area of 0.7 cm². The normal standpipe pressure was 3000 psi and the valve used in these tests was similar to the valve 40 but modified to permit slower action (without the bi-stable action); i.e., the valve was a simple pressure balanced valve, and the flow rate was controlled by a restriction at the inlet passageway. It should be noted that the valve action which accounts for FIG. 8B was quite fast, but it did not produce the desired regime of hydraulic shock waves. The sharp onsets, however, indicated that faster action is desirable. The discharge rate was of the order of 5 gallon/sec².

By adjusting the inlet restriction and the outlet restriction and the electric power supplied to the drive solenoids, various valve operation speeds were obtained.

It is seen from the above that no shock waves are produced when $K_2=0.5$ cm²/sec, and an almost ideal shock wave is produced when $K_2=100$ cm²/sec.

X.

OBTAINING SHOCK WAVES TO OVERRIDE NOISE (ALTERNATIVE VERSION)

I will introduce another parameter which will express a requirement regarding the intensity of the shock wave. Two different approaches will be considered. One of these is based on a parameter $K_3$ which represents the amount of mud (measured in cm³ or in gallons) which passed through the valve during the period $T_a^{(v)}$ (This quantity is known as fluence). The other approach is based on a parameter $K_4$ which represents the average flux of the mud stream during the period $T_a^{(v)}$ Thus, $$K_4 = \frac{\text{amount mud passed during } T_a^{(v)}}{T_a^{(v)}} \qquad (17)$$

Consider the period of opening of the valve; i.e., the period $T_a^{(v)}$. To simplify the problem we assume that the rate of increase of the velocity of flow during the period $T_a^{(v)}$ is constant and is equal to $K_1$. Thus, $$V(t) = K_1 t \text{ in cm/sec.} \qquad (18)$$

Assume also that the rate of increase of the opening of the valve is constant, and equal to $K_2$. Thus, $$S(t) = K_2 t \text{ in cm}^2/\text{sec.} \qquad (19)$$

Consequently the volume that passes through the valve during the time $T_a^{(v)}$ is $$K_3 = \int_0^{T_a^{(v)}} K_1 K_2 t^2 dt = \frac{(K_1 K_2 T_a^{(v)})^3}{3} \text{ cm}^3 \qquad (20)$$

Thus, parameter $K_3$ is the amount in cm³ of fluid that passed through the valve during the period $T_a^{(v)}$. This is the amount of fluence for the period of a single opening and closing of the valve. Another alternative is to take instead of the parameter $K_3$ a parameter $K_4$ representing the flux for the period $T_a^{(v)}$; i.e., $$K_4 = \frac{K_3}{T_a^{(v)}} \qquad (21)$$

XI.

GENERAL PROCEDURE FOR NOISE ELIMINATION

Figure 9:
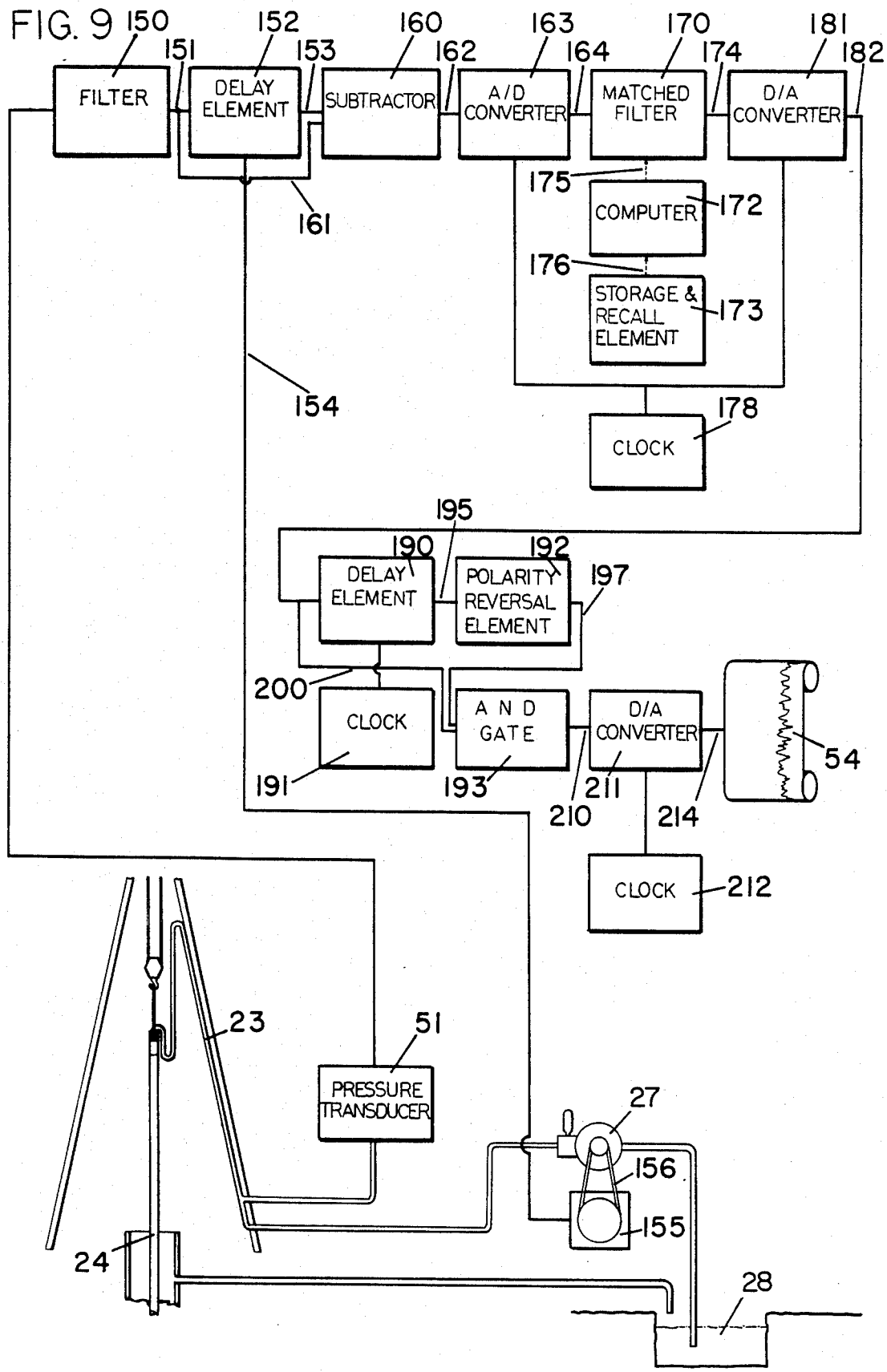
FIG. 9 is a schematic illustration showing typical above ground equipment to be used in conjunction with a downhole pressure pulse signalling device in accordance with my invention and comprising a matched filter for eliminating random noise when the random noise is white.

Consider now the general procedure for decoding signals from the pressure transducer 51. FIG. 9 shows the apparatus arrangement, and FIGS. 10A to 10G illustrate certain wave forms and pulses which are involved in the decoding of signals by means of the arrangement of FIG. 9.

The signal obtained from the pressure transducer 51 comprises a useful information carrying signal together with interfering signals which tend to obscure or mask the useful signal. The useful information carrying signal represents the coded message obtained by means of the valve 40 in response to a sensor. There are various interfering signals. One of these produced by the pump 27 contains an intense steady component of the mud pressure produced by the pump. This component accounts for the circulation of the mud through the drill pipe and back through the annulus between the drill pipe and the wall of the bore. Superimposed thereon is an alternating component produced by the recurrent motion of the reciprocating pistons in the pump.

In order to improve reception, it is desirable to remove from the output of the transducer 51 the steady component in the pressure generated by the pump 27. Accordingly, a frequency selective filter 150 is connected to the transducer 51 for transmitting frequencies in a range from 0.1 to 10 Hertz and attenuating frequencies outside of this range. The frequencies contained within the steady pressure component are below 0.1 Hertz.

In the terminology applied to this specification, a distinction will be made between the term "filter" as applied to the frequency selective filter 150 and the term "digital filter" to be used later in the description of my invention. In a "filter" such as the filter 150, conventional filtering is performed by means of analog-type electronic networks, whose behavior is ordinarily treated in the frequency domain. The term "filter" may be used to designate what is known to be a "wave filter", a "Shea filter" (see for instance, "Transmission Networks and Wave Filters" by T. E. Shea, D. Van-Nostrand Co., New York, N.Y., 1929) and other filters such as Tchebyshev and Butterworth filters. On the other hand a digital filter such as a matched filter, a pulse shaping filter or a spiking filter is more fruitfully treated in time domain. The output of a digital filter is obtained by convolving the digital input trace with the filter's weighting coefficients. A digital filter is a computer.

The signal produced at the output terminal 151 of the filter 150 will be expressed by a function F(t) which is $$F(t) = B(t) + P(t) + U(t) \quad (22)$$

where B(t) is the useful information carrying signal, P(t) is the interfering signal caused by the periodic pressure variation from the pump (pump noise), and U(t) represents random noise. The random noise is produced by various effects such as the action of teeth of a cutting bit (as toothed core bit) during drilling, by the gears in the mechanical drill string, and by other devices involved in rotary drilling operations. In some cases U(t) approximate white noise, although in other cases the departure of U(t) from white noise may be substantial.

Figure 10D:
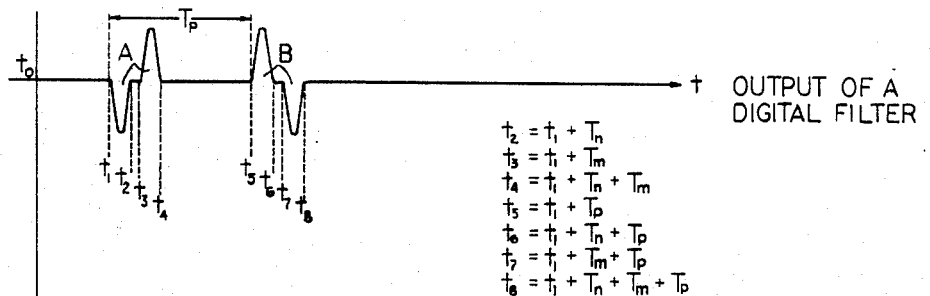

The coded message expressed by the information carrying signal B(t) is a series of binary words and each of these binary words contains a succession of bits. A single bit in a binary word is produced by a single "operation" (i.e., by a single opening and closing) of the valve 40. Such a single operation generates a hydraulic shock wave which manifests itself at the surface of the earth as a single wave wavelet, such as the valve wavelet in FIG. 2B. Consequently, the message expressed by B(t) is in the form of a coded sequence of valve wavelets, each of said valve wavelets being of the type shown in FIG. 2B. FIGS. 10A to 10G show various steps to be accomplished in order to separate the information carrying signal B(t) from the interfering signals. In order to facilitate explanation, I have expressed B(t) in FIG. 10A by a single valve wavelet rather than by a coded succession of valve wavelets. Thus, the valve wavelet in FIG. 10A is of the same type as a single valve wavelet in FIG. 2B. There is however, a slight change in notation. I eliminated in FIG. 10A the superscript "s" which appeared in FIG. 2B. Thus, in FIGS. 10A to 10G various times have been designated as $t_1$, $t_2$, ... $t_{15}$, $t_{16}$ with no superscript "s". Various graphs in FIGS. 10A to 10G have been appropriately labeled in these figures. In the interest of clarity and to facilitate explanation, the time scales corresponding to these graphs have been distorted.

In order to eliminate the interfering noise signals (pump noise and random noise) and to produce a signal representing the coded message, three successive operational steps are provided which may be identified as follows:

Step 1: In this step a signal having three components as shown in FIG. 10A is transformed into a signal having two components as shown in FIG. 10C. The purpose of this step is to eliminate the pump noise P(t). As a result of this step a "valve wavelet" of the type shown in FIG. 10A is transformed into a "double wavelet". Such a double wavelet is shown in FIG. 10C.

Step 2: The purpose of this step is to eliminate the random noise signal.

Figure 10E:
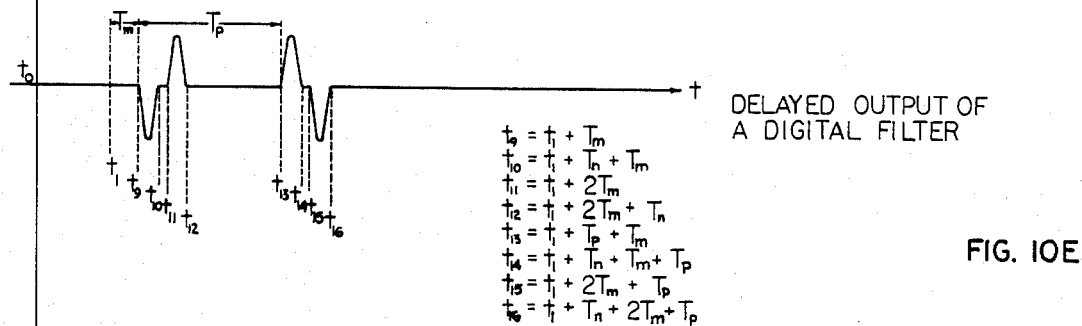
Figure 10F:
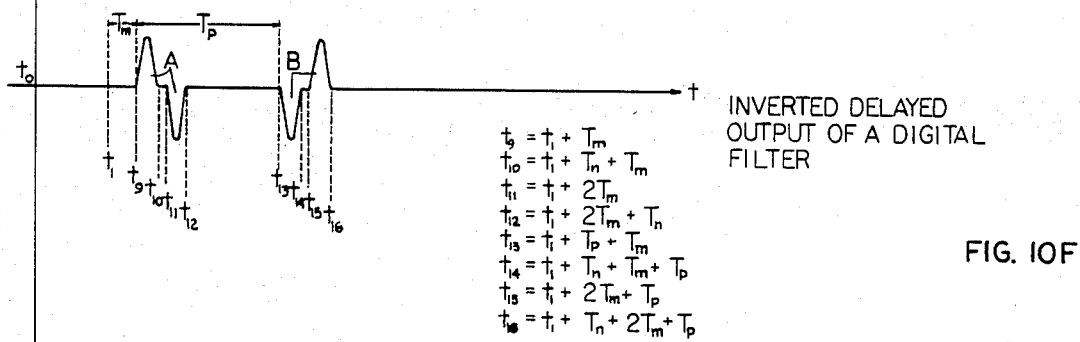
Figure 10G:
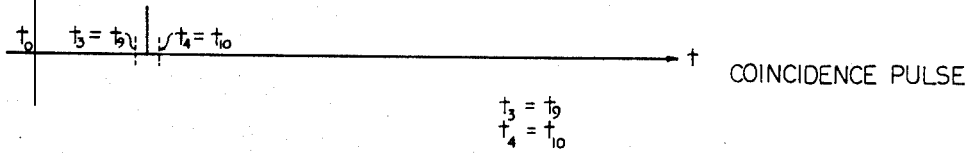

Step 3: In this step each double wavelet as shown in FIG. 10D is transformed into a single pulse as shown in FIG. 10G. Consequently, one obtains a coded sequence of single pulses representing in digital format the parameter measured by the sensor 101 at an appropriate depth in the borehole.

XII.

ELIMINATION OF PUMP NOISE (STEP NO. 1)

Consider now FIG. 10A. This figure shows the three components of the signal F(t) as expressed by the equation (22). These are: the valve wavelet B(t), the pump noise P(t), and the random noise U(t). As previously pointed out, the signal F(t) has been obtained by means of the filter 150. This filter is connected to a delay element 152 which is effective in delaying the input signal F(t) by an amount $T_p$ where $T_p$ is one period in the oscillation produced by the pump 27. Thus, the signal obtained at the output lead 153 of the delay element 152 can be expressed as $F(t-T_p)$. The three components of the signal $F(t-T_p)$ are shown in FIG. 10B. They are: the delayed valve wavelet $B(t-T_p)$, the delayed pump noise $P(t-T_p)$ and the delayed random noise $U(t-T_p)$. The time interval $T_p$ depends on the speed of rotation of the pump, and since the speed of the pump is not constant, the delay $T_p$ is a variable delay. Thus, an appropriate control for the delay element 152 must be provided in response to the speed of rotation of the pump 27. Accordingly the delay element 152 is arranged to receive through the lead 154 timing impulses obtained from a pulse generator 155, which is mechanically driven by the pump to produce an appropriate number of pulses per revolution of the pump. A chain drive transmission 156 is provided for this purpose. The delay element 152 may be Reticon Model SAD-1024 Dual Analog Delay Line as marketed by Reticon Corporation, Sunnyvale, Calif., U.S.A.

Assume that the pump 27 produces $N_1$ strokes per second. Thus, $T_p = 1/N_1$. The pulse generator 155 produces timing pulses at a relatively high rate $N_2$, which is a multiple of $N_1$. Thus, $N_2 = KN_1$, where K is a constant which has been chosen to be 512. Thus if the strokes of the pump are one per second, this would require the signal generator to produce 512 pulses per second. It is apparent that the rate of pulsation of the mud pump 27 varies with time and, accordingly, $N_2$ will vary so as to insure that the delay produced by delay element 152 will always be equal to one period of the mud pressure oscillations produced by the mud pump 27.

The signal $F(t-T_p)$ derived from the delay element 152 is applied to an input lead 153 of a subtractor 160. The subtractor 160 also receives at its input lead 161 the signal F(t) derived from the filter 150, and it produces at its output lead 162 a difference signal which is $$x(t) = F(t) - F(t - T_p) \quad (23)$$
$$= B(t) - B(t - T_p) + P(t) - P(t - T_b) +$$
$$U(t) - U(t - T_p)$$

Since P(t) is periodic and has a period $T_p$, one has $$P(t) - P(t - T_p) = 0. \quad (24)$$

Thus, because of the periodicity of pulsations produced by the mud pump 27, the noise due to the pump has been eliminated and the signal obtained at the output lead 162 of the subtractor 160 can now be expressed as $$x(t) = b(t) + u(t) \quad (25)$$

where $$b(t) = B(t) - B(t - T_p) \quad (26)$$

is the information carrying signal and $$u(t) = U(t) - U(t - T_p) \quad (27)$$

is a random noise signal.

Both the information carrying signal b(t) and the noise signal u(t) are shown in FIG. 10C. It can now be seen that by performing the step No. 1 as outlined above, I have transformed the information carrying signal B(t) as shown in FIG. 10A and having the form of a valve wavelet into a different information carrying signal b(t) as shown in FIG. 10C. The signal b(t) will be referred to as a "double wavelet" in contrast to the signal B(t) which represents a "valve wavelet". A double wavelet comprises two valve wavelets such as the valve wavelets "A" and "B" in FIG. 10C. These valve wavelets are separated one from the other by a time interval $T_p$. The valve wavelet "A" is similar to that of FIG. 10A whereas the valve wavelet "B" represents the inverted form of the valve wavelet "A".

The signal x(t) (equation (25)) is further applied to the input lead 162 of an analog to digital (A/D) converter 163 which is controlled by a clock 178. One obtains at the output lead 164 of the A/D converter a signal expressed as $$x_t = b_t + u_t \quad (28)$$

where in accordance with the symbolism used here $x_t$, $b_t$, and $u_t$ are digital versions of the analog signals x(t), b(t), and u(t) respectively. The signals $x_t$ and $u_t$ are in the form of time series, such $$x_t = (\ldots x_{-2}, x_{-1}, x_0, x_1, \ldots, x_9, \ldots) \quad (29)$$

and $$u_t = (\ldots u_{-2}, u_{-1}, u_0, u_1, \ldots, u_9, \ldots) \quad (30)$$

respectively, and the signal $b_t$ is finite length wavelet $$b_t = (b_0, b_1, b_2, \ldots, b_n) \quad (31).$$

XIII.

ELIMINATION OF RANDOM NOISE WHEN RANDOM NOISE IS WHITE (STEP NO. 2)

The mixture of a double wavelet $b_t$ and of noise signal $u_t$ is now applied to a (n+1) length digital filter 170 having a memory function $$a_t = (a_0, a_1, a_2, \ldots, a_n) \quad (32)$$

I select in this embodiment a digital filter known as a matched filter, and I choose the memory function $a_t$ to optimize the operation of the filter. Optimum conditions are achieved when the signal to noise ratio at the output of the filter 170 is at its maximum value. (For a description of matched filters, see for instance a publication by Sven Treitel and E. A. Robinson on "Optimum Digital Filters for Signal-to-Noise Ratio Enhancement", Geophysical Prospecting Vol. 17, No. 3, 1969, pp. 248–293, or a publication by E. A. Robinson on "Statistical Communication and Detection with Special Reference to Digital Data Processing of Radar and Seismic Signals", Hafner Publishing Company, New York, N.Y., 1967, pages 250–269.)

I arrange the memory function $a_t$ of the matched filter 170 to be controllable so as to insure at all times during the measuring operations the optimum conditions in the operation of the filter. The control of the filter is effected by means of a computer 172 which receives appropriate data from a storage and recall element 173 in a manner to be described later.

Figure 11:
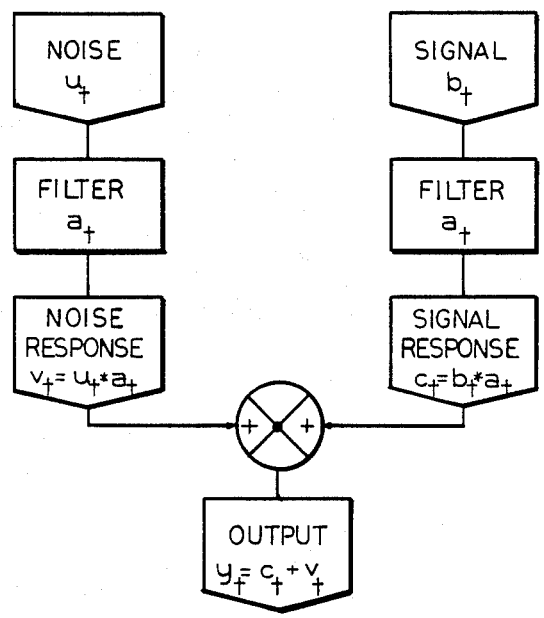
FIG. 11 shows schematically certain operations performed by a digital filter.

A signal $y_t$ obtained at the output lead 174 of the matched filter 170 can be expressed as a convolution of the input function $x_t$ and the memory function $a_t$. Thus, $$y_t = x_t * a_t = a_0 x_t + a_1 x_{t-1} + \ldots + a_n x_{t-n} \quad (33)$$

where the asterisk indicates a convolution. Substituting in (33), $x_t = b_t + u_t$ one obtains $$y_t = c_t + v_t \quad (34)$$

where $$c_t = b_t * a_t \quad (35)$$

is the filter response to a pure signal input and $$v_t = u_t * a_t \quad (36)$$

is the noise output. A schematic block diagram indicating these relationships is shown by FIG. 11.

In order to insure the optimum conditions in the operation of the matched filter 170, a certain time, say time $t = t_0$ is chosen and it is required that the instantaneous power in the filter output containing a signal at time $t = t_0$ be as large as possible relative to the average power in the filtered noise at this instant. Hence, in order to detect the signal $c_t$ in the filtered output $u_t$, use is made of the signal-to-noise ratio defined as $$\mu = \frac{(\text{Value of filtered signal at time } t_0)^2}{\text{Power of filtered noise}} \quad (37)$$

If one convolves the $(n+1)$ length signal $(b_0, b_1, \ldots, b_n)$ with the $(n+1)$ length filter, one obtains a $(2n+1)$ length output series $(c_0, c_1, \ldots c_n, \ldots, c_{2n-1}, c_{2n})$ where $c_n$ is the central value of this output series. Thus, at time $t_0 = t_n$, $\mu$ becomes $$\mu = \frac{c_n^2}{\{Ev_n^2\}} = \frac{(a_0 b_n + a_1 b_{n-1} + \ldots + a_n b_0)^2}{E\{v_n^2\}} \quad (38)$$

where $E\{v_n^2\}$ is the average value of the noise output power.

I assume here that the random noise $u_t$ is white noise. Then it can be shown (see for instance a publication by Sven Treitel and E. A. Robinson "Optimum Digital Filters for Signal to Noise Ratio Enhancement". Geoph. Prosp., Vol. XVII, #3, 1969, pp. 240-293) that the maximum value of the signal to noise ratio $\mu$ can be obtained when $$(a_0, a_1, \ldots, a_n) = (kb_n, kb_{n-1}, \ldots, kb_0) \quad (39)$$

where k has been chosen to be one. Thus, in the presence of a signal immersed in noise, when the noise is white the optimum conditions can be obtained when the memory of the filter is given by the inverted signal; namely, by the coefficient sequence $(b_0, b_{n-1}, \ldots, b_0)$.

The memory of the filter 170 is determined at all times by means of the computer 172 which is connected to the filter by a channel 175. The term "channel" as used herein refers to suitable conductors, connections or transmission means, as a particular case may require. A storage and recall element 173 is provided for storing the function $b_t$ for a subsequent transmission of $b_t$ through channel 176 to the computer 172. The function of the computer is to reverse the input data expressed by a sequence $(b_0, b_1, \ldots, b_n)$ so as to provide at its output channel 175 a sequence $(b_n, b_{n-1}, \ldots, b_0)$ which in turn is applied to the matched filter through the channel 175 and stored therein as a memory of the filter in accordance with the equation (39).

The filtered output $y_t$ obtained at the output lead 174 of the matched filter 170 is further applied to a digital to analog (D/A) converter 181. Since $y_t$ represents a signal in digitalized form, the corresponding analog function obtained at the output lead 182 of the D/A converter 181 will be expressed in accordance with the symbolism used here as $y(t)$.

It should be noted that maximizing the signal to noise ratio in the filtered output $y_t$ is equivalent to minimizing the noise signal $v_t$ (or its analog equivalent $v(T)$) when compared to the information carrying signal $c_t$ (or its analog equivalent $c(t)$). Thus, $$v(T) << c(t) \quad (40)$$

and $$y(T) \sim c(t) \sim b(t) \quad (41).$$

Therefore the output function $y(t)$ of the matched filter as shown in FIG. 10D closely resembles the function $b(t)$ shown in FIG. 10C.

An important feature of my invention involves storing (for a subsequent reproduction) the function $b_t$ by means of the storage and recall element 173. The required procedure for storing $b_t$ will now be explained in connection with FIG. 12. The procedure consists of several steps as follows.

Step (a): Drilling operations are stopped; i.e., the bit 31 is lifted a short distance above bottom, the draw works are maintained stationary, and the rotary 21 is stopped from turning.

Step (b): Pump 27 continues to operate as during normal drilling procedures; i.e., at a uniform pump rate and a pump pressure representative of that used during the actual "measurements while drilling". All other sources of interference, such as A.C. electric pick-up from generators, operation of cranes, etc. are stopped. "Heave" and other sources of noise are eliminated insofar as possible in the case of offshore operations (as by selecting a calm day).

Step (c): As previously described and shown in connection with FIG. 5A, the subsurface encoding is determined by a "clock" which is in rigorous synchronism with the "clock" at the surface equipment. Consequently it is possible at the surface to make a determination of when a single pulse is generated at the subsurface, for example the precursor pulse; and by knowing the velocity of transmission through the mud column, also to know the exact time at which the hydraulic impulse is received at the surface. Thus it is possible to receive a single "wavelet" at the surface and to know in advance when in time the wavelet appears, even though it could be obscured by noise. (In many cases the single wavelet will stand out over the noise so that visual observation on an oscilloscope is practicable.) Thus the hydraulic transient generated by the valve 40 is received by the transducer 51 at a known time.

Step (d): The signal obtained by the transducer 51 is transmitted through the filter 150 to selectively transmit frequencies in the range from 0.1 Hertz to 10 Hertz. Because the drilling operations have been stopped (as outlined in the step (a) above), the random noise $U(t)$ is negligible, and consequently the signal obtained at the output of the filter 150 is of the form $F(t) B(t) + P(t)$.

Step (e): The signal $F(t)$ obtained from the filter 150 is passed through the delay element 152, subtractor 160, and A/D converter 163 in a manner which has been explained above. Usually when drilling is in progress, the signal obtained at the output of the A/D converter 163 is of the form $x_t = b_t + u_t$ where $u_t$ accounts for the noise due to drilling operations. However, here again, because the drilling operations have been stopped, the random noise signal $u_t$ is negligible. Under these conditions one has $x_t \sim b_t$. The signal $x_t$ represents as nearly as practicable, a "noiseless signal" which would correspond to a wavelet representing the information carrying signal.

Step (f): The function $x_t \sim b_t$ is stored.

Figure 12:
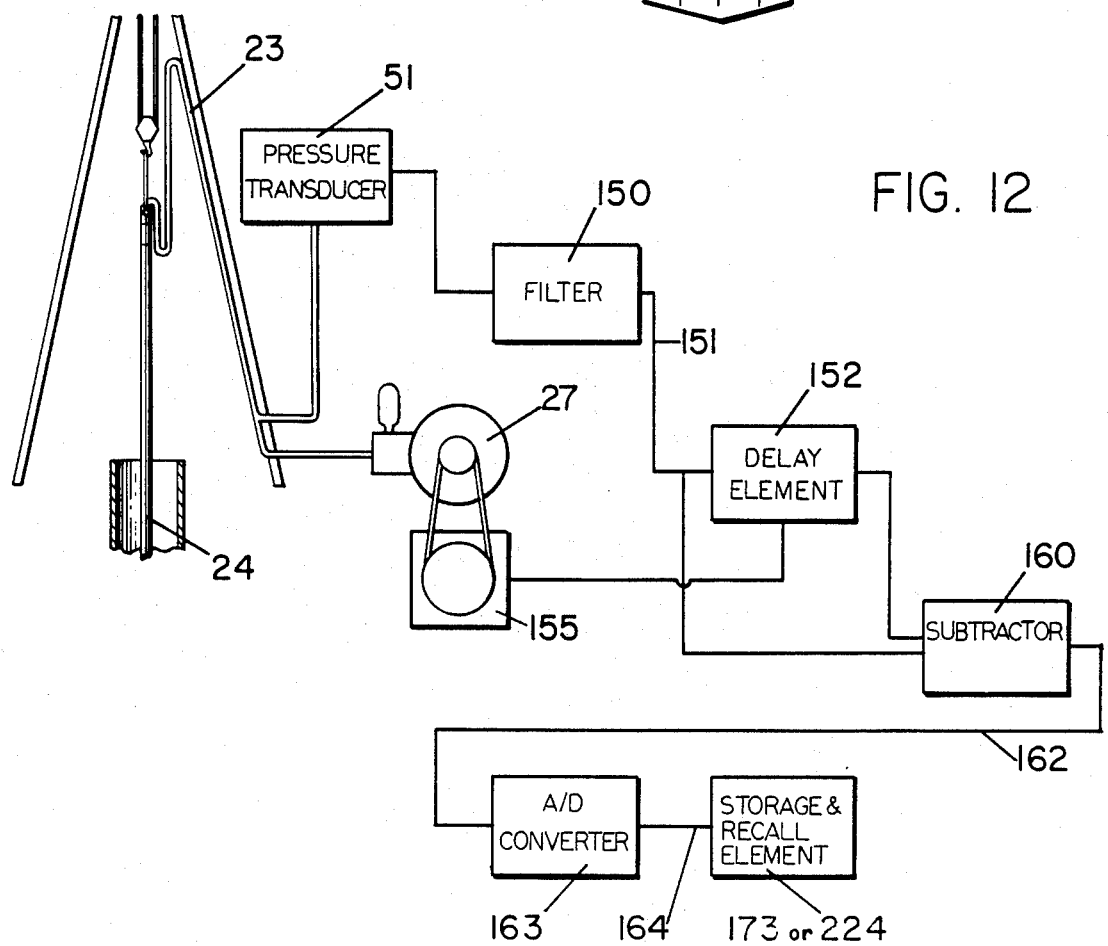
FIG. 12 shows schematically an arrangement for storing an information carrying signal or for storing a noise signal.

The operational steps (a), (b), (c), (d), (e), and (f) as outlined above are performed by means of the operational arrangement as shown in FIG. 12. In this arrangement, the output of the A/D converter 163 is applied to the input of the storage and recall element 173 for recording of $x_t \sim b_t$.

It should be noted that in frequency domain the memory function $a_t$ of the matched filter 170 can be expressed as $$A(f) = e^{-2\pi \nu f_n} B^*(f) \quad (42)$$

where f is frequency and $B^*(f)$ is the complex-conjugate of the Fourier transform of the signal $b_t$.

Elimination of random noise when the noise is white can, in some instances, be accomplished by means of an autocorrelator rather than by means of a matched filter, such as the matched filter 170 in FIG. 9. To do this the schematic diagram of FIG. 9 should be modified by eliminating the matched filter 174, computer 172, and storage and recall element 173. Instead, an autocorrelator would be used. The input terminals of the autocorrelator would be connected to the output leads 164 of the A/D converter 163. At the same time the output leads of the autocorrelator would be connected to the input leads 174 of the D/A converter 181. The output of the D/A converter may be processed by means of the delay element 190, polarity reversal element 192, AND gate 193, etc., as shown in FIG. 9. However, in some instances the output of the D/A converter may be applied directly to a recorder.

XIV.

TRANSFORMATION OF A CODED SEQUENCE OF DOUBLE WAVELETS INTO A CODED SEQUENCE OF SHORT PULSES (STEP NO. 3)

Consider again the operational arrangement of FIG. 9. I have now obtained at the output lead 182 of the D/A converter 181 a signal represented by a function y(t) which is shown in FIG. 10D and which has a shape similar to that of the double wavelet b(t); i.e., $y(t) \sim b(t)$.

The function $y(t) \sim b(t)$ represents a single bit in the digitalized signal which operates the valve 40. It is apparent that such a function is not very convenient for representing a very short time interval corresponding to a single opening and closing of the valve 40. It is therefore necessary as outlined in the Step No. 3 to transform a double wavelet into a single short pulse coincident with the operation of the valve. I accomplished this objective by means of a delay element 190 controlled by a clock 191 in combination with polarity reversal element 192 and an AND gate 193 (coincidence network) arranged as shown in FIG. 9. The delay element 190 receives through lead 182 the signal y(t) from the D/A converter 181. This delay element is controlled by a clock 191 so as to obtain at the output lead 195 a delay equal to time interval $T_m$. The delayed function $b(T-T_m)$ as shown in FIG. 10E is further applied through lead 195 to a polarity reversal element 192 to produce at the output lead 197 of the element 192 an inverted delayed double wavelet expressed as $-b(T-T_m)$ and shown in FIG. 10F.

The signal $-b(T-T_m)$ is applied through the lead 197 to the AND gate 193. At the same time, the signal b(t) derived from the D/A converter 181 is applied through the leads 182 and 200 to the AND gate 193. Each of the signals b(t) and $-b(t-T_m)$ includes pulses which have positive and negative polarity. By comparing the signal b(t) as in FIG. 10D with the signal $-b(t-T_m)$ as in FIG. 10F, it can be seen that there is only one pulse in FIG. 10D which is in time coincidence with the pulse at FIG. 10F. This pulse occurs at the time interval from $t_3$ to $t_4$ in FIG. 10D and from $t_9$ to $t_{10}$ in FIG. 10F. We note that the instants $t_3$ and $t_9$ are coincident since $t_3 = t_1 + T_m$ and $t_9 = t_1 + T_m$. Similarly the instants $t_4$ and $t_{10}$ are coincident since $t_4 = t_1 + T_n T_m$ and $t_{10} = t_1 + T_n T_m$. Consequently a single coincidence pulse is derived from the double wavelet b(t) and is shown in FIG. 10G. Accordingly the AND gate 193 which received at its input leads 200 and 197 signals representing the function b(t) and $-b(t-T_m)$, respectively, generates at its output lead 210 a single pulse as shown in FIG. 10G.

It should be recalled that in the interest of simplicity I have shown in this embodiment a single pulse which is produced and is substantially coincident with a single opening and closing of the valve. One should keep in mind that in actual drilling and simultaneous measuring operation one obtains at the output lead 210 a coded succession of single pulses which represent a measurement performed by a selected sensor of a selected parameter.

The coded succession of single pulses obtained at the output lead 210 of the AND gate 193 is applied to a D/A converter 211 which is controlled by a clock 212. At the output lead 214 of the D/A converter 211, one obtains in analog form a signal representing the measurement of the selected parameter. This signal is recorded by means of the recorder 54.

XV.

USE OF CROSS CORRELATION

In another embodiment of my invention, a cross correlator can be used instead of a matched filter for noise elimination. There is a close analogy between convolution of two functions, as shown by means of the equation (20a), and cross correlation. Cross correlation of one function with another produces the same result as would be produced by passing the first function through a filter (matched filter) whose memory function is the reverse of the second function. (See for instance a publication by N. A. Anstey, "Correlation Techniques—A Review," Geoph. Prosp. Vol. 12, 1964, pp. 355–382, or a publication by Y. W. Lee on "Statistical Theory of Communication," John Wiley and Sons., New York, N.Y., 1960, p. 45.)

Figure 13:
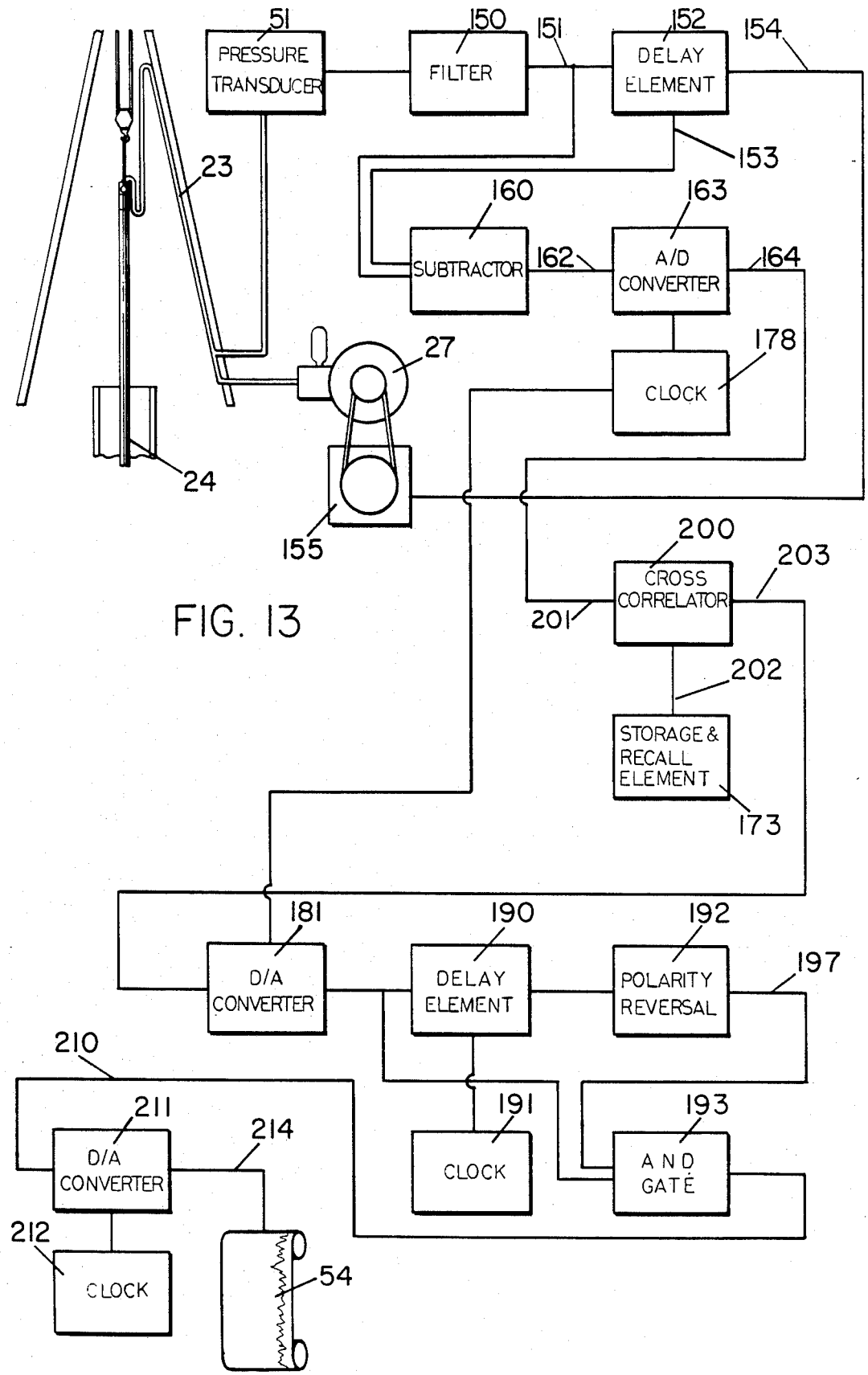
FIG. 13 shows, schematically a portion of the above ground equipment comprising a correlator for noise elimination.

I show in FIG. 13 how the same operations which can be performed by a matched filter may also be performed by a cross correlator 200. The cross correlator 200 is provided with two input terminals 201 and 202 and an output terminal 203. The signal $x_t$ derived from the A/D converter 163 is applied to the input terminal 201, whereas the signal $b_t$ derived from the storage and recall element 173 is applied to the input terminal 202. A signal representing the cross correlation of $x_t$ and $b_t$ is thus obtained at the output lead 203. It is easily seen that the cross correlation signal obtained at the output lead 203 is identical to the convolution signal $y_t$ as expressed by equation (33) and produced in FIG. 9 by the matched filter 170. The cross correlation signal is further processed as shown in FIG. 13 in the same manner as the signal obtained by means of the matched filter 170 was processed in the arrangement of FIG. 9. The cross correlator 200 may be of the type known as Model 3721A as manufactured by Hewlett Packard Company of Palo Alto, Calif.

XVI.

ELIMINATION OF RANDOM NOISE WHEN RANDOM NOISE IS NOT WHITE NOISE

Figure 14:
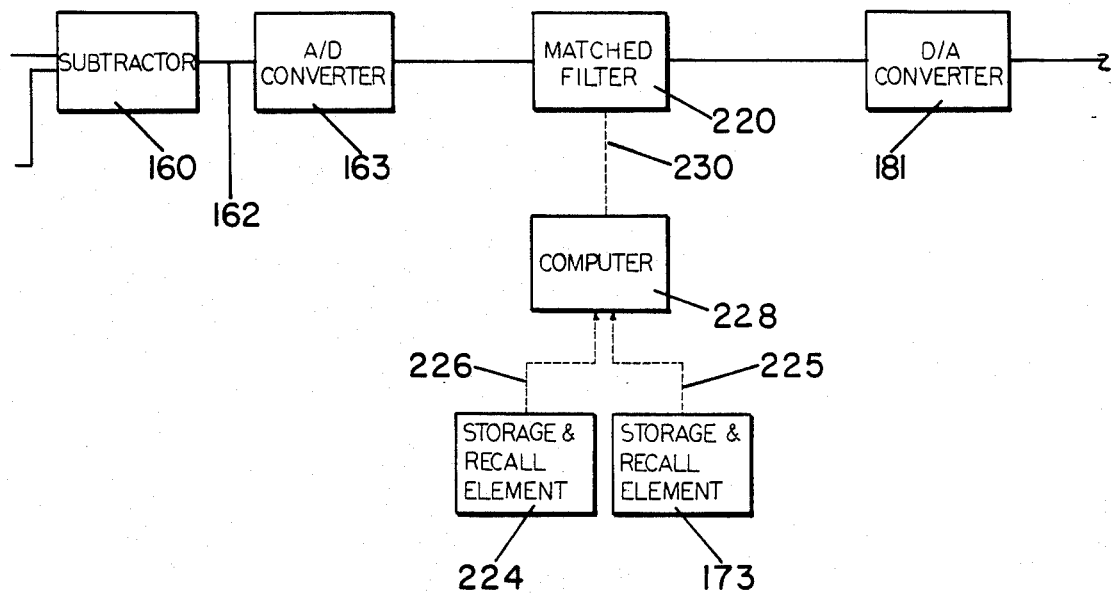
FIG. 14 shows schematically a portion of the above ground equipment comprising a matched filter for noise elimination when the noise is not white.

When random noise is white noise, the auto correlation $q_t$ of the noise function is zero for $t \neq 0$. Consider now the case when the unwanted noise $u_t$ has a known auto correlation function $q_t$, where the coefficients $q_t$ are not necessarily zero for $t \neq 0$. This is the case of "auto correlated noise," in contradistinction to pure white noise, whose only nonvanishing auto correlation coefficient is $q_0$. An appropriate form of a matched filter and related components is shown in FIG. 14. In this case it is required to store not only the information carrying signal $b_t$ (as by means of the element 173) but also the noise signal $u_t$. Accordingly, the arrangement of FIG. 14 includes two storage and recall elements which are 173 and 224. The storage and recall element 173 performs a function which is identical to that of the element designated by the same numeral in FIGS. 9 and 12. It serves to store and subsequently to generate the function $b_t$. On the other hand the function of the storage and recall element 224 is to store and subsequently reproduce the noise function $u_t$. The data representing the functions $b_t$ and $u_t$ obtained from storage elements 173 and 224 respectively, are applied through channels 225 and 226, respectively, to a computer 228. The function of the computer 228 is to transform the input received from the input channels 225 and 226 into data required to determine the memory function of the matched filter 200. The latter data are applied to the matched filter 220 through the channel 230.

The notation now will be the same as before, except that one must now bear in mind that the noise $u_t$ is no longer white noise. The matched filters to be discussed here are indeterminate in the sense of an arbitrary amplification factor k, which is set equal to unity for convenience.

The same definition of the signal to noise ratio $\mu$ will be used. Thus $$\mu = \frac{c_n^2}{E\{v_n^2\}} \tag{43}$$

It is desired to maximize $\mu$ subject to the assumption that the input noise $u_t$ is the auto correlated kind. It will be convenient to introduce matrix notation at this point. Let $$a = (a_0, a_1, \ldots, a_n) \tag{44}$$

designate the (n+1) row vector which characterizes the memory of the matched filter 220. Furthermore, let $$b = (b_n, b_{n-1}, \ldots, b_0) \tag{45}$$

be the (n+1) row vector that defines the time reverse of the signal $b_t$ and let $$q = \begin{bmatrix} q_0 & \cdots & q_n \\ \cdot & & \cdot \\ \cdot & & \cdot \\ \cdot & & \cdot \\ q_n & \cdots & q_0 \end{bmatrix}$$

be the (n+1) by (n+1) auto correlation matrix of the noise. Then one can write $$\mu = \frac{(ab')(ba')}{aqa'} \tag{46}$$

where the prime (') denotes the matrix transpose.

In order to maximize $\mu$ the quantity (46) will be differentiated with respect to the filter vector a and the result will be set as equal to zero.

A relationship is obtained $$qa' = b' \tag{47}$$

which can be written out in the form $$\begin{bmatrix} q_0 & \cdots & q_n \\ \cdot & & \cdot \\ \cdot & & \cdot \\ \cdot & & \cdot \\ q_n & & q_0 \end{bmatrix} \begin{bmatrix} a_0 \\ a_1 \\ \cdot \\ \cdot \\ \cdot \\ a_n \end{bmatrix} = \begin{bmatrix} b_n \\ b_{n-1} \\ \cdot \\ \cdot \\ \cdot \\ b_0 \end{bmatrix} \tag{48}$$

This is the matrix formulation of a set of (n+1) linear simultaneous equations in the (n+1) unknown filter coefficients ($a_0, a_1, \ldots, a_n$). It's solution yields the desired optimum matched filter in the presence of auto correlated noise. The equation (48) may be solved by the Wiener-Levinson recursion technique (See N. Levinson "The Wiener RMS error criterion in Filter Design and Prediction," Jour of Mat. and Phys. 1947, v. 25, pp. 261-278 and S. Treitel and E. A. Robinson, "Seismic Wave Propagation in Terms of Communication Theory", Geophysics, 1966, Vol. 31, pp. 17-32). This recursive method is very efficient, and it is thus possible to calculate matched filters of great length by means of the computer 228. The known quantities in this calculation are the noise auto correlation matrix q and the time reverse of the signal wavelet $b_{n-t}$ while the unknown quantities are the filter coefficients $a_t$. These filter coefficients represent the memory function of the matched filter 220.

The computations which are required to determine the memory function of the matched filter 220 are performed by the computer 228. The computer receives from the storage and recall elements 173 and 224 data regarding the functions $b_t$ and $u_t$ respectively. Upon the reception of $q_t$ the noise auto correlation matrix is calculated, and upon the reception of $b_t$ the time reverse of this signal is determined. Subsequently the unknown filter coefficients $a_t$ are calculated and then transmitted through the output channel 230 to the matched filter 220.

The output of the matched filter 220 is applied to a D/A converter 181 and further processed in the same manner as the output of the matched filter 170 was processed in the arrangement of FIG. 9.

In frequency domain, the memory function of the matched filter 220 can be expressed as $$A(f) = e^{-2\pi fn} \frac{B^*(f)}{Q(f)} \tag{49}$$

where $B^*(f)$ is the Fourier transform of the time reverse of the signal $b = (b_0, b_1, \ldots, b_n)$ and Q(f) is the power spectrum of the noise in the interval (f+df). The physical meaning of the expression (49) is simple. The larger the amplitude spectrum $|B(f)|$ of the signal and the smaller the power density spectrum Q(f) of the noise in the interval (f, f+df), the more the matched filter transmits frequencies in that interval. Thus, if the power spectral density Q(f) of the noise is small in some interval of the frequency band occupied with the signal, the matched filter is essentially transparent (attenuates very little) in this interval.

Consider now the signal storage and recall elements 173 and 224. The procedure required to store the signal $b_t$ by means of the element 173 has been previously described in connection with steps (a) to (f) as performed by means of the arrangement of FIG. 12.

A different approach is required in order to store the noise signal $u_t$ by means of the element 224. As was pointed out previously in connection with FIG. 12, it is possible to receive and store a "noiseless signal". Similarly, because of the synchronism between the subsurface and surface "clocks", it is possible to receive and store "signalless noise"; i.e., the signal received by the transducer 51 during its normal drilling operation (containing all the noises incidental to this drilling operation but no information carrying signal). In this case the arrangement of FIG. 12 can also be used to illustrate the required procedures. The steps for obtaining a record of the function u(t) can be stated as follows:

Step ($\alpha$): Weight on the bit is applied and normal drilling operations are conducted.

Step ($\beta$): A time is chosen when no information carrying signal is present; i.e., a pause between binary words.

Step ($\gamma$): A signal is obtained which represents pressure variation of the drilling fluid at the transducer 51. This signal is transmitted through the filter 150. Because of the time chosen in step ($\beta$) above, the signal b(t) is nonexistent, and consequently, the signal obtained from the output of the filter 150 has the form $F(t) = P(t) + W(t)$.

Step ($\delta$): Pump noises signal P(t) is eliminated. This is accomplished by means of the delay element 152 and subtractor 160. Then the resultant signal is applied to the A/D converter 163. Since no information carrying signal is present, $b_t = 0$, and consequently, the signal obtained from the output of the A/D converter 163 has the form $x_t = u_t$.

Step ($\epsilon$): A record of the function $x_t = u_t$ is obtained by utilizing the storage and recall element 224 at the output of the A/D converter 163, as shown in FIG. 12.

Summarizing what has been said above, it can be seen that if the noise is white, then the matched filter 170 and related components as shown in FIG. 9 guarantee the optimum value of signal to noise ratio $\mu$. If the noise is not white but has a known auto correlation function, then the matched filter 200 and related components as shown in FIG. 14 guarantees the optimum value of $\mu$.

XVII

PULSE SHAPING FILTER OF WIENER TYPE

Figure 15:
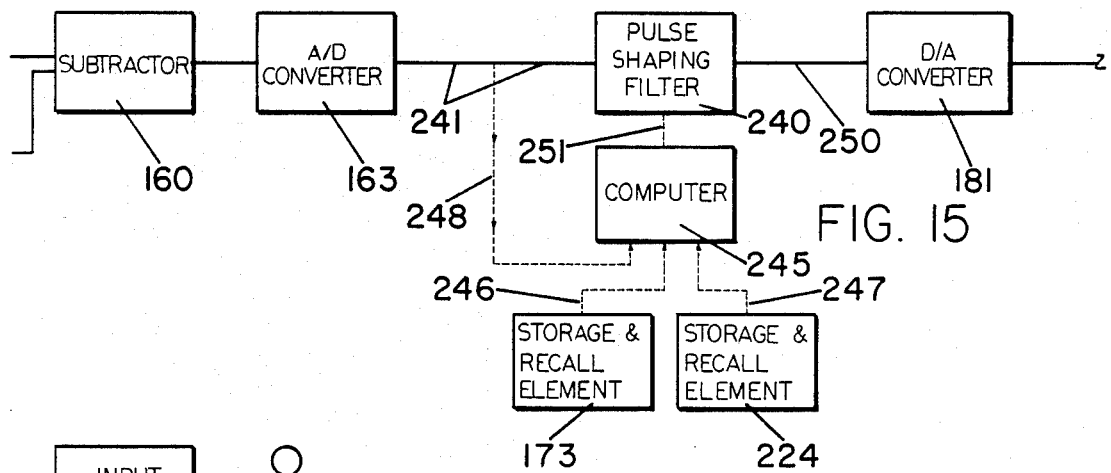
FIG. 15 shows schematically a portion of the above ground equipment which contains a pulse shaping filter.

FIG. 15 shows a portion of the surface equipment comprising a filter which operates on a principle which is different from that of the matched filter in FIG. 9 or in FIG. 14. The matched filter in FIG. 9 or FIG. 14 is optimum in the sense that it is a linear filter that optimizes the signal to noise ratio. On the other hand the filter 240 in FIG. 15, designated as a pulse shaping filter or Wiener filter, is optimum in the sense that it is a linear filter that minimizes the mean square difference between a desired output and an actual output. (For a description of such a filter see, for instance, the publication by E. A. Robinson and Sven Treitel on "Principles of Digital Wiener Filtering," Geophysical Prospecting 15, 1967, pp. 312-333 or a publication by Sven Treitel and E. A. Robinson on "The Design of High-Resolution Digital Filters," IEEE Transactions on Geoscience Electronics, Vol. GE-4, No. 1, 1966, pp. 25-38.)

Figure 16:
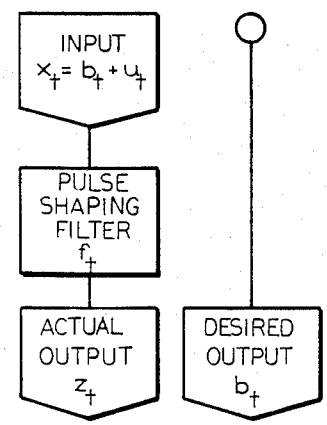
FIG. 16 illustrates schematically certain operations performed by a pulse shaping filter.

The pulse shaping filter 240 in FIG. 15 receives via its input channel data regarding the function $t_t = b_t + u_t$ derived from the A/D converter 163. The pulse shaping filter is an (m+1) length filter having a memory $$f_t = (f_0, f_1, \ldots, f_m) \tag{50}$$

which converts in the least error energy sense the (n+1) length input $x_t = (x_0, x_1, \ldots, x_n)$ into an (m+n+1) length output $z_t = (z_0, z_1, \ldots, z_{m+n})$. A model for such a filter is shown in FIG. 16. In this model there are three signals, namely: (1) the input signal $x_t$, (2) the actual output signal $z_t$, and (3) the desired output signal $b_t$. The signal $b_t$ is a double wavelet as in FIG. 10C.

The output signal $z_t$ is a convolution of the filter memory function $f_t$ with the input function $x_t$, that is, $$z_t = f_t * x_t \tag{51}$$

The problem is to determine the memory function $f_t$ so that the actual output $z_t$ is as close as possible (in the least error energy sense) to the desired output $b_t$. To select the memory function, the following quantity is minimized:

$$I = \text{(Sum of squared errors between desired output and filtered signal wavelet)} + \nu \text{ (Power of the filtered noise).}$$

where $\nu$ is a preassigned weighting parameter.

The computations which are required for minimizing I are performed by the computer 245 which is provided with three input channels 246, 247, and 248, respectively. A storage and recall element 173 transmits to the computer 245 through the channel 246 data regarding the function $b_t$. Similarly, storage and recall element 224 transmits to the computer 245 through the channel 247 data regarding the function $u_t$. The channel 248 is used to transmit to the computer 245 data regarding the functions $x_t$ which are also applied to the input lead 241 of the pulse shaping filter 240.

Upon reception of the input signals $b_t$, $u_t$ and $x_t$ applied through the channels 246, 247, and 248 respectively, the computer 245 is arranged to perform certain calculations to be described later and to transmit through the output channel 251 to the pulse shaping filter 240 the required data concerning the memory function of the filter 240. Thus, the actual filter output $z_t$ is in the least error energy sense as close as possible to the desired output $b_t$. In other words $$z_t \sim b_t \tag{52}$$

as shown in FIG. 10D.

Consider now more in detail the operations which are performed by means of the computer 245. In symbols, the quantity I to be minimized is $$I = \sum_{t=0}^{m+n} (b_t - z_t)^2 + \nu E\{v_t^2\} \tag{53}$$

where the notation E { } indicates the ensemble average and where $$v_t = \sum_{s=0}^{m} f_s u_{t-s}$$

represents the filtered noise. Simplifying the expression for I, one obtains $$I = \sum_{t=0}^{m+n} \left( b_t - \sum_{s=0}^{m} f_s x_{t-s} \right)^2 + \nu \sum_{s=0}^{m} \sum_{t=0}^{m} f_s q_{t-s} f_t \quad (54)$$

Here $$q_{t-s} = E\{u_{\tau-s} u_{\tau-t}\} \quad (55)$$

where $\tau$ is a dummy time index, and where $q_{t-s}$ is the auto correlation of the received noise. Differentiating the expression for I with respect to each of the filter coefficients, and setting the derivatives equal to zero, a set of simultaneous equations is obtained which is $$\sum_{s=0}^{m} f_s r_{t-s} + \nu q_{t-s} = g_t \quad (56)$$

for $t=1, 2, \ldots, m$. In the above equations the quantities $r_{t-s}$, $q_{t-s}$ and $g_t$ are known, whereas the quantities $f_s$ are unknown.

Calculations performed by the computer 245 serve to determine the parameters $r_{t-s}$, $q_{t-s}$ and $g_t$ from the input functions applied to channels 248, 247, and 246 respectively, and then to solve the equations (56) for the unknown quantities $f_s$. The parameters $r_{t-s}$, $q_{t-s}$, $\nu$, and $g_t$ are defined as follows: The parameter $r_{t-s}$ is the auto correlation of the input signal $x_t$, which is applied to the computer 245 through the channel 248. The parameter $q_t$ is the auto correlation of the noise signal $u_t$, which is applied to the computer 245 through the channel 247. The parameters $g_t$ are defined as the cross product coefficients between the desired output $b_t$ and input $x_t$. Thus, $$g_t = \sum_{s=0}^{m} b_s x_{s-t} \quad (57)$$

for $t=0, 1, 2, \ldots, m$. In the expression for $g_t$ the desired output $b_s$ is applied to the computer 245 through the channel 246 and the input $x_t$ is applied through the channel 248. The parameter $\nu$ is a weighting parameter to which an appropriate value is assigned as discussed later in this specification.

Thus, the parameters $r_{t-s}$, $q_{t-s}$ and $g_t$ are determined by the computer 245 and then the computer solves the equations, thus producing at the output channel 251 the quantities $f_s$. These quantities are applied to the memory of the pulse shaping filter 240. The actual output $z_t$ of the filter 240 is in the least energy sense as close as possible to the desired output $b_t$.

Since the matrix of the equation, namely the matrix $[r_{t-s} + \nu q_{t-s}]$ is in the form of an auto correlation matrix, these equations can be solved efficiently by the recursive method. This recursive method has been described in the following two publications: N. Levinson, "The Wiener RMS (root mean square criterion) in Filter Design and Prediction," Appendix B of N. Wiener, "Extrapolation, Interpolation, and Smoothing of Stationary Time Series", John Wiley, New York, N.Y. 1949, and Enders A. Robinson on "Statistical Communication and Detection with Special Reference on Digital Data Processing of Radar and Seismic Signals," pages 274-279, Hafner Publishing Company, New York, N.Y. 1967.

It should be noted that the machine time required to solve the above simultaneous equations for a filter with m coefficients is proportional to $m^2$ for the recursive method, as compared to $m^3$ for the conventional method of solving simultaneous equations. Another advantage of using this recursive method is that it only requires computer storage space proportional to m rather than $m^2$ as in the case of conventional methods.

In designing a pulse shaping filter two requirements may be considered; namely, (a) to shape as close as possible the function $z_t$ into the desired function $b_t$.

(b) to produce as little output power as possible when the unwanted stationary noise is its only input.

In many practical situations a filter is needed for performing both of the above requirements simultaneously, and so one is faced with the problem of finding some suitable compromise between the two requirements. Hence one selects an appropriate value for the parameter $\nu$ which assigns the relative weighting between these two requirements.

There are situations where the value zero is assigned to $\nu$. In such case the expression (53) takes a simpler form, namely $$I = \sum_{t=0}^{m+n} (b_t - z_t)^2 \quad (58)$$

and the computer 245 does not require the data representing $u_t$. In such case the storage and recall element 224 shown in FIG. 15 is removed and, thus, the computer 245 is provided with two input channels only; namely, the channel 246 and the channel 248.

It should now be observed that the performance of a pulse shaping filter and that of a matching filter are not exactly alike; i.e., for a given input, the outputs of these filters are not identical. The expression $y_t \sim b_t$, which is applicable to a matched filter, has been used above in order to indicate that the signal expressed by $y_t$ (which represents the output of a matched filter) closely approximates the double wavelet $b_t$. Accordingly, it was pointed out that the same graph in FIG. 10D represents the functions y(t) as well as the functions b(t). It should also be noted that the expression $z_t \sim b_t$ which is applicable to a pulse shaping filter has been used above in order to indicate that the signal expressed by $z_t$ (which represents the output of a pulse shaping filter) closely approximates the double wavelet $b_t$. Accordingly, it was pointed out that the same graph in FIG. 10D represents the function z(t) as well as the function b(t). Strictly speaking, the same graph in FIG 10D should not be used to represent the functions, b(t), y(t) and z(t). However, since both y(t) and z(t) closely approximate b(t), it is believed to be appropriate for the purpose of explanation to use the same graph of FIG. 10D to discuss the performance of a matched filter and that of a pulse shaping filter.

XVIII.

WAVELET SPIKING

Figure 17:
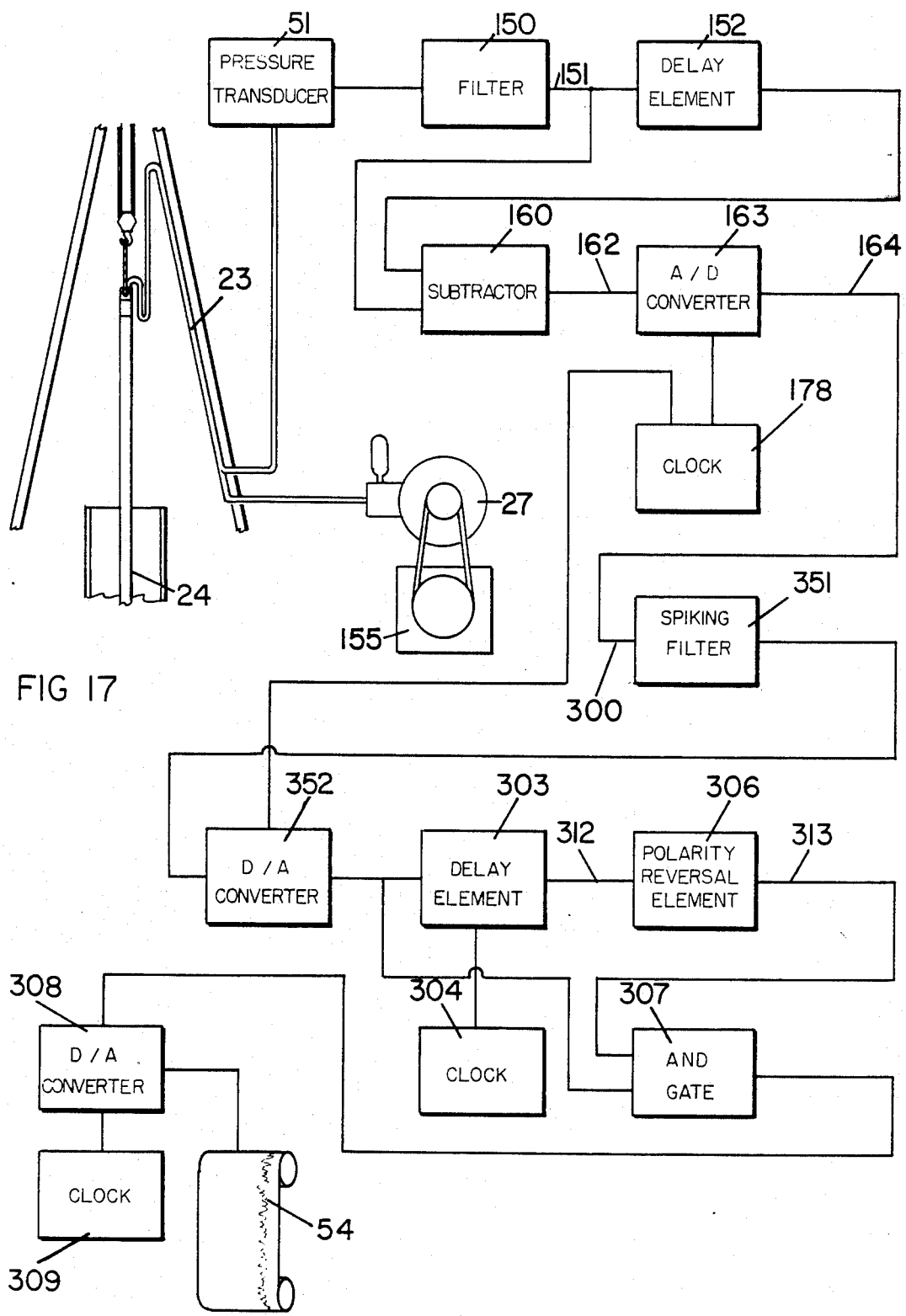
FIG. 17 shows schematically a portion of the above ground equipment comprising a spiking filter wherein a spiking filter is used to transform a double wavelet into a corresponding pair of spikes.
Figure 18A:
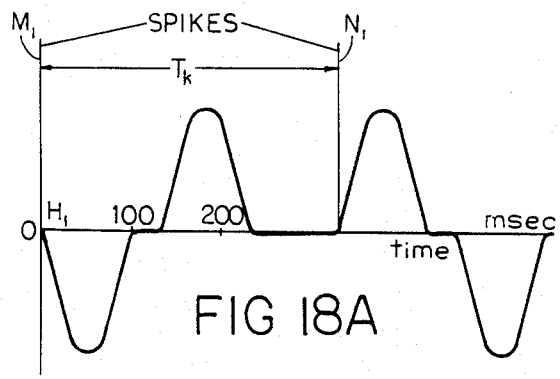
FIGS. 18A to 18F show six possible choices for a spike lag for a pair of spikes, as produced by means of the arrangement of FIG. 17.
Figure 18D:
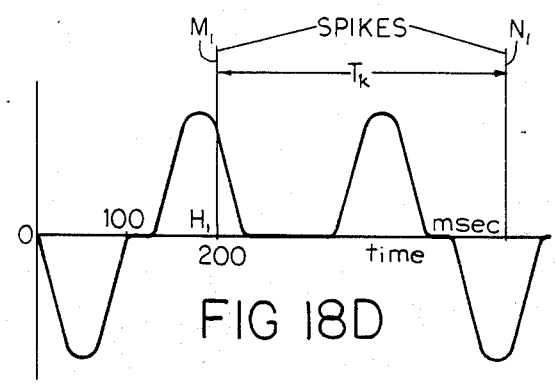
Figure 18B:
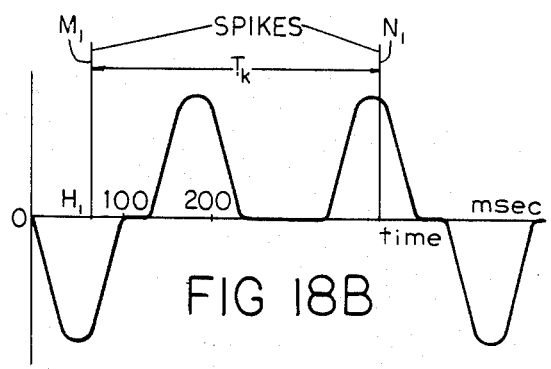
Figure 18E:
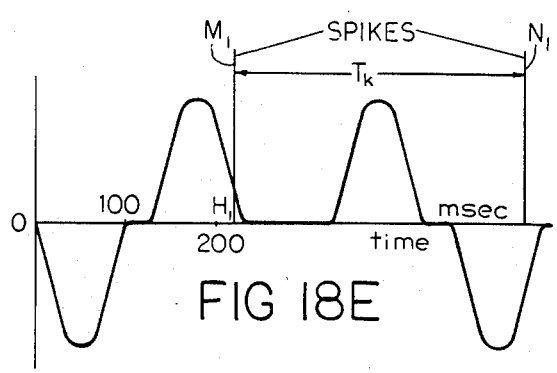
Figure 18C:
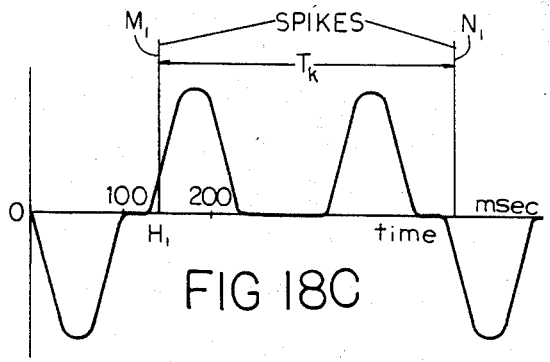
Figure 18F:
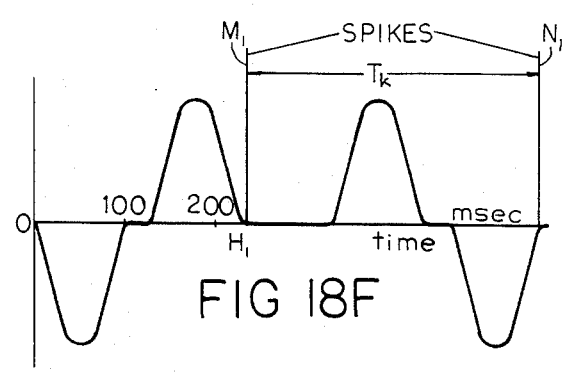
Figure 20A:
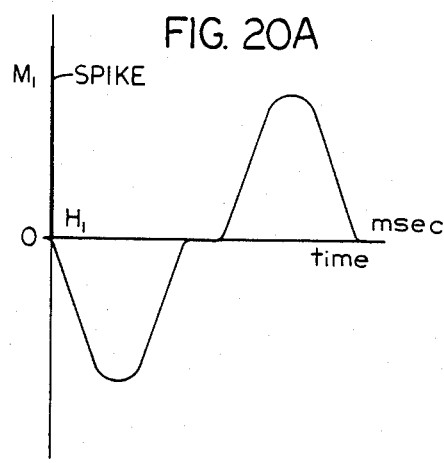
FIG. 20A to FIG. 20F show six possible choices for a spike lag for a single spike as produced by means of the arrangement of FIG. 19.
Figure 20D:
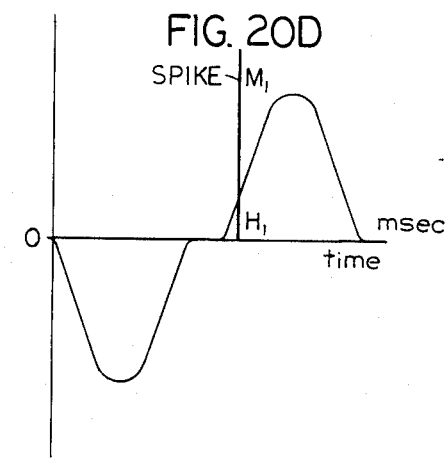
Figure 20B:
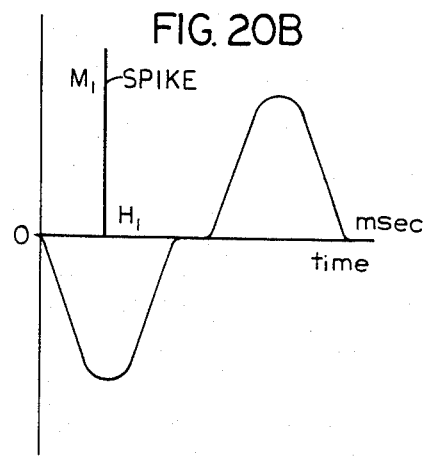
Figure 20E:
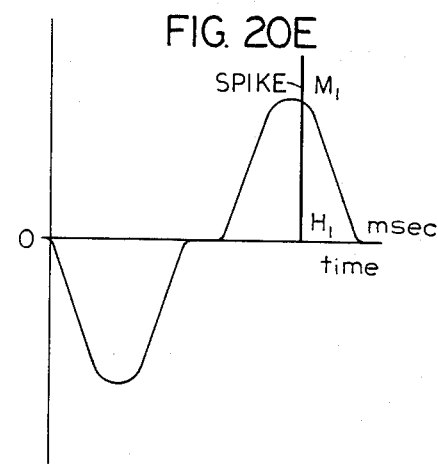
Figure 20C:
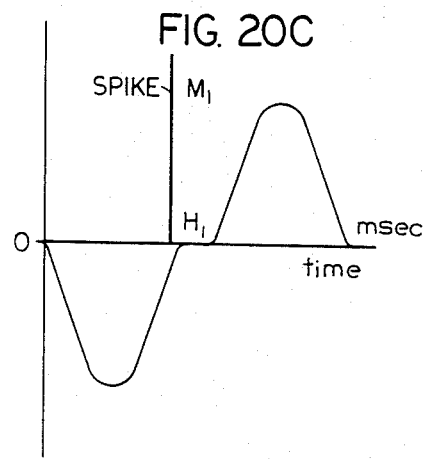
Figure 20F:
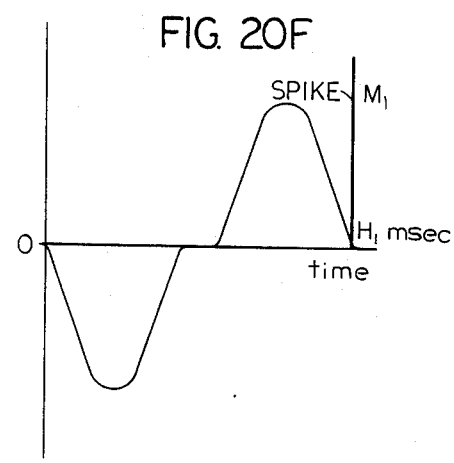

Consider now the operational arrangement shown by FIG. 17. I have obtained at the output lead 162 of the subtractor 160 both the information carrying signal b(t)

and the noise signal u(t). The signal b(t) is the double wavelet as shown in FIG. 10C. The mixture of the signals b(t) and u(t) is applied to the A/D converter 163, thereby producing at the output lead 164 of the converter digitalized signals $b_t$ and $u_t$; these signals corresponding to the analog signals b(t) and u(t), respectively. The mixture of these two signals $b_t$ and $u_t$ is in turn applied to the input lead 300 of a spiking filter 351. The spiking filter is a particular case of a Wiener type pulse shaping filter in which the desired shape is simply a spike. (For a description of a spiking filter see, for instance, the publication by S. Treitel and E. A. Robinson on "The Design of High-Resolution Digital Filter" IEEE Transactions on Geoscience Electronics, Vol. GE-4, No. 1, 1966 pp. 25–38.)

It should now be recalled that a double wavelet b(t) such as shown in FIG. 10C consists of two valve wavelets; i.e., a valve wavelet "A" and a valve wavelet "B". The valve wavelet "B" follows the valve wavelet "A" after a time $T_p$. The function of the spiking filter to be used in the embodiment of FIG. 17 is to transform the valve wavelet "A" as well as the valve wavelet "B" into a respective clearly resolved spike. Thus, a double valve wavelet $b_t$ is converted by means of the spiking filter 351 into a pair of spikes.

FIGS. 18A to 18F show respectively six possible positions of a pair of spikes (such as $M_1$ and $N_1$) with respect to the double wavelet applied to the input terminal 300 of the spiking filter 351. Let $T_k$ be the time interval between the spikes $M_1$ and $N_1$, which is the same in all of FIGS. 18A to 18F. Let $H_1$ be the point of intersection of the spike $M_1$ with the axis of abscissas (expressed in milliseconds). Thus, the distance $OH_1$ (in milliseconds) will represent the time lag of the spikes with respect to the double wavelet. Accordingly, in FIG. 18A the time lag $OH_1=0$; i.e., the initial spike $M_1$ is placed at the very beginning of the double wavelet. The five cases shown in FIGS. 18B to 18F correspond to increasing values of the time lag $OH_1$. One of these figures represents the optimum value of the time lag for which the resolution of the spiking filter is the highest. For such an optimum time lag the output signal derived from the spiked filter is noticeably sharper than for any other time lag. A procedure for obtaining the optimum value of the time lag, the optimum length of the memory of the filter, and the optimum value of the time interval $T_k$ will be described later in this specification.

A double spike obtained at the output terminal of the spiking filter 351 represents a single bit in the digitalized signal which operates the valve 40. It is desirable as pointed out in connection with FIG. 9 to transform a double spike into a single spike or pulse. I apply here a processing system similar to that in FIG. 9. (See Section XIV of the specification entitled "Transformation Of A Coded Sequence Of Double Wavelets Into A Coded Sequence Of Short Pulses—Step #3"). Accordingly, I provide a delay element 303 controlled by a clock 304 in combination with polarity reversal element 306 and an AND gate (coincidence network) 307. These are arranged in a manner similar to that shown in FIG. 9. However, the amount of delay in FIG. 17 is different from that in FIG. 9. Namely, in FIG. 17 the delay element 303 should produce an output signal which is delayed with respect to the input signal by an amount $T_k$, whereas in FIG. 9 the delay produced by the corresponding delay element 193 amounts to $T_m$.

A coded succession of single pulses obtained at the output lead of the AND gate 307 is applied to a D/A converter 308 controlled by a clock 309. At the output lead of the D/A converter 308, one obtains in analog form a signal representing the measurement of a selected parameter in the borehole. This signal is recorded by means of recorder 54.

It should be noted that in some instances, depending on the specific electronic circuitry chosen for the various blocks shown in FIG. 17, the polarity reversal element 306 may not be required, since its function may be performed by the appropriate design of the AND gate.

FIG. 19 shows an alternate arrangement for noise elimination by means of a spiking filter. In FIG. 17 a special means was provided for eliminating the pump noise (i.e., delay element 152 in combination with the subtractor 160). On the other hand, in FIG. 19 the procedure for noise elimination has been simplified. Thus, the signal processing using a delay element 152 and a subtractor 160 has been eliminated. Accordingly, in FIG. 19 the signal F(t) obtained at the output terminal 151 of the filter 150 is digitalized by means of an A/D converter 350 and then applied to a spiking filter 351a. The spiking filter 351a is designed differently from the spiking filter 351 of FIG. 17. In FIG. 17 the spiking filter 351 was designed to convert a double wavelet such as shown in FIGS. 18A to 18F into a pair of spikes separated one from the other by a time interval $T_k$. On the other hand the spiking filter 351a in FIG. 19 has been designed to convert a single valve wavelet into a single spike. Various positions of a single spike with respect to a single valve wavelet are shown in FIGS. 20A to 20F.

It should now be recalled that each single valve wavelet applied to the input terminal of the filter 351a and each single spike obtained from the output terminal of the filter 351a represents a single bit in the digitalized signals which operate the valve 40. The coded succession of the spikes in the digitalized format obtained from the output terminal of the spiking filter 351a is then applied to a D/A converter 352 where it is transformed into a coded succession of spikes, each spike representing a single bit of the information encoded at the subsurface instrumentation. The succession of these bits represents in a digital format the measurement of the selected parameter. It is, however, necessary for recording and-/or display purposes to represent this measurement in an analog form. Accordingly, the signal obtained from the D/A converter 352 is applied to a D/A converter 362 to produce at the output of the converter 362 a signal having magnitude representing the measurement of the selected parameter. This signal is recorded by means of the recorder 54.

It should be noted that the conversion of a double wavelet into two spikes by means of the spiking filter 351 as in FIG. 17 or the conversion of a single valve wavelet into a single spike by means of the spiking filter 351a as in FIG. 19 can only be approximated. A pure spike; i.e., a delta function, cannot be obtained. However, the objective of this invention is to increase resolution; i.e., to obtain an output signal which is noticeably sharper than the input signal.

Consider now the manner in which a spiking filter should be designed. In theory, this purpose may be achieved exactly if one could use a filter whose memory function is allowed to become infinitely long. For exact filter performance one also needs, in general, to delay the desired spikes by an infinite amount of time relative to the input wavelet. (See publication by J. C. Claerbout and E. A. Robinson on "The Error in Least Squares Inverse Filtering", Geophysics, Vol. 29, 1964 pp. 118-120,). In practice, it is necessary to design a digital filter whose memory function has finite duration and hence, at best, one can attain the objective only approximately.

Suppose that for practical reasons one wants to consider a filter which has memory function of the order of duration of an input wavelet. Assume that one is at liberty to place the desired spike at any selected location. For instance, FIGS. 18A to 18F shows six possible positions or locations of spikes for a spiking filter 301 of FIG. 17. Similarly FIGS. 20A to 20F show six possible positions of spikes for spiking filter 351 of FIG. 19. The optimum position of spikes was determined for each of these cases. It should be noted that the position of the spike is an important factor governing the fidelity with which the actual output resembles the desired spike.

A spiking filter is a particular case of a Wiener type pulse shaping filter previously herein described. Consequently, the required procedures to design such a filter are analogous to those which have been previously herein described. We are concerned with the determination of the elast error energy for a filter whose output is a spike.

In order to determine the optimum value of the time lag and the optimum length of the memory function for the spiking filter 301 in FIG. 17, it is necessary to obtain a record of a double wavelet $b_t$ (which is a digital version of b(t)). The necessary steps for obtaining such a record; i.e., steps (a), (b), (c), (d), (e) and (f) have been previously described with reference to FIG. 12. Thus, the record of $b_t$ is stored in the element 173 in the arrangement of FIG. 12. Similarly, in order to determine the optimum value of the time lag and the optimum length of the memory function for the spiking filter 351a, it is necessary to obtain a record of a single valve wavelet $B_t$ (which is a digital version of B(t)).

Consider the spiking filter 351a in FIG. 19. Various positions of a spike corresponding to various delays (FIGS. 20A to 20F) can be expressed as (1, 0, 0, . . . 0, 0): Spike at time index) or zero delay spiking filter.

(0, 1, 0, . . . 1, 0): Spike at time index m+n−1 or (m+m−1—delay spiking filter.

(0, 0 . . . 0, 1): Spike at time index m+n; (m+m)—delay spiking filter.

Figure 21A:
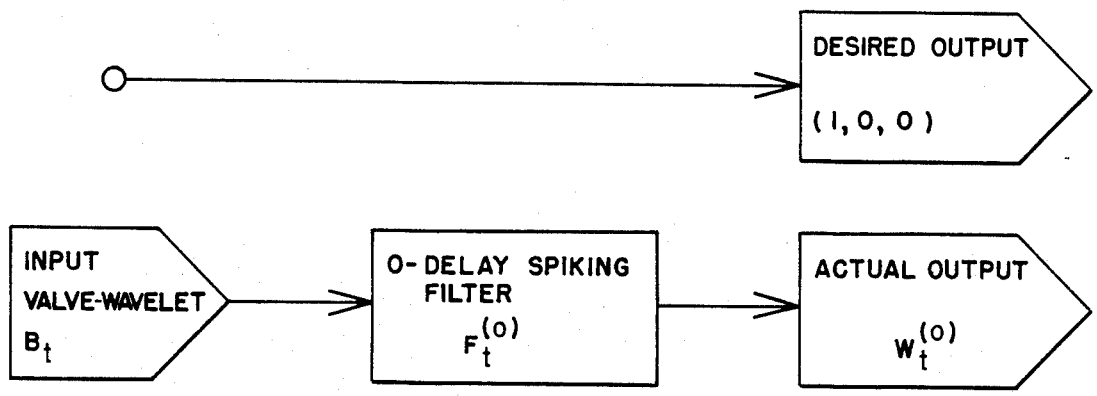
FIG. 21A to FIG. 21C show schematically certain operations associated with a spiking filter for various time delays. More specifically.
Figure 21B:
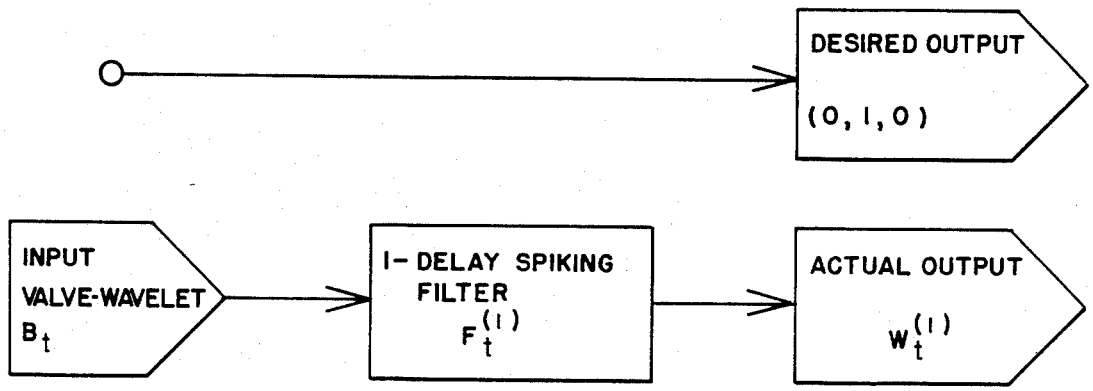
Figure 21C:
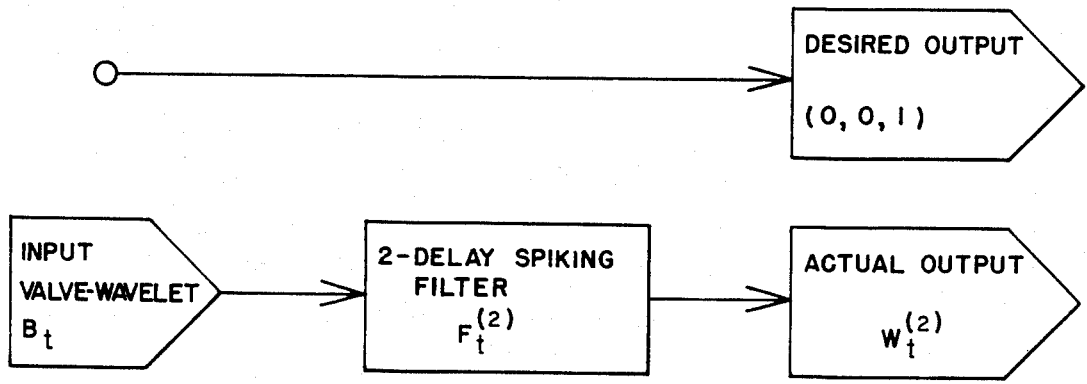

Performance of a spiking filter corresponding to various delays is illustrated diagrammatically in FIGS. 21A, 21B and 21C. In all these figures the input wavelet is the same; i.e., valve wavelet $B_t$ which has been recorded and stored as explained hereinabove. The desired output in FIG. 21A is a spike (1, 0, 0); i.e., a spike having zero delay. The corresponding memory function for a zero delay spiking filter is $F°=(F_1°, F_2°, F_3°, \ldots F_n°)$ and the actual output is $W_t°=(W_1°, W_2°, \ldots W_n°)$. Similar notation applicable to FIGS. 21B and 21C is shown in these figures. To each position of the spike there corresponds an energy error E. The normalized minimum energy error E represents a very convenient way to measure the performance of a pulse shaping Wiener type filter, and more particularly, of a spiking filter. When the filter performs perfectly, E=0, which means that the desired and actual filter outputs agree for all values of of time. On the other hand, the case E=1 corresponds to the worst possible case, that is, there is no agreeat all between desired and actual outputs. Instead of the quantity E, it is desirable to consider the one's complement of E which shall be called the filters performance parameter P.

$$P = 1 - E \qquad (46)$$

Perfect filter performance then occurs when P=1, while the worst possible situation arises when P=0.

FIG. 22 illustrates schematically the process of measuring the performance parameter P. A computer 400 is provided with three input channels 401, 402 and 404. The input channel 401 receives from the storage and recall element 403 data representing a valve wavelet $B_t$; input channel 402 receives from tine lag control 405 data re-regarding spikes for various time delays; and input channel 404 receives data from memory duration control 406 regarding spikes for various memory durations. The output at 410 of the computer 400 provides by means of a meter 411, a measure of the performance parameter P.

Figure 23:
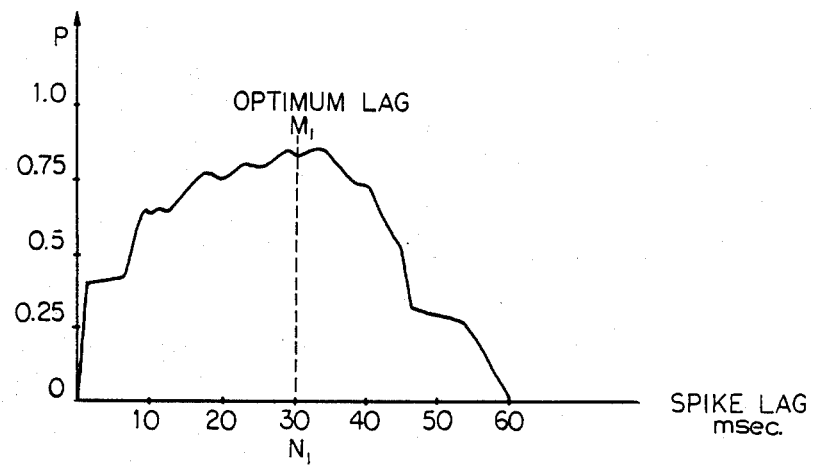
FIG. 23 is a graph showing how the performance of the filter P may vary with spike lag for a filter of fixed duration.

For a constant filter duration, one might suppose that there must exist at least one value of lag time at which P is as large as possible. In FIG. 23 there is shown a plot of P versus the lag time of output spikes for a family of filters of a fixed duration. It is observed that the highest point of curve (point $M_1$) corresponds to a time lag $ON_1$ and the choice of this time leads to the optimum time lag filter. It should be recalled that the curve in FIG. 23 relates to a filter of a fixed duration.

Figure 24:
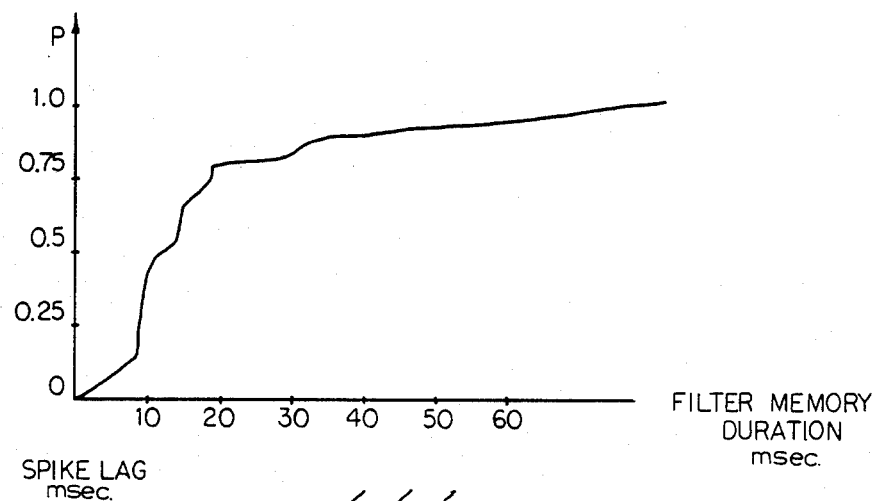
FIG. 24 is a graph showing how the performance parameter P of a spiking filter may vary with filter length (or memory duration) for a fixed spike lag.

One can also see what happens as one increases the filter memory duration at a constant time lag. FIG. 24 shows a plot of P vs. filter length for a desired and fixed spike time lag. It can be observed that this curve is monotonic, and that it approaches asymptotically the largest value of P as the filter length becomes larger and larger. The graphs as shown in FIGS. 23 and 24 are obtained by means of the arrangement schematically shown in FIG. 22.

The two important design criteria that have been discussed here are the filter time lag and the filter memory duration. One can always improve performance by increasing the memory function duration, but physical considerations prevent one from making this duration indefinitely long. On the other hand, one may search for that desired output time lag which leads to the highest P value for a given selected filter duration. This time lag in filter output harms in no way and can improve filter output drastically.

Figure 25:
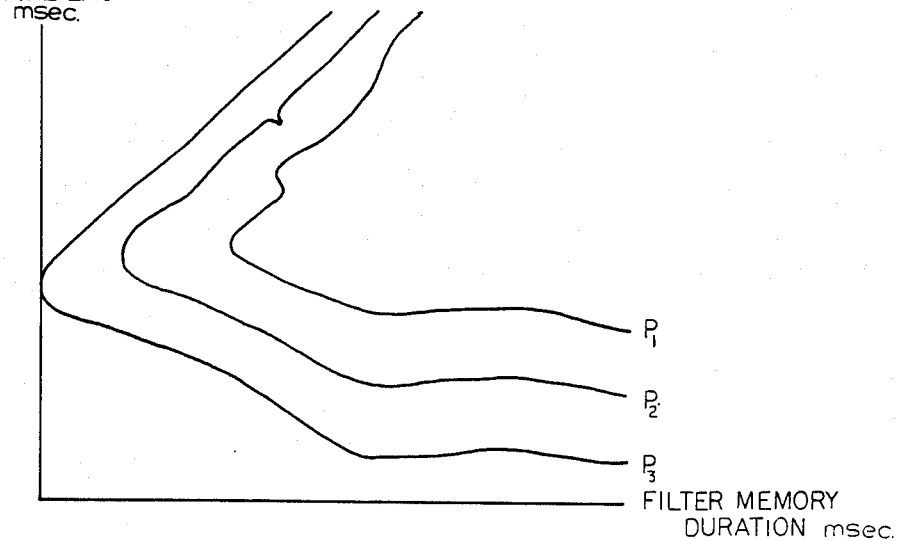
FIG. 25 contains graphs showing how the performance parameter P of a spiking filter may vary with filter length and filter time lag.

The filter performance parameter P as a function of time lag and a constant duration (FIG. 23), or the parameter P as a function of filter's memory duration for a constant time lag (FIG. 24) are helpful, but do not tell the whole story. Ideally one would like to investigate the dependence of P on time lag and memory duration for all physically reasonable values of these variables. One way this could be done is to plot P by taking filter time lag as ordinates and filter memory duration as abscissas. The array of P values can then be contoured so that one may see at a glance which combination of time lag and memory duration yields optimum filter performance. Such a contour map is given in FIG. 25. The map shows only the contours for $P_1$, $P_2$ and $P_3$. Obviously, one is most interested in the larger P values for it is there that the best filter performance is obtained. This display enables one to select the best combination of filter time lag and memory duration by inspection.

XIX.
PULSE TIME CODE

Although in the examples shown I described telemetering systems as employing a Binary code system, other codes are sometimes more suitable. For example, for a gamma ray sensor or an electronic compass-inclinometer a Pulse-Time code may be preferable. In some cases, especially where the sequential transmission of several numbers is required, a Pulse-Time code has advantages. For some arrangements of an electronic compass, it is necessary to sequentially transmit 5 numbers in order to measure the magnetic bearing. By using a telemetering system based on Pulse-Time code, a considerable saving both in the energy required from the battery and the time required for the transmission of the data can be achieved.

A conventional Pulse Time code transmission system is illustrated in FIG. 26A (for example for transmission of the values of 3 parameters). A series of voltage pulses is transmitted and the time duration ($t_1$, $t_2$, $t_3$) of each pulse a, b, c, is representative (e.g., proportional or inversely proportional) of the magnitude of the parameter being transmitted. It is noted that between each pulse a pause in time is required in order to separate the end of one pulse from the beginning of the next. Thus in FIG. 26A the pulses a, b, c are somewhat analogous to three binary "words", each being separated from the next by a time internal $T_w$. These pauses are, of course, a detriment to rapid data transmission since the pause itself carries no information. Furthermore, long time duration pulses are repugnant to the telemetering system of this invention.

I propose a type of Pulse Time code as shown in FIG. 26B. In this system it is not the duration of the pulse that is a measure of the parameter but the time between successive very short pulses. Instead of transmitting long pulses of variable duration, only short pulses of substantially constant duration (in the telemetering system of this invention, pulses lasting several milliseconds) are transmitted, and the time between the pulses is the measure of the magnitude of the parameter. Thus, no time is required to separate one time interval (representing a parameter) from the next. In FIG. 26B parameter No. 1 is represented by the time ($t_1$) between pulse $P_0$ and pulse $P_1$. Parameter No. 2 is represented by the time ($t_2$) between pulse $P_1$ and pulse $P_2$, and parameter No. 3 is represented by the time ($t_3$) between pulse $P_2$ and pulse $P_3$. It is seen that in the example above, pulse $P_1$ represents the end of time interval $t_1$ and also the beginning of time interval $t_2$, and pulse $P_2$ represents the end of time interval $t_2$ and also the beginning of time interval $t_3$ etc. Thus, there is no lost time between each significant time interval (i.e., $T_w$ of FIG. 26A is zero).

Thus it can be seen that by utilizing the pulses $P_1$, $P_2$, $P_3$, both to indicate the end of one time interval and also the beginning of the next time interval, the lost time (unused time) is zero; and all the time used for the transmission of data (i.e., identification of the time intervals $t_1$, $t_2$, $t_3$,) is useful time. In terms of binary coding, each "word" (identifying a number) is followed immediately by the next "word", and so on. Only at the end of a sequence of transmission is there a pause $T_p$, and then the sequence repeats. In the next sequence, of course, the time intervals between $P_0$, $P_1$, $P_2$, $P_3$ will be usually somewhat different since the data represented by the times $t_1$, $t_2$, $t_3$ usually vary with time; and each new transmitted batch of data represents, for example, a new condition in the borehole.

FIG. 30 shows the principles of the circuitry that can accomplish the Pulse Time Code of this invention. In the practical borehole instrumentation, of course, modern electronic integrated circuits (as for example, a type CD4066 Bilateral Switch) would be used (see also, FIG. 29). For ease of explanation, I will show a simple mechanical stepping switch and a simple mechanical relay so the principles of the logic of the system can be simply illustrated.

In FIG. 30, sensors are connected to the stepping switch terminals 1, 2, 3 of the stepping switch 285 which has an electromagnetic drive winding 286 as shown. Assume that we start the sequence with the stepping switch at position "0" as shown in FIG. 30. The battery 288 generates a reference DC voltage. This DC voltage will appear across the resistor 289 and will charge the capacitor 290 at a predetermined rate determined by the value of resistor 289, the size of the capacitor 290, and the voltage of the battery 288. 291 is a Trigger Circuit which generates a single sharp electric pulse when the voltage applied to its input exceeds a predetermined value (Trigger voltage). The output of the Trigger Circuit 291 activates the winding 286, and the arm 287 of stepping switch 285 moves over to the next contact (No. 1 in this case). Simultaneously, the Trigger Circuit 291 momentarily operates the relay 292, which discharges the capacitor 290 to ground.

When the arm 287 is moved from position "0" to position "1", the process repeats itself, except that, instead of the reference voltage of the battery 288, the voltage output of sensor No. 1 is connected to the circuit, and the pulse $P_1$ is generated at the time the capacitor again reaches the trigger voltage of the Trigger Circuit 291. This time is proportional to the value ($RC/V_s$) where R is the ohmic value of the resistor 289, C the capacitance of the capacitor 290 and $V_s$ the output voltage of the sensor. Thus the time $t_1$ is inversely proportional to the output voltage of the sensor.

After the activation of the Trigger Circuit 291 by the voltage from the sensor No. 1, the process repeats itself again and again, and when the voltage on the capacitor 290 reaches the trigger voltage, the Trigger Circuit 291 generates a sharp pulse which operates the relay 292, discharges the capacitor 290 and energizes the stepping switch 285 and moves the arm 287 to the next contact.

Thus, the stepping switch 285 steps in sequence and connects the Sensors 1, 2, 3, one after another to the resistor 289. The pulse generated by the Trigger Circuit 291 when the arm 287 is at position "0" corresponds to pulse $P_0$ (of FIG. 26B); and the pulses generated by the Trigger Circuit when the arm 287 is at respective positions "1", "2", "3" corresponds to respective pulses $P_1$, $P_2$, and $P_3$ (of FIG. 26B). The corresponding time intervals $t_1$, $t_2$, $t_3$ are representative (inversely proportional) of the voltage outputs of the sensors No. 1, No. 2, No. 3.

The above paragraphs describe the principle of the Pulse Time encoder which may be employed in the downhole equipment in place of the A/D Converter 102 in FIG. 4A. The decoding at the surface may be accomplished by conventional Pulse Time decoding circuitry and need not be discussed in detail here.

In FIG. 26C, $TP_0$, $TP_1$, $TP_2$, $TP_3$, etc. represent successive pulses received at the detecting point at the surface. These pulses occur at times $T_0$, $T_1$, $T_2$, $T_3$ etc. respectively. In the Pulse Time code as described in relation to FIG. 26B, the time between successive pulses is used to indicate the magnitude of a parameter. Thus, if 3 parameters are to be telemetered, the code can be as shown in FIG. 26C, in which $T_1-T_0$ is a time interval representing parameter No. 1.
$T_2-T_1$ is a time interval representing parameter No. 2.
$T_3-T_2$ is a time interval representing parameter No. 3.

In mud pulse Measurement While Drilling operations it is necessary in some cases that the measurements be made with great precision. Since the sound velocities in the mud column are not always constant, and noise and attenuation conditions vary, the time interval between pulses received at the surface will not be in precise agreement with the time interval between the corresponding pulses generated at the downhole equipment. In other words, there is frequently an uncertainty at the surface as to the exact time at which a specific pulse arrives.

Assume that the absolute uncertainty of each pulse arrival time is plus or minus 0.2 seconds, or a total of 0.4 seconds. In order to achieve an accuracy of $\pm 1\%$ for $T_1-T_0$ with a total absolute error of 0.4 seconds, the time between pulses must be at least $0.4\times 100$ or 40 seconds. Furthermore, since the apparatus could sometimes fail to develop a clear sharp pulse, at least two detection "sweeps" are necessary. If both sweeps give the same answer, the data then would have been "verified". Consequently, to achieve the desired accuracy and certainty (for a practical case, an accuracy of $\pm 1\%$) about 80 to 120 seconds will be required per parameter measured (i.e., about 2 minutes per parameter).

In my improved Pulse Time Code I propose an addition which in many cases can result in much greater accuracy. I propose to use for each transmitted pulse $P_0$, $P_1$, $P_2$, $P_3$ not one single mud pressure pulse but a group of at least 3 unequally spaced mud pressure pulses as shown in FIG. 26D (hereinafter called a triple group).

Let the time spacings in each triple group be
The time from the first pulse to the second $=t_1$.
The time from the second pulse to the third $=t_2$.
The time from the first pulse to the third $=t_3$.

In this situation, again $T_0$ represents the time of arrival of triple group $TP_0$; $T_1$ the time of arrival of triple group $TP_1$; $T_2$ the time of arrival of triple group $TP_2$ and $T_3$ the time of arrival of triple group $TP_3$, and;

$T_1-T_0$ is a time interval representing parameter No. 1.
$T_2-T_1$ is a time interval representing parameter No. 2.
$T_3-T_2$ is a time interval representing parameter No. 3.

The advantage of this system is that in case of a momentary failure causing one pulse in the group not to be received, the failure can immediately be recognized—because one triple group will contain two pulses instead of three. Furthermore, since the times $t_1$, $t_2$, $t_3$ are unequal and known, one can determine which pulse in the group is missing; and still furthermore, since again $t_1$, $t_2$, $t_3$ are known, one can apply the proper correction and determine the times $T_1-T_0$, $T_1-T_2$, $T_2-T_3$ with the same accuracy as would be in the case where all pulses were present in the triple group. The triple group system has one further advantage: Since it is difficult to determine the exact arrival time of a particular pulse, the triple group permits substantially closer determination of the arrival time. One could, for example, take the arithmetic average of the arrival time of each pulse in the triple group or by use of modern computer techniques obtain even greater accuracy of the arrival time.

FIG. 29 shows a block diagram of a downhole electronics logic system that will generate the triple group pulses shown in FIG. 26D.

Numeral 101 is a sensor (see FIG. 4A) that generates an electric voltage indicative of the magnitude of a downhole parameter. 601, 602, and 603 are respectively a voltage controlled oscillator, a scaler, and a trigger circuit that generate in a well known manner a series of electric pulses separated by time intervals that are indicative of the magnitude of the voltage output of the sensor 101 and, therefore, of the downhole parameter being measured. The time interval between the pulses $P_0$ and $P_1$ as shown in FIG. 26B is, therefore, a measure of one parameter measured by one of the sensors 101 of FIG. 4A.

The portion of FIG. 29 is enclosed within the dashed rectangle shows the details of the circuitry for generating the triple group pulses referred to previously. 607, 608 and 609 are electronic "one shot" univibrators that in response to the impulse from the trigger circuit 603 each produces a single output pulse of durations $D_1$, $D_2$, $D_3$ respectively as shown in FIG. 29. Blocks 610 are electronic derivators; i.e., each produces at its output a signal that is proportional to the 1st first time derivative of the input signal (such electronic devices are well known in the art). Their outputs, therefore, will be as shown in FIG. 29 as G, H and I; i.e., two opposite polarity pulses separated by respective time intervals $D_1$, $D_2$ and $D_3$. Blocks 611 are rectifiers and transmit only the positive pulses appearing at the outputs of derivators 610. The outputs of rectifiers 611 are connected in parallel at 612 and produce the signal J, which is the signal desired (also shown in FIG. 26D). Each single pulse generated by the trigger circuit 603, therefore, will generate three pulses separated by known and unequal time intervals (triple group) as shown by J. In practice the interval $D_1$ is made very short compared to $D_2$ and $D_3$ and would be only a few microseconds, whereas $D_2$ and $D_3$ are intervals of a few milliseconds to several hundred milliseconds. In the analysis of the operation we can therefore assume that $D_1=0$.

Therefore in the output shown as J in FIG. 29, the pulse $p_1$ indicates the end of the output pulse from 607 (which as pointed out above is for all practical purposes also the beginning of the output pulse since its length is assumed to be zero); the pulse $p_2$ is the end of the output pulse from 608; and the pulse $p_3$ is the end of the output pulse from 609. Therefore, (since $D_1$ was assumed to be zero) the time interval $t_1=D_2$; the time interval $t_3=D_3$; and the time interval $t_2=D_3-D_2$. Thus the portion of FIG. 29 within the dashed rectangle creates the triple group at its output at 612 (shown as J in FIG. 29) in response to a single pulse impressed upon its input.

The circuitry shown in FIG. 29 may be interposed in FIG. 4A between a selected sensor 101 and the power drive 104. In other words, when the Pulse Time Code system of FIG. 29 is employed, the A/D converter 102 and processor 103 are eliminated (since they are adapted for binary encoding) and the Power Drive 104 is driven directly by the output of amplifier 613 of FIG. 29.

When the triple group Pulse Time Code is used instead of the Binary Code, it will be necessary to decode the triple group signals at the surface. In FIGS. 9, 12, 13, 17 and 19 the signals that represent the downhole parameter are assumed to be in binary code form. To change the system to receive signals in the triple group Pulse Time Code form as described in connection with FIGS. 29 and 26D it is necessary to interpose between the filter 150 and the subsequent apparatus at the surface a special "Code Translator" such as that shown in FIG. 27. For this purpose the wire 151 in FIGS. 9, 12, 13, 17 and 19 will be interrupted and the Code Translator interposed. In some cases it is more desirable to interpose the "Code Translator" between the subtractor 160 and the A/D Converter 163 at lead 162 of FIGS. 9, 12, 13, 17, and the preferred location for insertion will be clear to those skilled in the art.

Figure 27:
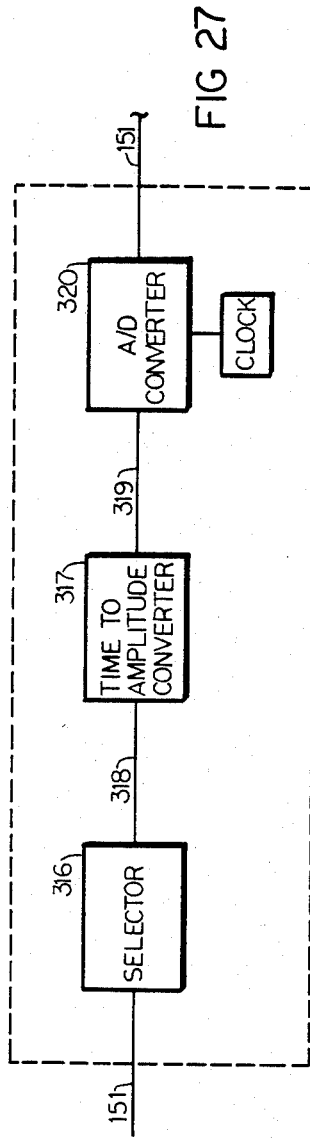
FIG. 27 is a schematic block diagram showing a "Code Translator" utilized to enable a system to receive signals that are in the "triple group" pulse time code form.

With reference to FIG. 27, 316 is a "Selector" which is designed to generate a single output pulse in response to the triple group described in connection with FIG. 29. Numeral 317 designates a Time-Amplitude converter; i.e., an electronic circuit that generates an output DC voltage at the wire 319 that is a predetermined function of the time between two input pulses impressed upon its input by wire 318. Such devices are well known in the electronics art and need no detailed description here. 320 is an Analog to Digital converter and is also well known in the art.

Figure 28A:
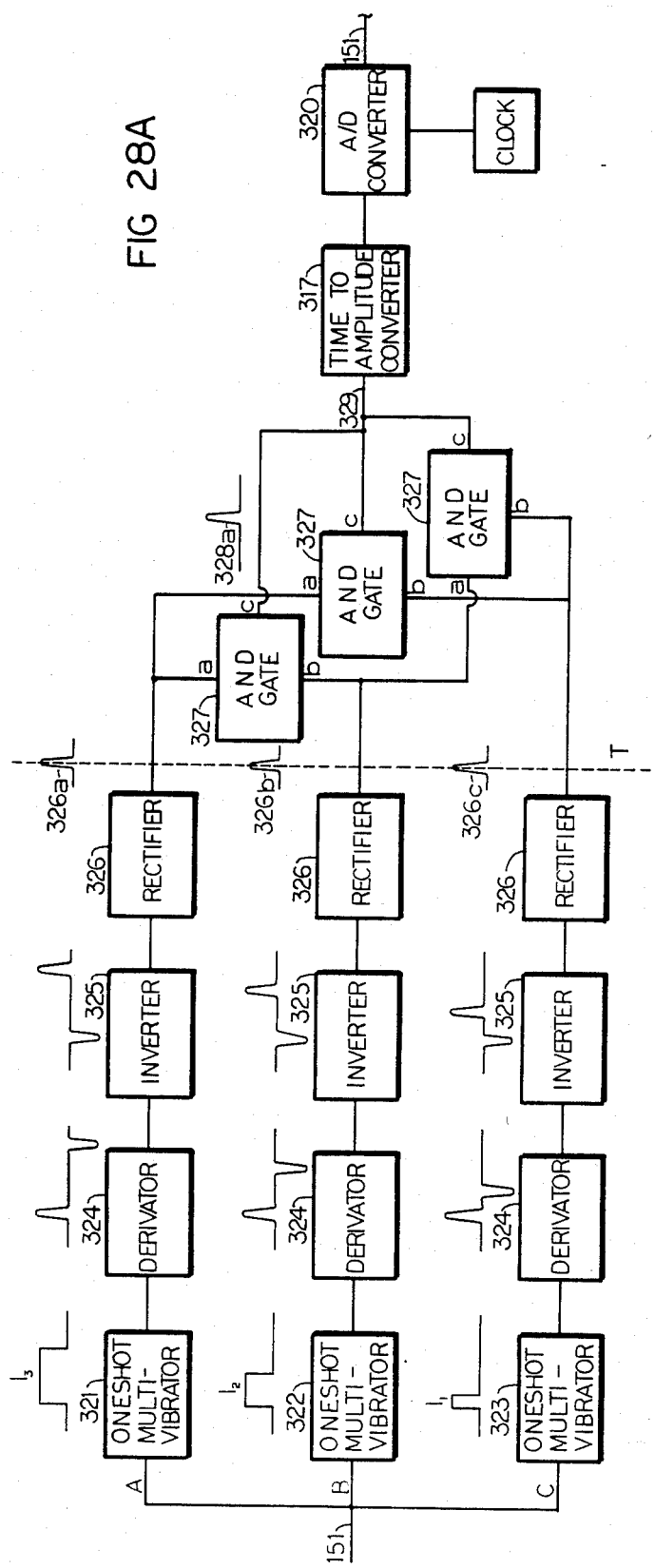
FIG. 28A is a schematic block diagram showing circuitry of the selector 316 of FIG. 27 in further detail.

FIG. 28A shows the Selector 316 in more detail. 321, 322, 323 are one shot univibrators designed to generate a single output pulse of selected predetermined time duration in response to an input pulse. 321 generates a long pulse of time duration $l_3$, 322 a shorter pulse of time duration $l_2$, and 323 a still shorter output of pulse of time duration $l_1$ as shown above each block 321, 322, and 323. Blocks 324 are Derivators; i.e., electronic circuits that generate an output proportional to the first time derivative of a signal impressed upon the input. Such units are also well known and will generate output signals as shown on the curve above each Derivator block. Blocks 325 are "inverters"; i.e., they generate an output signal which is a replica of the input signal but inverted in sign as shown on the curve immediately above each inverter. Blocks 326 each contain a rectifier and generate at the output a single positive electrical pulse, 326a, 326b, 326c as shown. Blocks 327 are "coincidence circuits" or "AND GATES" well known in the art. Each block 327 produces an output pulse at its terminal "c" only when there is a pulse at input "a" and a pulse at input "b" that are in time coincidence. The outputs of all three coincidence circuits 327 are connected in parallel at wire 329 and applied to the input of the Time to Amplitude converter 317. The Time to Amplitude converter 317 produces an output DC voltage that is a predetermined function of the time between two successive input pulses. The output of the Time to Amplitude converter 317 is connected to the A/D converter 320 which then translates the input DC voltage into binary coded pulses in a manner well known in the art.

The circuitry of FIGS. 27 and 28A is made up of conventional electronic integrated circuit components that are well known in the art. The over-all operation of the "selector" requires some more detailed description.

The pulses $P_1$, $P_2$, $P_3$ generated by amplifier 613 of FIG. 29 are impressed on power drive 104 of FIG. 4A and are transmitted to the surface as mud pressure pulses by valve 40. At the surface these mud pressue pulses are picked up for example by the elements of FIG. 9 comprising transducer 51, filter 150, delay element 152 and subtractor 160. The pulses that appear on lead 162 of FIG. 9 (or FIG. 12, FIG. 13 or FIG. 17) we shall designate as $TP_1$, $TP_2$ and $TP_3$ (and correspond to pulses $P_1$, $P_2$ and $P_3$ generated by the downhole electronics of FIG. 29).

FIGS. 28B, 28C, 28D, 28E show the response of the circuit of FIG. 28 to the pulses $TP_1$, $TP_2$, $TP_3$. When pulse $TP_1$ arrives and is impressed on wire 151 (or wire 162) of FIG. 28A, all three one shot univibrators 321, 322 and 323 are triggered and each generates a respective output pulse having its own characteristic and predetermined and fixed length $l_3$, $l_2$ and $l_1$, respectively. Thus, when pulse $TP_1$ triggers the univibrators they generate the output voltages (pulses) $A_1$, $B_1$, $C_1$ as shown in FIG. 28B.

When pulse $TP_2$ arrives it cannot trigger univibrator 321 because it is already in the "ON" state. Pulse $TP_2$ does, however, trigger univibrators 322 and 323, since they have returned to the "OFF" state, and they generate output pulses $B_2$ and $C_2$ as shown in FIG. 28B. When pulse $P_3$ arrives it cannot trigger one shot univibrator 321 or 322 because they are already in the "ON" condition. Pulse $TP_3$ does, however, trigger univibrator 323, since it has returned to the "OFF" state, and it generates output pulse $C_3$ as shown in FIG. 28B.

The time intervals $l_3$, $l_2$, and $l_1$ of the univibrators 321, 322 and 323 in FIG. 28A are so proportioned that they correspond to the time delays caused by the action of the univibrators 609, 608, 607 of FIG. 29, and consequently, the ends of the group of univibrator pulses of FIG. 28B are in "coincidence" and activate the AND gates of FIG. 28A.

FIG. 28B shows the conditions of operation when all pulses TP, $TP_2$, $TP_3$ are present.

FIG. 28C shows the same conditions as in FIG. 28B; but with one of the pulses (e.g. $TP_1$) missing.

FIG. 28D shows the same conditions but with pulse $TP_2$ missing, and FIG. 28E when pulse $TP_3$ is missing. It must be noted that no matter which pulse ($TP_1$, $TP_2$, or $TP_3$) is missing, two univibrator output pulses always end at the time T. This characteristic of the circuit of FIG. 28A is used to always generate at least two time coincident pulses at the time T no matter which of the pulses $TP_1$, $TP_2$, and $TP_3$ is missing. So long as at least two of the group of pulses are detected, the time of occurrence of the output pulse at 329 of FIG. 28A will be the same. The single pulse 328a in FIG. 28A is generated whenever a "group" of pulses is received by the uphole apparatus and the pulse 328a will be present whenever any two pulses in the "group" are detected at the surface.

Referring again to FIG. 28A, block 317 is a conventional time to amplitude converter and generates a DC output voltage that has a predetermined functional relationship to the time between successive pulses 328a. 320 is a conventional A/D converter and translates the magnitude of this DC output voltage into a binary word. The binary words follow one another in quick succession as determined by the characteristics of 320 and its associated clock.

It can be seen, therefore, that the apparatus of FIG. 28A translates the Pulse-Time code using the triple group into a Binary code; and the apparatus succeeding wire 151 or 162 of FIGS. 9, 12, 13, and 17 will operate in exactly the same manner as if the data were initially transmitted in binary code form from the subsurface.

XX.
ADDITIONAL NOTES (1) In order to obtain the shock waves described earlier in this specification, there are certain limits imposed on $K_2$ (mean rate of change of the opening of the valve) and on $T_b^{(v)}$ (the time of open flow). Experiments have shown that $K_2$ should be at least 5 cm$^2$/sec. and preferably within the range from 20 cm$^2$/sec. to 150 cm$^2$/sec. $T_b^{(v)}$ should be at most 500 milliseconds and preferably be in the range from 50 milliseconds to 150 milliseconds (2). It must be noted that although the synchronization pulses (clock 155) in the examples shown are generated either by the generator connected to the pump shaft, or by the phase locked loop described in the parent case, other means for providing the clock frequency that is synchronous with the pump action can be provided. For example, the well known "pump stroke counter" usually used on the connecting rod of the pump can be used to generate one electric pulse per pump stroke. The period between each such successive pulse can be divided into an appropriate number (e.g. 512 or 1024) of equal time intervals by a microprocessor or by a phase locked loop or by other means well known in the computer and electronics art. In such arrangement no access to the pump jack shaft is necessary, and the clock frequency equal to that of generator 155 can be generated by the microprocessor and the pump stroke counter switch.

(3) I have described in the first part of this specification the conditions for occurrence of hydraulic shock waves and relates "valve wavelets" in some detail. At some depths, for example shallow depth, conditions can arise when the valve wavelet as described above is not well formed. For such a valve wavelet it is necessary to have a sufficient volume of mud flowing in the drill pipe and sufficient hydrostatic pressure at the transmitter end. It should be clearly understood that my invention is not limited to the particular wavelet shown and is applicable to other forms of pressure pulses which can be detected at the earth's surface as a result of the actuation of the valve 40.

(4) Various digital filters including matched filters, pulse shaping filters and spiking filters have been described above in a considerable detail. In particular, the performance of each digital filter has been clearly explained by providing a detailed sequence of operations to be performed. These operations have been explained and specified by appropriate mathematical formulations. It is clearly understood that by using modern computing techniques a person skilled in the art can provide the necessary programs on the basis of the descriptions provided in this specification, and the operations described in connection with FIGS. 9, 12, 13, 14, 16, 17, 19, 21 can be performed by suitable software.

(5) Various digital filters which I described can be also applied to other forms of transmitting measurement by mud pulsations by means other than the by-pass valve of the type described herein. These other forms may include the method based on controlled restriction of the mud flow circuit by a flow restricting valve appropriately positioned in the main mud stream as described in the U.S. Pat. No. 2,787,795 issued to J. J. Arps. Broadly speaking, the digital filtering systems which I have described can be applied to any forms of telemetering system in logging while drilling and other forms of logging in which the drilling equipment is removed in order to lower the measuring equipment into the drill hole. It can be applied to telemetering systems utilizing pulses representing any forms of energy, such as electrical electromagnetic, acoustical pulses and other pulses.

(6) The pulse time code employing the triple pulse group as described above can also be applied in acoustic well logging in order to facilitate the processing of acoustic well logging signals and to obtain a highly effective method allowing automatic correction of errors due to pulse skipping in the measurement of the transit time of acoustic waves. Acoustic well logging methods and apparatus are usually designed to measure transit time of an acoustic wave between a first and a second pulse. In U.S. Pat. No. 3,900,824 issued on Aug. 19, 1975 to J. C. Trouiller et al., it was proposed to prevent pulse skipping by the measurement made during a sequence N-1 stored in an auxiliary memory and comparing this measurement with the next measurement (sequence N). U.S. Pat. No. 3,900,824 is included in this application by reference. The alternate method which I propose and which is based on the pulse time code is effective in correcting measurement errors due to cycle skipping in a more efficient and reliable manner.

(7) The triple pulse group time code has a very broad field of applications outside of logging while drilling. It can be used in any communication system for transmitting messages from a transmitting station to a receiving station as well as in various types of well logging (not necessarily in logging while drilling) such as acoustical logging (see Note #6).

(8) It is understood that in order to capture and store a wavelet for later use in the digital filters described herein, certain steps must be taken at the site as have been described in this specification. It is desirable sometimes to capture a single wavelet (rather than a double wavelet), as is necessary in the embodiment of FIG. 19 comprising the spiking filter 351A. To capture a single wavelet it is convenient to synchronize the generation of the signal produced by the subsurface equipment with detection equipment on the surface. This can be done by replacing one of the sensors 1, 2, 3 and 4 at the subsurface equipment in FIG. 4A by a device such as a "clock" or constant time controlled signal generator that will cause uniformly time spaced operations of the valve 40 of FIG. 4A. The operation would be as follows:

(a) By stopping and starting the mud pumps at the surface in the appropriate sequence, the switch 91 of FIG. 4A can be made to connect the modified sensor (i.e., generator of uniformly spaced pulses). Thus a sequence of pulses will be generated by the valve at known times. (Correction of course must be made for the travel time of the pulse from the subsurface to the surface which has been determined previously by methods well known.)

(b) The surface equipment is controlled by its own clock that is in synchronism in time and phase with the subsurface signal transmitter.

(c) By suitable switching at the surface the capturing and storing of the double wavelet can be interrupted so that the storing circuit is connected only for the time of one wavelet and is automatically disconnected during the occurrence of the second wavelet.

Of course the same operation can be done by hand (by the operator). This is easily done when the wavelet is distinct and clearly overrides the noise. When the wavelet is submerged in noise, the automatic system such as described herein is used.

(9) There are two interfering noise signals which tend to obscure the reception of the useful signal B(t) (see equation 22). One of these represents the pump noise P(t) and the other represents the noise U(t) which is associated with various drilling operations other than the action of the pump. In order to eliminate these interfering signals I provide three filtering systems identified as filtering systems #1, #2, and #3.

Filtering system #1 is the analog filter 150. The purpose of this filter is to suppress the steady component of the transducer output representing the pressure generated by the pump 27 and other frequencies outside of the range of interest.

Filtering system #2 comprises a delay element 152 and a subtractor 160. The purpose of this system is to suppress or eliminate th pump noise P(t).

Filtering system #3 comprises a correlator, or a digital filter which may be a matched filter, a pulse shaping filter or a spiking filter and also comprises various associated elements such as storage and recall elements, and computers for determining the optimum values of the memory elements for the corresponding digital filters (see FIGS. 9, 12, 13, 14, and 15). The purpose of the system #3 is to eliminate or suppress the noise U(t).

The filtering systems #1, #2 and #3 are connected in cascade. In the embodiments of my invention described above, the filtering system #1 is connected to the pressure transducer 51 the system #2 is connected to the output lead 151 and the system #3 is connected to the output lead 164 of the system #2.

Each of the above filtering systems is a linear system. Therefore, the function of these systems may be interchanged or reversed. I can proceed at first with the filtering system #1 and then interchange the order of the filtering systems #2 and #3. Also, in some cases it may not be necessary to use all three filtering systems. Any two may be sufficient and in some cases only one. Also, the system between wire 182 and wire 210 can sometimes be eliminated and the D/A converter 211 arranged to accept double wavelets.

(10) When the signal produced by the process described in Section XIII (steps a to f) is captured and stored, it can be cross-correlated with the raw signal as generated by the transducer 51 or with the preconditioned signal at wire 162 of FIGS. 9-19. In the case of cross-correlation with the raw signal at the transducer 51 the second wavelet in the "double wavelet" will have to be eliminated by suitable means well known in the art, so as to be able to cross-correlate with the single wavelet at the output of transducer 51.

What is claimed is:

1. The method of telemetering data in a well filled with drilling fluid comprising the steps of:
    generating downhole individual data carrying fluid pressure signals arranged in coded sequence in said fluid and producing near the surface corresponding individual data carrying pressure changes, the well fluid having also impressed thereon interfering pressure changes caused by the drilling operations thus obscuring said data carrying pressure changes;
    receiving at the surface drilling fluid pressure changes representing the superposition of said data carrying pressure changes and of said interfering pressure changes and translating said superposition into electric superposed signals;
    producing at the surface an electric waveform signal representative of the waveform of said data carrying pressure changes;
    introducing said electric waveform signal into the memory of a digital filter;
    operating said digital filter with said electric superposed signals applied to its input and said electric waveform signal in its memory; and,
    deriving from said digital filter output electric signals representative of said data carrying pressure changes in which the obscuring effect of said interfering pressure changes is diminished.

2. The method of claim 1 wherein said digital filer performs a convolution of said electric superposed signals and of said electric waveform signals.

3. The method of claim 1 wherein said digital filter performs a cross correlation of said electric superposed signals with said electric waveform signals.

4. The method of claim 1 wherein said digital filter is a matched filter.

5. The method of claim 1 wherein said digital filter is a spiked filter.

6. A system for telemetering data in a well filled with drilling fluid during drilling operations, comprising:
    means downhole for generating individual data carrying fluid pressure signals arranged in coded sequence in the drilling fluid which are representative of the magnitude of a downhole parameter and which provides near the earth surface corresponding individual data carrying pressure changes, the well fluid having impressed thereon interfering pressure changes caused by the drilling operations, thus obscuring said data carrying pressure changes;
    means providing at the surface electric waveform signals representative of said data carrying signals;
    digital filter means near the earth's surface receiving said superposed electrical signals and having memory, the memory having a respresentative of the waveform of said electric waveform signals representative of said coded data carrying pressure charges stored therein, the digital filter providing, by use of said memory, an output signal representative of said data carrying pressure charge with the obscuring effects of said interfering pressure changes diminished; and
    means responsive to the output of said digital filter for producing an indication of the magnitude of said downhole parameter.

7. The method of telemetering data in a well comprising the steps of:
    generating downhole individual data carrying signals arranged in coded sequence and producing near the surface corresponding individual data carrying surface signals having also impressed thereon interfering signals caused by the drilling operations thus obscuring said data carrying signals;
    receiving near the surface obscured signals representing the superposition of said data carrying surface signals and of said interfering signals and translating said superposition into electric superposed signals;
    producing at the surface an electric waveform signal representative of the waveform of said data carrying surface signals;
    introducing said electric waveform signal into the memory of a digital filter;
    operating said digital filter with said electric superposed signals applied to its input and said electric waveform signal in its memory; and
    deriving from said digital filter output electric signals representative of said individual data carrying signals in which the obscuring effect of said interfering signal pressure changes is diminished.

* * * * *

UNITED STATES PATENT AND TRADEMARK OFFICE
CERTIFICATE OF CORRECTION

PATENT NO. : 4,866,680

DATED : September 12, 1989

INVENTOR(S) : Serge A. Scherbatskoy

It is certified that error appears in the above—identified patent and that said Letters Patent is hereby corrected as shown below:

Column 54, line 67, delete "pressure changes"

Signed and Sealed this

Twenty-fourth Day of July, 1990

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,866,680
DATED : Sept. 12, 1989
INVENTOR(S) : Serge A. Scherbatskoy It is certified that error appears in the above-identified patent and that said Letters Patent is hereby corrected as shown below:

Column 54, line 39 "charge" should read --changes--.

Signed and Sealed this

Tenth Day of March, 1992

Attest:

HARRY F. MANBECK, JR.

Attesting Officer

Commissioner of Patents and Trademarks